US012674782B2

(12) United States Patent
Khang et al.

(10) Patent No.: US 12,674,782 B2
(45) Date of Patent: Jul. 7, 2026

(54) PHOTOACOUSTIC MEASURING APPARATUS

(71) Applicant: HME SQUARE INC., Daejeon (KR)

(72) Inventors: Yoonho Khang, Yongin-si (KR); Duhyoun Yoon, Seoul (KR); Jinsoo Park, Hwaseong-si (KR); Jinwoong Lee, Hwaseong-si (KR)

(73) Assignee: HME SQUARE INC., Daejeon (KR)

( * ) Notice: Subject to any disclaimer, the term of this patent is extended or adjusted under 35 U.S.C. 154(b) by 0 days.

(21) Appl. No.: 19/412,494

(22) Filed: Dec. 8, 2025

(65) Prior Publication Data

US 2026/0160736 A1 Jun. 11, 2026

Related U.S. Application Data

(60) Provisional application No. 63/736,003, filed on Dec. 19, 2024, provisional application No. 63/729,366, filed on Dec. 7, 2024.

(30) Foreign Application Priority Data

| Mar. 28, 2025 | (KR) | 10-2025-0040348 |
| Mar. 28, 2025 | (KR) | 10-2025-0040466 |
| Mar. 28, 2025 | (KR) | 10-2025-0040468 |
| Mar. 28, 2025 | (KR) | 10-2025-0040484 |
| Mar. 28, 2025 | (KR) | 10-2025-0040486 |

(Continued)

(51) Int. Cl.
*G01N 29/24* (2006.01)

(52) U.S. Cl.
CPC ..... *G01N 29/2418* (2013.01); *G01N 29/2431* (2013.01)

(58) Field of Classification Search
CPC ..................... G01N 29/2418; G01N 29/2431
See application file for complete search history.

(56) References Cited

U.S. PATENT DOCUMENTS

| 6,466,806 | B1 * | 10/2002 | Geva | A61B 5/14532 |
| | | | | 600/473 |
| 2020/0077892 | A1 * | 3/2020 | Tran | A61B 5/0022 |

FOREIGN PATENT DOCUMENTS

| CN | 119236327 | A | | 1/2025 | |
| CN | 119236627 | A | * | 1/2025 | F16M 11/425 |
| JP | 6222936 | B2 | * | 11/2017 | A61B 5/0095 |

(Continued)

OTHER PUBLICATIONS

Louise Finlayson et al., "Depth Penetration of Light into Skin as a Function of Wavelength from 200 to 1000 nm", Photochemistry and Photobiology, 98, 2022, pp. 974-981.

*Primary Examiner* — Jamel E Williams
(74) *Attorney, Agent, or Firm* — Studebaker Brackett PLLC

(57) ABSTRACT

Provided is a photoacoustic measuring apparatus. The apparatus comprises an ultrasonic sensor configured to detect a photoacoustic wave generated in a photoacoustic wave generating area in the measurement target in a predetermined frequency band, wherein with a light-incident position and a beam width of the laser light, a center of the photoacoustic wave generating area, and a position of the ultrasonic sensor given according to a predetermined geometry, the frequency band of the ultrasonic sensor may be configured to include a frequency corresponding to a wavelength equal to twice the beam width at the point of light incidence.

17 Claims, 45 Drawing Sheets

(30)        Foreign Application Priority Data

Mar. 28, 2025    (KR) ........................ 10-2025-0040493
Jul. 18, 2025    (KR) ........................ 10-2025-0097557

(56)        References Cited

FOREIGN PATENT DOCUMENTS

KR    10-2006-0034490 A    4/2006
KR        20060034490 A  *  4/2006   ........... A61N 5/0617
KR    10-2023-0141063 A    10/2023
KR        20230141063 A  *  10/2023   ........... A61B 5/7225

* cited by examiner (a)

(b)

(a)

(b)

(a)

(b)

(a)

(b)

(a)

(b)

(a)

(b)

(a)

(b)

PHOTOACOUSTIC MEASURING APPARATUS

CROSS-REFERENCE TO RELATED APPLICATIONS

This application claims priority from U.S. Provisional Patent Application No. U.S. 63/729,366, filed on Dec. 7, 2024, and U.S. Provisional Patent Application No. U.S. 63/736,003, filed on Dec. 19, 2024, and Korean Patent Application Nos. 10-2025-0040348, 10-2025-0040466, 10-2025-0040468, 10-2025-0040484, 10-2025-0040486, 10-2025-0040493, all filed on Mar. 28, 2025, and Korean Patent Application No. 10-2025-0097557, filed on Jul. 18, 2025, in the Korean Intellectual Property Office, and all the benefits accruing therefrom under 35 U.S.C. 119, the contents of which in their entirety are herein incorporated by reference.

BACKGROUND

Field

The present disclosure relates to a photoacoustic measuring apparatus capable of acquiring information about components in a measurement target using a photoacoustic phenomenon. More specifically, the present disclosure relates to a photoacoustic measuring apparatus including various functions to more precisely measure components in a measurement target.

Description of Related Art

The photoacoustic phenomenon refers to a phenomenon in which when light is illuminated onto a material, the material absorbs the light and is locally heated, thereby causing expansion and contraction, and thus generating a sound. Sound waves or ultrasonic waves generated under the photoacoustic phenomenon may be measured with an acoustic wave sensor to image an internal structure of the material or to analyze components in a measurement target.

Meanwhile, blood glucose measurement is very important in diabetes management. Although blood glucose measurement through blood collection among blood glucose measurement schemes is the most accurate, it is quite painful to perform repeated blood collection every day for diabetics. Accordingly, technologies for measuring blood sugar in a non-invasive manner without collecting blood have been developed. In this regard, photoacoustic-based non-invasive blood sugar measurement is one of them.

A photoacoustic signal measured with a glucose solution at the laboratory level exhibits characteristic change based on a glucose concentration, and theoretically, the glucose concentration in the solution may be estimated based on a pattern of the change. However, when the photoacoustic signal is actually measured on a human tissue such as skin, it is not easy to identify a change in the concentration of blood glucose based on the measured photoacoustic signal.

SUMMARY

The technical purpose of the present disclosure is to provide a photoacoustic measuring apparatus capable of more accurately acquiring information about components in an measurement target using a photoacoustic phenomenon.

The technical purpose of the present disclosure is to provide a miniaturized photoacoustic measuring apparatus having a contact state detection function and a user identification function.

The technical purpose of the present disclosure is to provide a photoacoustic measuring apparatus having a miniaturized form factor and noise robustness.

The technical purpose of the present disclosure is to provide a photoacoustic measuring apparatus having an optimized optical path and geometry based on a miniaturized form factor and a compact optical system, thereby maximizing photoacoustic detection performance.

The technical purpose of the present disclosure is to provide a miniaturized photoacoustic measuring apparatus having a multi-redundant laser safe-driving and stop function. In particular, a technical purpose of the present disclosure is to provide a miniaturized photoacoustic measuring apparatus having only a minimum number of proximity sensors and at least a double, preferably multi-redundant laser safe-driving and stop function.

The technical purposes of the present disclosure are not limited to the technical purposes mentioned above, and other technical purposes not mentioned may be clearly understood by those skilled in the art from descriptions as set forth below.

According to an aspect of the inventive concept, there is provided a photoacoustic measuring apparatus including a light source configured to emit laser of a predetermined wavelength to a measurement target, a photoacoustic detector configured to detect a photoacoustic signal generated from the measurement target receiving the laser light emitted from the light source, a contact sensor including a first bioimpedance electrode and a second bioimpedance electrode and configured to acquire a bioimpedance value when the electrodes are placed in contact with the measurement target and an operator during use of the photoacoustic measuring apparatus, and a controller configured to decide whether the operator and the measurement target are the same individual based on the bioimpedance value measured between the first bioimpedance electrode and the second bioimpedance electrode.

In some embodiments, the photoacoustic detector may include an ultrasonic sensor configured to detect a photoacoustic wave generated in a photoacoustic wave generating area in the measurement target in a predetermined frequency band, wherein with a light-incident position and a beam width of the laser light, a center of the photoacoustic wave generating area, and a position of the ultrasonic sensor given according to a predetermined geometry, the frequency band of the ultrasonic sensor may be configured to include a frequency corresponding to a wavelength equal to twice the beam width at the point of light incidence.

In some embodiments, the frequency band of the ultrasonic sensor may be configured to include a frequency corresponding to a wavelength equivalent to a distance from the photoacoustic wave generating area to the ultrasonic sensor according to the predetermined geometry.

In some embodiments, the pulse width of the laser light may be determined such that twice the time difference between a maximum pressure time and a minimum pressure time of a heat pressure wave estimated in the measurement target by the laser pulse energy is included within a period range corresponding to the frequency band of the ultrasonic sensor.

In some embodiments, the laser light may have a beam cross-section having a fast axis and a slow axis, and the fast axis may be aligned to face the ultrasonic sensor.

In some embodiments, the apparatus may further comprise a sampling unit configured to sample a waveform of the detected photoacoustic wave at a predetermined sampling rate to obtain sampling data, wherein the sampling rate may be determined based on a photoacoustic frequency corresponding a wavelength that is twice the beam width along the fast axis of the beam cross section.

In some embodiments, the sampling data may be obtained by repeatedly performing a procedure for N frames, wherein N is a natural number of 2 or larger, wherein the procedure of each of the N frames is composed of an operation of emitting the laser light to the measurement target, an operation of detecting the photoacoustic wave generated in the photoacoustic wave generating area in the measurement target in the predetermined frequency band, and an operation of sampling a waveform of the photoacoustic wave at a predetermined sampling rate, wherein N pieces of the sampling data respectively obtained in the N frames may be coherent-averaged.

In some embodiments, the frequency band of the ultrasonic sensor may be determined to include a frequency at which a magnitude of a proximity effect between the photoacoustic wave generating area and the ultrasonic sensor is smaller than or equal to a predetermined reference value.

In some embodiments, a center frequency of the frequency band of the ultrasonic sensor may be determined based on a frequency corresponding to a wavelength equivalent to a distance from a center of the photoacoustic wave generating area to a center of the measurement surface of the ultrasonic sensor.

In some embodiments, the photoacoustic detector may include an ultrasonic sensor configured to detect a photoacoustic wave generated in the photoacoustic wave generating area in the measurement target in a predetermined frequency band, wherein a distance between the photoacoustic wave generating area and the ultrasonic sensor may be determined based on a wavelength corresponding to a frequency within the frequency band of the ultrasonic sensor.

In some embodiments, a beam width of the laser light may be determined based on half a wavelength length of a maximum frequency within the frequency band of the ultrasonic sensor.

In some embodiments, a pulse width of the laser light may be determined such that twice the time difference between a maximum pressure time and a minimum pressure time of a heat pressure wave estimated in the measurement target by the laser pulse energy is included within a period range corresponding to the frequency band of the ultrasonic sensor.

In some embodiments, the laser light may have a beam cross-section having a fast axis and a slow axis, and the fast axis may be aligned to face the ultrasonic sensor.

In some embodiments, a beam width of the slow axis of the beam cross-section of the laser light may be determined based on half a wavelength length of a maximum frequency of the frequency band of the ultrasonic sensor.

In some embodiments, a distance between the photoacoustic wave generating area and the ultrasonic sensor may be determined based on a distance at which a proximity effect due to a wavelength belonging to the frequency band of the ultrasonic sensor is smaller than or equal to a predetermined reference value.

In some embodiments, a distance from a center of the photoacoustic wave generating area to a center of a measurement surface of the ultrasonic sensor may be determined based on a wavelength corresponding to a center frequency of the frequency band of the ultrasonic sensor.

In some embodiments, the apparatus may further comprise a sampling unit configured to sample a waveform of the detected photoacoustic wave at a predetermined sampling rate to obtain sampling data, wherein the sampling data may be obtained by repeatedly performing a procedure for N frames, wherein Nis a natural number of 2 or larger, wherein the procedure of each of the N frames is composed of an operation of emitting the laser light to the measurement target, an operation of detecting the photoacoustic wave generated in the photoacoustic wave generating area in the measurement target in the predetermined frequency band, and an operation of sampling a waveform of the photoacoustic wave at a predetermined sampling rate, wherein N pieces of the sampling data respectively obtained in the N frames may be coherent-averaged.

Specific details of further embodiments are included in the detailed description and drawings.

BRIEF DESCRIPTION OF DRAWINGS

The above and other aspects and features of the present disclosure will become more apparent from detailed illustrations of embodiments thereof with reference to the attached drawings, in which.

DETAILED DESCRIPTIONS

Figure 1:
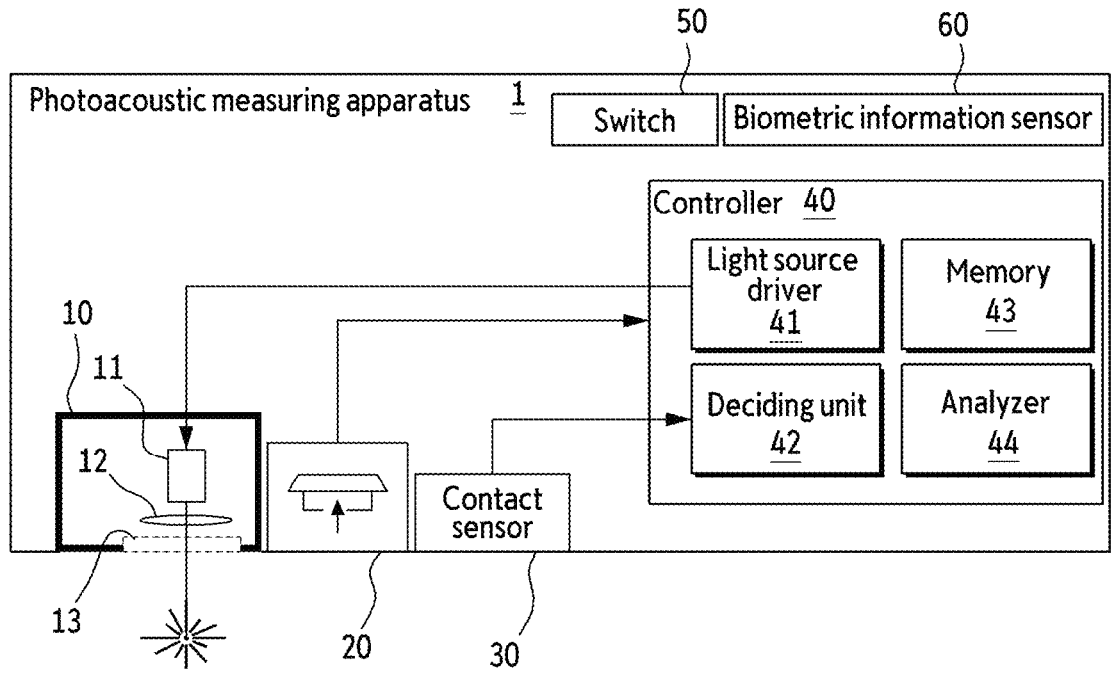
FIG. 1 is a schematic block diagram illustrating a photoacoustic measuring apparatus according to an embodiment of the present disclosure.

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

In adding reference numerals to the components of each drawing, it should be noted that the same reference numerals are assigned to the same components as much as possible even though they are shown in different drawings. In addition, in describing the present disclosure, when it is determined that the detailed description of the related well-known configuration or function may obscure the gist of the present disclosure, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries are not to be interpreted in an idealized or excessively broad manner unless they are specifically defined clearly. The terminology used herein is for the purpose of describing particular embodiments only and is not intended to be limiting of the disclosure. In this specification, the singular also includes the plural unless specifically stated otherwise in the phrase.

In addition, in describing components of this disclosure, terms, such as first, second, A, B, (a), (b), can be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

Hereinafter, embodiments of the present disclosure will be described with reference to the attached drawings.

As used herein, terms such as a sound, an acoustic wave, a sound wave, a sound pressure, a pressure wave, an elastic wave, noise, mechanical vibration, etc., are related to waves propagated in the sample while causing a change in the position of the medium particles in air or in solid to semi-solid, liquid, organic tissue sample, depending on the context.

In addition, the terms "measurement target", "inspection target", "target", and "subject" as used herein are the same concepts as long as there is no special distinction therebetween, and are understood to refer to a measurement target by the photoacoustic measuring apparatus. Hereinafter, some embodiments of the present disclosure will be described with reference to the drawings.

FIG. 1 is a schematic block diagram illustrating a photoacoustic measuring apparatus according to an embodiment of the disclosure.

Referring to FIG. 1, the photoacoustic measuring apparatus 1 may obtain information about a component in a measurement target using a photoacoustic phenomenon. The photoacoustic measuring apparatus 1 may irradiate the skin with a laser pulse beam of a predetermined wavelength to generate a photoacoustic effect in the dermis layer of the skin, and may detect a generated acoustic signal and calculate quantitative information on a specific substance in the dermis layer based on the acoustic signal. The quantitative information on the specific substance may include, for example, a glucose concentration, oxygen saturation, or a glycated hemoglobin concentration. Such a measurement may be performed non-invasively, and does not require an invasive procedure such as blood collection, thereby enabling continuous and repetitive monitoring while minimizing pain or burden on a measurement target.

In addition, the photoacoustic measuring apparatus 1 may be implemented in a smaller and more compact form factor, and thus may be provided in a manner such that it is easy to carry the photoacoustic measuring apparatus 1. Accordingly, the user may easily carry the photoacoustic measuring apparatus 1 and perform measurement not only in a hospital or a doctor's office, but also in a home, while moving, or in an outdoor environment.

Hereinafter, components of the photoacoustic measuring apparatus 1 according to the present embodiment will be described in detail.

The photoacoustic measuring apparatus 1 according to the present embodiment may include a light source unit 10, a photoacoustic detector 20, a contact sensor 30, and a controller 40. According to an embodiment, the photoacoustic measuring apparatus 1 may further include a switch 50, a biometric information sensor 60, and an alarm unit (not shown).

The light source unit 10 may include at least one light source 11 configured to emit laser light of a predetermined wavelength to the measurement target. The light source 11 may be configured to emit pulsed laser light, and the pulsed laser light may provide a high peak power per unit time, thereby improving the signal-to-noise ratio (SNR) and increasing the precision of fine component detection.

For example, the light source 11 may be a light emitting diode (LED) or a laser diode (LD) that directly generates light, may be a single element, or may be provided in an array form in which a plurality of elements are arranged. In addition, in some embodiments, the light source 11 may include a multi-wavelength laser device capable of selectively emitting light beams of different wavelengths, and accordingly, more optimized analysis of specific components of the measurement target may be realized.

A light source driving signal for driving the light source 11 may be provided from a light source driver 41. The light source driver 41 may be configured to generate the light source driving signal for driving the light source 11, and may include, for example, a driver circuit, a power supply circuit, and a control circuit for driving the light source such as a laser diode (LD) or a light emitting diode (LED). The light source driver 41 may apply the light source driving signal to the light source 11 to drive the light source 11 according to a predetermined period and oscillation time (duty) under a predetermined light output condition. For example, the light source 11 may be controlled to have an oscillation time of several microseconds (μs) for a period of several milliseconds (ms).

The light source unit 10 may further include one or more optical elements 12 for guiding light generated from the light source 11 and adjusting its optical properties. For example, the optical element 12 may include one or more optical elements such as a lens, a zoom lens, a reflective mirror, a dichroic mirror, a beam splitter, a prism, an optical fiber, a grating, a polarizing plate, etc. However, the present disclosure is not limited thereto.

The light source unit 10 may include an optical opening 13 so that the laser light having passed through the optical element 12 is finally irradiated onto the measurement target. According to an embodiment, the optical opening 13 may be an optically transparent guide or an optical tube, and may further include a dust blocking cover or an acoustic coupler, when necessary.

The photoacoustic detector 20 is configured to detect a photoacoustic signal generated from the measurement target that receives the laser light emitted from the light source unit 10. The photoacoustic detector 20 may include an acoustic sensor, and the acoustic sensor may be embodied as an ultrasonic sensor or an ultrasonic transducer. In some cases, the photoacoustic detector 20 may be referred to as an acoustic sensor, an ultrasonic sensor, or an ultrasonic transducer.

The laser light incident on the measurement target generates a photoacoustic effect in an intended area, and the photoacoustic wave generated thereby may be transmitted and detected through a measurement surface of the acoustic sensor acoustically in contact with the measurement target. When the photoacoustic wave reaches the acoustic sensor, the acoustic sensor may detect the photoacoustic wave and output an analog photoacoustic signal. The output analog photoacoustic signal may be digitized by a sampling unit (not shown) operating at a predetermined sampling rate, and the converted digital signal may be directly stored in a memory 43 or may be subject to a predetermined post-processing to obtain measurement data which may be stored in the memory.

An analyzer 44 may analyze the measurement data stored in the memory 43 and convert the measurement data into valid information. The analyzer 44 may be embodied as, for example, a general-purpose processor, a dedicated signal processing circuit, or a neural processing unit (NPU) for neural network operation. In some embodiments, the analyzer 44 may analyze the measurement data using a pre-trained artificial intelligence model, and the artificial intelligence model may be embedded in the analyzer 44 or may operate in an external server and be connected thereto via a wired or wireless communication means.

The contact sensor 30 is disposed to face the contact surface of the measurement target, and is configured to measure the bioimpedance of the measurement target. In this regard, the bioimpedance refers to an electrical impedance that is generated when a microcurrent is applied to a human body tissue. The contact sensor 30 may be embodied as a bioimpedance sensor, and may include at least two bioimpedance electrodes and a bioimpedance controller, according to an embodiment. For example, the contact sensor 30 may include a first bioimpedance electrode and a second bioimpedance electrode, and may further include a bioimpedance controller for controlling and processing a current applied to these electrodes and a measured impedance signal.

Figure 2:
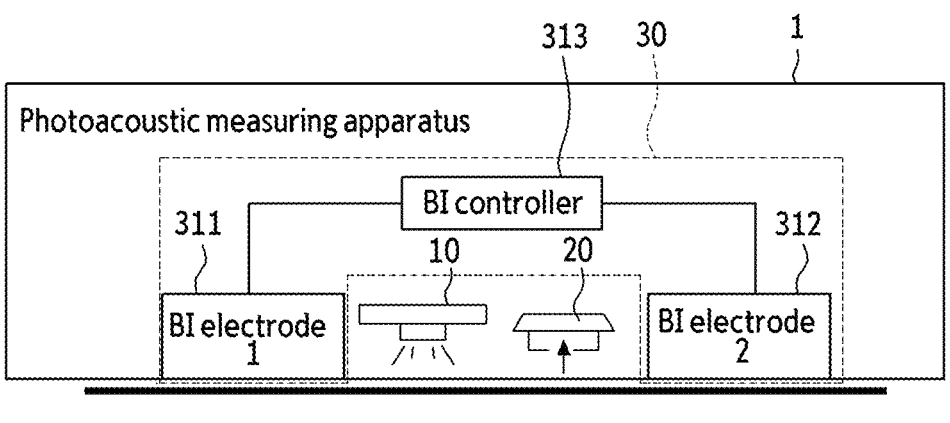
FIG. 2 is a diagram illustrating an example of an arrangement position of a contact sensor according to an embodiment of the present disclosure.

FIG. 2 is a diagram illustrating an example of an arrangement position of a contact sensor according to an embodiment of the present disclosure.

Referring to FIG. 2, the contact sensor 30 may include a first bioimpedance electrode (BI electrode 1) 311 and a second bioimpedance electrode (BI electrode 2) 312, and a bioimpedance controller 313 that applies a current to these electrodes and controls and processes the measured impedance signal. The electrodes 311 and 312 may contact the contact surface of the measurement target and precisely measure the bioimpedance based on the microcurrent passing through the measurement target. In addition, the bioimpedance controller 313 may perform a control function to coordinate current application across the electrodes and signal collection therefrom to obtain a stable and reproducible measurement result.

The first bioimpedance electrode 311 and the second bioimpedance electrode 312 may be disposed adjacent to the light source unit 10 and the photoacoustic detector 20. For example, the optical opening 13 of the light source unit 10 and the measurement surface of the photoacoustic detector 20 may be respectively adjacent to and spaced from the first bioimpedance electrode 311 and the second bioimpedance electrode 312. Accordingly, it may be determined whether the light source unit 10 and the photoacoustic detector 20 are in proper contact with the measurement target.

The bioimpedance signal measured by the contact sensor 30 may be transmitted to the controller 40 to be described later, and may be used to determine a contact state.

The controller 40 controls the overall operation of the photoacoustic measuring apparatus 1. The controller 40 may include at least one of a central processing unit (CPU), a micro processor unit (MPU), a micro controller unit (MCU), a graphic processing unit (GPU), or any type of processor well known in the technical field of the present disclosure. In addition, the controller 40 may perform an operation on at least one application or program for executing the method according to the embodiments of the disclosure to be described below.

The controller 40 may include the light source driver 41, a deciding unit 42, the memory 43, and an analyzer 44. However, this is merely an example configuration, and the controller 40 may further include additional components as needed, and each component may be embodied as an independent module removed from the controller 40.

The deciding unit 42 may be configured to determine whether a proper contact with the measurement target is made based on the bioimpedance value measured by the contact sensor 30. Specifically, the deciding unit 42 may first determine whether the light source unit 10 and the photoacoustic detector 20 are in contact with the skin and then second determine whether the light source unit 10 and the photoacoustic detector 20 are in complete contact with the measurement target, thereby finally determining whether the light source unit 10 and the photoacoustic detector 20 are in proper contact therewith.

More specifically, the deciding unit 42 may first determine whether the skin contact occurs based on a determining result of whether the bioimpedance value measured by the contact sensor 30 is included in a first reference range. The photoacoustic measuring apparatus 1 is configured for measuring a specific component in the human body. Thus, when the measurement is performed in a state in which the measurement surface of the photoacoustic measuring apparatus 1 is in contact with a non-human object other than the human body, the reliability of the measurement result may be deteriorated. Therefore, in the present embodiment, the deciding unit 42 may first determine whether the photoacoustic measuring apparatus 1 is in contact with skin of the human body, thereby preventing an error due to the photoacoustic measuring apparatus 1 contacting the non-skin object.

In this regard, the first reference range is a range corresponding to the human body skin, and refers to a range of an impedance value measured at a predetermined frequency when the measurement surface of the photoacoustic measuring apparatus 1 comes into contact with the human body skin. For example, in a low frequency band of several kHz to several tens of kHz, the bioimpedance of the human skin may be included in a range of about several kiloohms (kΩ) to several hundreds of kiloohms (kΩ). However, the numerical value is an example and may vary depending on the measurement frequency, a spacing between electrodes, a contact portion, etc.

In addition, the deciding unit 42 may determine whether the measured bioimpedance value is included in a second reference range and then determine whether the measurement surface of the photoacoustic measuring apparatus 1 is in complete contact with the measurement target. When the measurement surface of the photoacoustic measuring apparatus 1 is incompletely in contact with or partially spaced apart from the measurement target during the measurement process, a ratio of the contents of the biological component and the air in the medium constituting the measurement path varies, and thus the accuracy of the measurement result may be deteriorated. Therefore, in the present embodiment, whether the measurement surface of the photoacoustic measuring apparatus 1 is completely in contact with the measurement target may be determined such that the reliable measurement result may be secured.

In this regard, the second reference range is a range corresponding to the complete contact state, and means a case in which a difference between bioimpedance values measured by at least two or more bioimpedance electrodes disposed to be spaced apart from each other is within a predetermined range.

In one example, in the present embodiment, the proper contact refers to a case in which both the skin contact and the complete contact are satisfied. However, the present disclosure is not limited thereto. According to an embodiment, the proper contact may include only whether the measurement surface of the photoacoustic measuring apparatus 1 is in contact with the skin, or may include only whether the measurement surface of the photoacoustic measuring apparatus 1 is in complete contact with the measurement target.

According to an embodiment, the operation of the photoacoustic measuring apparatus 1 may be controlled according to the decision of the deciding unit 42. This will be described in detail with reference to FIGS. 3 and 4.

Figure 3:
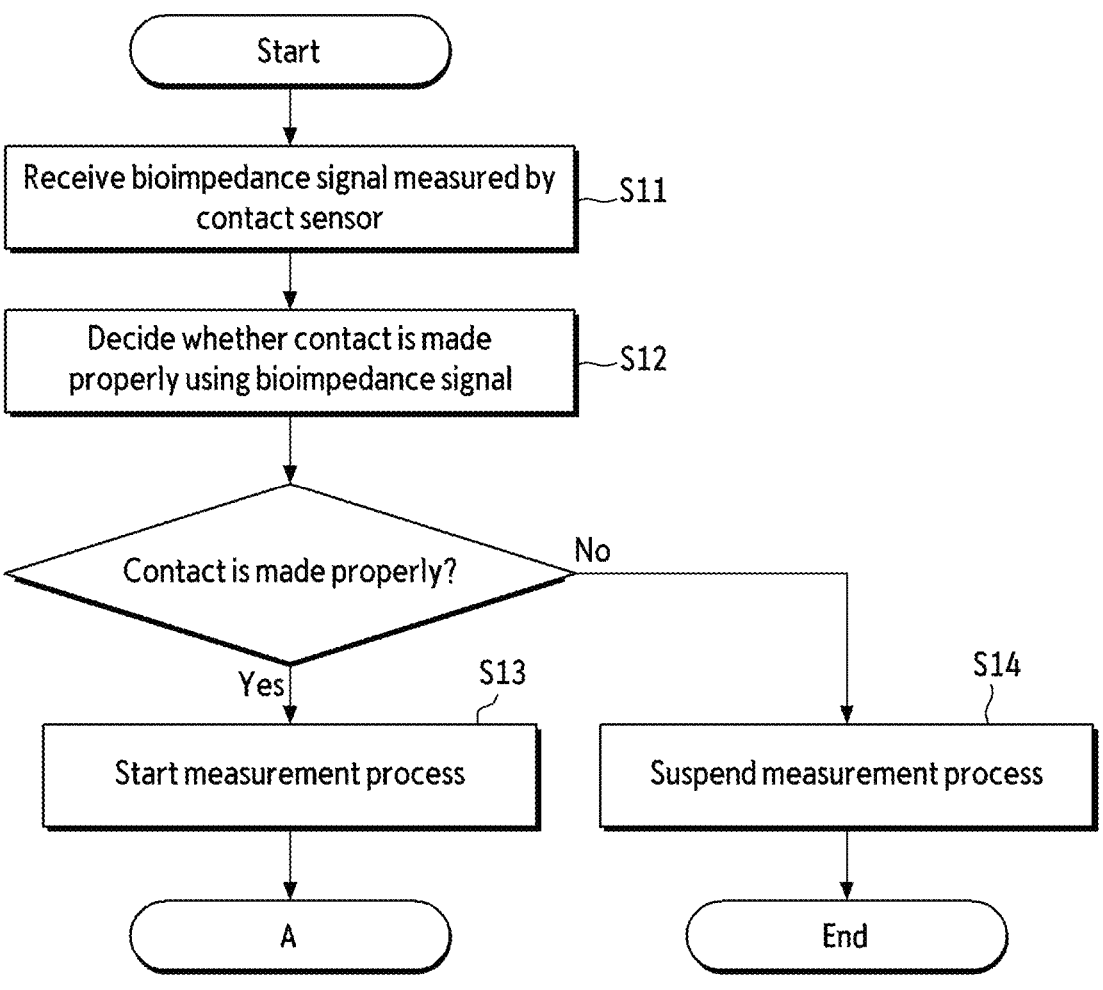
FIGS. 3 and 4 are flowcharts illustrating a method of controlling a photoacoustic measuring apparatus according to an embodiment of the present disclosure.
Figure 4:
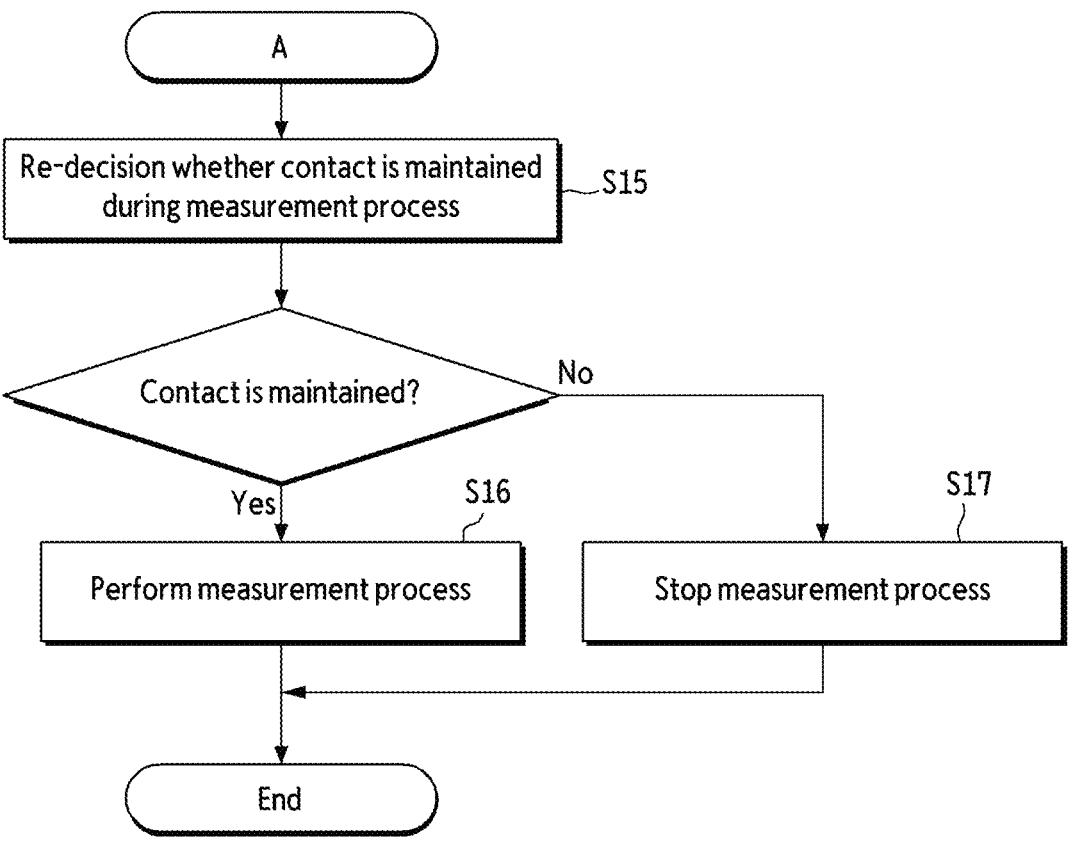

FIGS. 3 and 4 are flowcharts illustrating a method of controlling a photoacoustic measuring apparatus according to an embodiment of the present disclosure. This is only a preferred embodiment for achieving the purpose of the present disclosure, and it is obvious that some steps may be added or deleted as necessary. In addition, steps/operations to be described below may be performed by the controller 40. Accordingly, in the following descriptions, when the subject of a specific step/operation is omitted, it may be understood that it is performed by the controller 40.

Referring to FIG. 3, first, in S11, a bioimpedance signal measured by the contact sensor may be received. Subsequently, in S12, it may be decided whether contact is made properly using the bioimpedance signal. For example, whether the contact is a proper contact may be decided based on whether the contact is the skin contact. In another example, a first decision may be made as to whether the contact corresponds to a skin contact, and if the contact is decided to be the skin contact, a second decision may then be made as to whether the contact is a complete contact. A final proper-contact decision may be made based on these two decisions.

In response to that, when it is decided that the contact is a proper contact (YES), the measurement process on the measurement target may be initiated in S13. In this regard, the measurement process refers to a series of processes of irradiating laser light of a predetermined wavelength to the measurement target, detecting the photoacoustic signal generated accordingly, and analyzing the detected photoacoustic signal to obtain information about a specific substance in the measurement target. Accordingly, the photoacoustic measuring apparatus 1 may be controlled not to emit the laser light until the proper contact is identified, but to emit the laser light only after the proper contact is identified.

According to an embodiment, when the measurement process on the measurement target is started, an operation of notifying the user of the start may be additionally performed. To this end, the photoacoustic measuring apparatus 1 may further include the alarm unit (not shown). The alarm unit may include a display, a speaker, a haptic module, and the like as a means for visually, aurally, or tactilely presenting the start information of the measurement process to the user. For example, when the measurement process is initiated, a control signal is generated and transmitted to the alarm unit, and thus, a visual, auditory, or tactile output may be generated.

On the contrary, when it is decided that the contact is an improper contact (NO), the measurement process on the measurement target may be suspended in S14. More specifically, when it is determined that the contact is not the skin contact in the first decision, or when it is determined that the contact is the skin contact in the first decision but is the incomplete contact in the second decision, the measurement process may be suspended.

According to an embodiment, when the measurement process on the measurement target is suspended, an operation of notifying that the measurement target is in an improper contact state may be performed. For example, when it is determined in the first decision that the contact is not the skin contact, a control signal may be generated and transmitted to the alarm unit so that a message requesting the user to contact the apparatus 1 with the human skin is visually or audibly output.

In one example, when the proper contact state is not maintained even after the measurement process is initiated, the accuracy of the measurement may be deteriorated or an error may occur. Accordingly, according to an embodiment, even after the measurement process is initiated, an operation of re-determining whether the contact is the proper contact may be performed.

Referring to FIG. 4, in S15, a re-decision may be made as to whether the proper contact is maintained during the measurement process. This re-decision operation may be performed at a time point when a predetermined time duration has elapsed after the start of the measurement process, and may be executed at least once or more after the start of the measurement process. When it is decided that proper contact is maintained (YES), the measurement process on the measurement target may continue in S16.

On the contrary, when it is decided that proper contact is not maintained (NO), the measurement process on the measurement target may be stopped in S17. More specifically, the emission of the laser light may be stopped, or the operation of analyzing the photoacoustic signal may be deactivated. In addition, a message guiding the proper contact may be controlled to be output visually or audibly through the alarm unit.

According to an embodiment, the measurement process itself may continue, but a signal determined to be acquired in the improper contact state among the collected photoacoustic signals may not be analyzed or may be controlled not to be provided to the user even though there is an analysis result. In addition, according to an embodiment, the output of the laser light may be controlled to be emitted in a limited manner to a value smaller than an Acceptable Emission Limit (AEL) value, and accordingly, the risk to the user in event of the improper contact may be minimized.

Referring back to FIG. 1, the photoacoustic measuring apparatus 1 may further include a switch 50 for initiating the measurement. The switch 50 may be configured to allow a user to perform an on/off operation. When the switch 50 is switched to the ON state, an operation start signal of the photoacoustic measuring apparatus 1 may be generated and transmitted to the controller 40, and accordingly, the photoacoustic measuring apparatus 1 may be switched to a measurement ready state. Such a switch scheme has an effect of preventing unnecessary operation and reducing battery consumption.

In addition, when the photoacoustic measuring apparatus 1 contacts the measurement target in a state in which the switch 50 is switched to the ON state, the bioimpedance may be measured by the contact sensor 30 and whether the photoacoustic measuring apparatus 1 is in proper contact with the measurement target may be determined based on the bioimpedance.

According to an embodiment, the controller 40 may be configured to control the switch 50 to be automatically switched to the ON state according to a predetermined measurement schedule. For example, the switch 50 may be automatically switched to the ON state according to a user's health monitoring period, a preset measurement reservation time, or a measurement instruction provided from an external server. This scheme enables regular and systematic measurement even when the user does not manipulate the apparatus separately, and has the effect of improving user convenience.

According to an embodiment, the photoacoustic measuring apparatus 1 may further include a biometric information sensor 60 for identifying a user. The biometric information sensor 60 may be embodied as, for example, a fingerprint sensor. The biometric information sensor 60 may be disposed in an integrated manner with the switch 50, and accordingly, when the hand of the user touches the switch 50 to switch the switch 50 to the ON state, biometric information (e.g., a fingerprint) of the user may be obtained through the biometric information sensor 60. However, the present disclosure is not limited thereto, and the biometric information sensor may be disposed at a position of the photoacoustic measuring apparatus 1 where the hand of the user may naturally contact the biometric information sensor in the process of gripping or holding the photoacoustic measuring apparatus 1.

When the biometric information (e.g., a fingerprint) of the user is obtained from the biometric information sensor 60, the controller 40 may identify the user based on the biometric information. Specifically, the biometric information obtained through the biometric information sensor 60 may be compared with pre-registered biometric information stored in the memory to identify the user. If the input biometric information matches the pre-registered biometric information, the user is identified. when the input biometric information does not match the pre-registered biometric information, a new user registration process may be performed. In this case, the matching result may be visually, aurally, or tactilely notified to the user through the alarm unit.

The controller 40 may perform an operation of controlling the measurement data obtained through the measurement process to be stored and managed in a user-specific database corresponding to the identified user. In this regard, the user-specific database may be implemented in a memory or a storage inside the photoacoustic measuring apparatus 1, or may be disposed in an external server (e.g., a cloud database) linked thereto through a network. According to an embodiment, the measurement result may be temporarily stored in the photoacoustic measuring apparatus 1 and then may be transmitted to the external server at a predetermined timing or when connection to the network is established in the synchronized manner so that a user-specific database may be managed. This configuration is advantageous for long-term data accumulation and remote monitoring, and provision of customized health care services while allowing the user to immediately check the results on the photoacoustic measuring apparatus 1.

According to the above description, determining whether the proper contact (e.g., skin contact and/or complete contact) with the measurement target is made based on the bioimpedance value measured through the contact sensor 30 may allow the measurement in a non-skin contact or incomplete contact state to be prevented, and thus the accuracy of the measurement result may be improved. In addition, identifying the user through the biometric information sensor 60 and storing and managing the measurement result in the user-specific database based on the identified user information may allow for the management of a measurement history for a long period of time and provision of a user-customized health management service.

In one example, in the present embodiment, a case where the user (the measurement-performing person) is the measurement target (the subject) has been mainly described. However, in some cases, the measurement-performing person and the subject may be different from each other. Hereinafter, an embodiment in which whether the measurement-performing person and the subject are the same person is determined will be described in detail.

The photoacoustic measuring apparatus according to the present embodiment, which includes a function of checking whether the measurement-performing person and the subject are the same person, has the same basic configuration as that in the previous embodiment. That is, the photoacoustic measuring apparatus according to the present embodiment may include the light source unit 10, the photoacoustic detector 20, and the controller 40. According to an embodiment, the switch 50 and the alarm unit (not shown) may be further included therein.

However, the position and function of the contact sensor in the present embodiment are different from those in the above previous embodiment. Hereinafter, these differences will be mainly described. In this regard, functions and detailed descriptions of components not separately mentioned below refer to the descriptions of the previous embodiment. In addition, in the following drawings, the same reference numerals are used for the same components as those in the previous embodiment.

Figure 5:
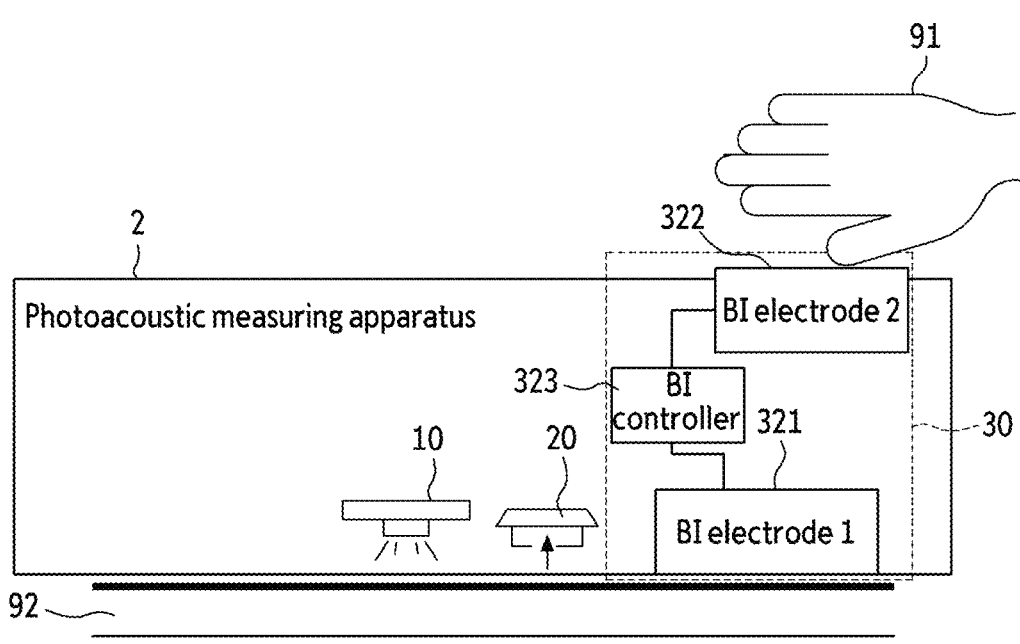
FIG. 5 is a diagram schematically illustrating a photoacoustic measuring apparatus according to another embodiment of the present disclosure.

FIG. 5 is a diagram schematically illustrating a photoacoustic measuring apparatus according to another embodiment of the present disclosure.

Referring to FIG. 5, a photoacoustic measuring apparatus 2 according to the present embodiment includes the light source unit 10 configured to emit laser light of a predetermined wavelength to a subject 92, and the photoacoustic detector 20 configured to detect a photoacoustic signal generated from the subject 92 that receives the laser light emitted from the light source unit 10.

In addition, the photoacoustic measuring apparatus 2 may further include the contact sensor 30 for determining whether the subject and the measurement-performing person are the same person.

The contact sensor 30 may include a first bioimpedance electrode 321 disposed to face a measurement surface of the subject 92, a second bioimpedance electrode 322 with which the measurement-performing person 91 is in contact, and a bioimpedance controller 323 configured to apply a current to the electrodes and control and process an impedance signal. In this regard, the measurement surface of the subject 92 may be, for example, the skin of the measurement target or the subject, and the surface in contact with the measurement-performing person may be a surface of the photoacoustic measuring apparatus 2 in contact with the measurement-performing person in the process of picking up or holding the photoacoustic measuring apparatus 2, for example, a surface thereof in contact with the hand of the measurement-performing person.

According to an embodiment, the second bioimpedance electrode 322 may be disposed in the integrated manner with the switch 50, and accordingly, when the hand of the measurement-performing person 91 contacts the switch 50 to switch the switch 50 to an ON state, the second bioimpedance electrode 322 may also contact the hand of the measurement-performing person 91.

For measurement, when the optical opening 13 and the measurement surface of the photoacoustic detector 20 are in contact with the measurement surface of the subject 92 in a state in which the measurement-performing person 91 holds the photoacoustic measuring apparatus 2, the first bioimpedance electrode 321 is in contact with the skin of the subject 92, and the second bioimpedance electrode 322 is in contact with the skin (e.g., a finger or a palm) of the measurement-performing person 91. The electrical characteristics between the electrodes are measured in a state in which the two electrodes are in contact with the skin of the subject and the skin of the measurement-performing person, respectively, and the bioimpedance value is calculated based on the electrical characteristics. The calculated bioimpedance value is transmitted to the controller 40.

The controller 40 may determine whether the measurement-performing person and the subject are the same person based on the bioimpedance value measured between the first bioimpedance electrode 321 and the second bioimpedance electrode 322.

Specifically, when the bioimpedance value measured between the first bioimpedance electrode 321 and the second bioimpedance electrode 322 is measured to be smaller than or equal to a predetermined threshold value, this means that the current smoothly flows through the body of the measurement-performing person and the body of the subject along one continuous conduction path. In this case, the controller 40 may determine that there is a high possibility that the measurement-performing person and the subject are the same person.

On the contrary, when the bioimpedance value exceeds the predetermined threshold value, this may be interpreted as that the current path is broken or incompletely formed, and thus the controller 40 may determine that the measurement-performing person and the subject are not the same person.

According to an embodiment, when it is determined that the measurement-performing person and the subject are the same person, the controller 40 may recognize the measurement-performing person as a user preset in the photoacoustic measuring apparatus 2. In this case, the acquired measurement data may be stored and managed in the database corresponding to the user. That is, in the present embodiment, when it is identified that the measurement-performing person is the user, it is possible for the photoacoustic measuring apparatus 1 to automatically manage the data based on a pre-registered user account.

According to still another embodiment, the photoacoustic measuring apparatus 2 may further include the biometric information sensor 60 for identifying the measurement-performing person. When it is determined that the measurement-performing person and the subject are the same person, the controller 40 may additionally identify who the measurement-performing person is based on biometric information (e.g., a fingerprint) obtained from the biometric information sensor 60. In this case, the data obtained through the measurement process performed thereafter may be stored and managed in a dedicated database corresponding to the identified specific user.

According to an embodiment, the biometric information sensor 60 may be implemented in an integrated manner with the switch 50 or may be disposed together with the switch 50. According to an embodiment, the second bioimpedance electrode (BI electrode 2) 322 may also be implemented in an integrated manner with the switch 50 or may be disposed together with the switch 50. Accordingly, when the measurement-performing person 91 contacts the switch 50 with the hand to switch the switch 50 to the ON state, the biometric information sensor 60 and the second biometric impedance electrode 322 may simultaneously contact the hand of the measurement-performing person 91.

According to an embodiment, the photoacoustic measuring apparatus 2 may further include an input unit configured to allow the user to input identification information of the subject when it is determined that the subject and the measurement-performing person 91 (user) are not the same person. Specifically, the input unit may display a user interface (UI) for guiding the user to specify the subject. The subject may be specified by the user or the measurement-performing person 91 inputting identification information of the subject through the user interface. In this case, the user-specific database corresponding to the specified subject may be selected, and measurement data obtained thereafter may be stored and managed in the corresponding database.

According to the above description, the photoacoustic measuring apparatus 2 may determine whether the measurement-performing person and the subject are the same person in only a simple scheme of measuring the impedance between the electrodes without a separate complicated device. In addition, when it is determined that the measurement-performing person and the subject are the same person, the measurement data obtained according to the identification information of the measurement-performing person may be stored and managed. When it is determined that the measurement-performing person and the subject are not the same person, the measurement data may be individually stored and managed according to the identification information of the subject. Accordingly, even when a plurality of users perform measurement using the same photoacoustic measuring apparatus, the measurement data may be individually classified and stored based on each subject even though the subject and the measurement-performing person are different from each other, thereby enabling user-customized data management and long-term individual health monitoring.

According to an embodiment, when the bioimpedance electrode is added, in addition to determining whether the measurement-performing person and the subject are the same person, it may be determined whether the photoacoustic measuring apparatus properly contacts the skin of the subject. Hereinafter, still another embodiment of the present disclosure will be described.

The photoacoustic measuring apparatus according to the present embodiment has the same basic configuration as that in the previous embodiment. That is, the photoacoustic measuring apparatus according to the present embodiment may include the light source unit 10, the photoacoustic detector 20, and the controller 40. The photoacoustic measuring apparatus may further include the switch 50 and the alarm unit (not shown) according to an embodiment.

However, the number and arrangement of the bioimpedance electrodes in the present embodiment are different from those in the previous embodiment. Hereinafter, these differences will be mainly described. In one example, functions and detailed descriptions of components not separately mentioned refer to the descriptions of the previous embodiment. In addition, in the following drawings, the same reference numerals are used for the same components as those in the previous embodiment.

Figure 6:
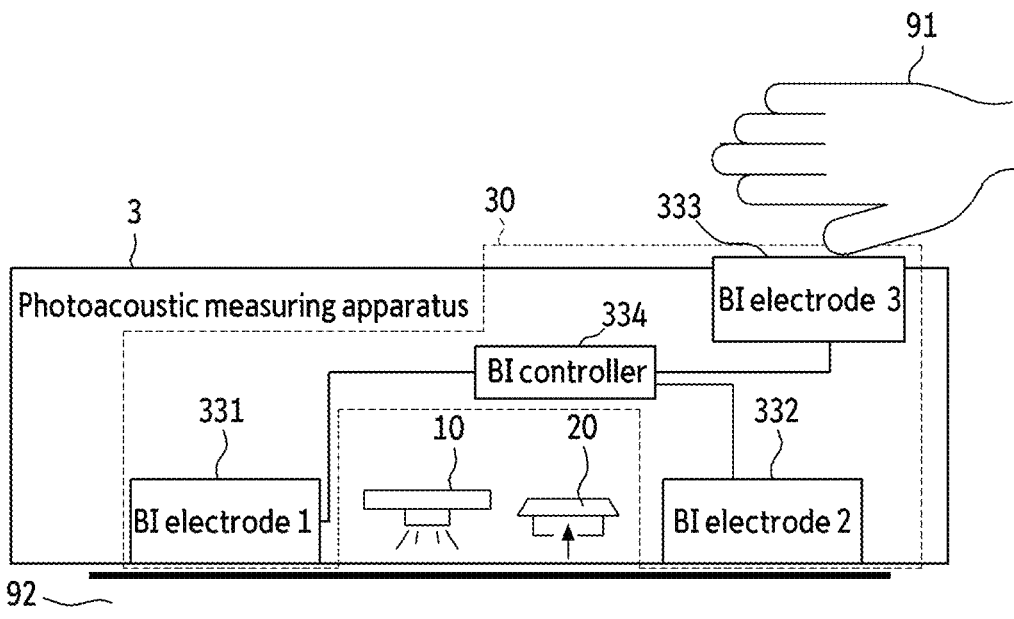
FIG. 6 is a diagram schematically illustrating a photoacoustic measuring apparatus according to still another embodiment of the present disclosure.

FIG. 6 is a diagram schematically illustrating a photoacoustic measuring apparatus according to still another embodiment of the present disclosure.

Referring to FIG. 6, a photoacoustic measuring apparatus 3 according to the present embodiment includes the light source unit 10 configured to emit laser light of a predetermined wavelength to the subject 92, and the photoacoustic detector 20 configured to detect a photoacoustic signal generated from the subject 92 that receives the laser light emitted from the light source unit 10.

In addition, the photoacoustic measuring apparatus 3 may further include the contact sensor 30 for determining whether the measurement-performing person and the subject are the same person and determining a contact state with the subject.

The contact sensor 30 may include a first bioimpedance electrode 331 and a second bioimpedance electrode 332 disposed to face the measurement surface of the subject 92, a third bioimpedance electrode 333 disposed on the surface in contact with the measurement-performing person 91, and a bioimpedance controller 334 that applies a current to the electrodes and controls and processes an impedance signal.

In this regard, the measurement surface of the subject 92 may be, for example, the skin of the measurement target or the subject. The surface in contact with the measurement-performing person may be a surface of the photoacoustic measuring apparatus 3 in contact with the measurement-performing person in the process of picking up or holding the photoacoustic measuring apparatus 3, for example, a surface thereof in contact with the hand of the measurement-performing person.

According to an embodiment, the third bioimpedance electrode (BI electrode 3) 333 may be disposed in an integrated manner with the switch 50. Accordingly, when the hand of the measurement-performing person 91 contacts the switch 50 to switch the switch 50 to an ON state, the third bioimpedance electrode (BI electrode 3) 333 may also contact the hand of the measurement-performing person 91.

For measurement, when the measurement-performing person 91 brings the measurement surface of the photoacoustic measuring apparatus 3 into contact with the measurement surface of the subject 92 in a state in which the measurement-performing person 91 holds the photoacoustic measuring apparatus 3, the first bioimpedance electrode 331 and the second bioimpedance electrode 332 are brought into contact with the skin of the subject 92, and the third bioimpedance electrode 333 is brought into contact with the skin (e.g., a finger or a palm) of the measurement-performing person 91.

While the electrodes are in contact with the skin of the measurement-performing person 91 and the skin of the subject 92, a current and voltage response between the electrodes is detected, and a bioimpedance value based thereon is calculated. That is, a first bioimpedance value measured between the first bioimpedance electrode 331 and the second bioimpedance electrode (BI electrode 2) 332, a second bioimpedance value measured between the second bioimpedance electrode 332 and a third bioimpedance electrode 333, and a third bioimpedance value measured between the first bioimpedance electrode 331 and the third bioimpedance electrode 333 are calculated. The calculated bioimpedance values are transmitted to the controller 40 and then used for subsequent determination.

The controller 40 may determine whether the photoacoustic measuring apparatus 3 is in proper contact with the measurement surface of the measurement-performing person and whether the measurement-performing person and the subject are the same person, based on the bioimpedance value.

Specifically, whether the contact is the skin contact may be determined based on a decision of whether the first bioimpedance value measured between the first bioimpedance electrode 331 and the second bioimpedance electrode 332 is included in a first reference range. In this regard, the first reference range means a range corresponding to the human skin. In addition, based on the determining result of whether the first bioimpedance value is included in a second reference range, whether the contact is the complete contact with the subject may then be determined. In this regard, the second reference range means a range corresponding to the complete contact state.

In addition, when each of the second bioimpedance value measured between the second bioimpedance electrode 332 and the third bioimpedance electrode 333 and the third bioimpedance value measured between the first bioimpedance electrode 331 and the third bioimpedance electrode 333 is measured to be smaller than or equal to a predetermined threshold value, the controller 40 may determine that the measurement-performing person and the subject are highly likely to be the same person. Conversely, when each of the second bioimpedance value and the third bioimpedance value exceed the predetermined threshold value, the controller 40 may determine that the measurement-performing person and the subject are not the same person.

According to an embodiment, the controller 40 may determine whether the measurement surface of the photoacoustic measuring apparatus 3 is in proper contact with the skin of the subject and whether the measurement-performing person and the subject are the same person, based on a preset decision rule. For example, the following decision rule may be applied based on a combination of the first bioimpedance value, the second bioimpedance value, and the third bioimpedance value.

First, according to a first decision rule, when the first bioimpedance value exceeds a predetermined threshold value and each of the second impedance value and the third impedance value also exceed a predetermined threshold value, it may be determined that the photoacoustic measuring apparatus is not in proper contact with the skin.

In a second decision rule, when the first bioimpedance value exceeds a predetermined threshold value, but each of the second bioimpedance value and the third bioimpedance value is smaller than or equal to a predetermined threshold value, this may be interpreted as that the partial contact is made but the contact is not a proper skin contact or the photoacoustic measuring apparatus is in contact with an object other than the skin, and thus it may be determined that the contact state is an improper contact state.

In addition, according to a third decision rule, when the first bioimpedance value is equal to or smaller than a predetermined threshold value and each of the second bioimpedance value and the third bioimpedance value exceeds a predetermined threshold value, it is determined that there is a high possibility that the contact is the skin contact but the photoacoustic measuring apparatus contacts the skin of another person other than the skin of the measurement-performing person. Accordingly, it may be determined that the measurement-performing person and the subject are not the same person.

According to a fourth decision rule, when each of all of the first bioimpedance value, the second bioimpedance value, and the third bioimpedance value is equal to or smaller than a predetermined threshold value, it is determined that the contact is the skin contact and the photoacoustic measuring apparatus contacts the skin of the measurement-performing person. Thus, it may be determined that the measurement-performing person and the subject are the same person.

According to an embodiment, when it is determined that the photoacoustic measuring apparatus is in an improper contact state, according to the first decision rule or the second decision rule, the measurement process on the subject may be suspended. On the contrary, when the contact is determined as the proper contact according to the third decision rule or the fourth decision rule, the measurement process on the subject may be initiated.

According to an embodiment, when it is determined that the proper contact is made, but the measurement-performing person and the subject are not the same person according to the third decision rule, a user interface (UI) for guiding the measurement-performing person to specify the subject may be displayed on the input unit. The measurement-performing person may input identification information of the subject through the user interface, and accordingly, the subject is specified. In this case, a user-specific database corresponding to the specified subject may be selected, and measurement data obtained thereafter may be stored and managed in the corresponding database.

According to an embodiment, when it is determined that the contact is the proper contact and the measurement-performing person and the subject are the same person according to the fourth decision rule, the controller 40 may select a user-specific database corresponding to the measurement-performing person, and thereafter acquired measurement data may be stored and managed in the database. To this end, the photoacoustic measuring apparatus may further include the biometric information sensor 60 for identifying the measurement-performing person, and the controller 40 may identify the measurement-performing person using biometric information (e.g., a fingerprint) obtained from the biometric information sensor 60 when it is determined that the measurement-performing person and the subject are the same person.

Referring to FIGS. 1 to 6, the function and operation of the photoacoustic measuring apparatus capable of determining a contact state and identifying the user based on the contact sensor have been described above in detail. The embodiments described above may be understood in more detail with reference to further embodiments to be described later. In addition, technical ideas that may be understood based on the above-described embodiments may be applied to further embodiments to be described later, even though not separately specified.

Next, further embodiments for reducing noise that may occur in the photoacoustic measurement process will be described.

Figure 7:
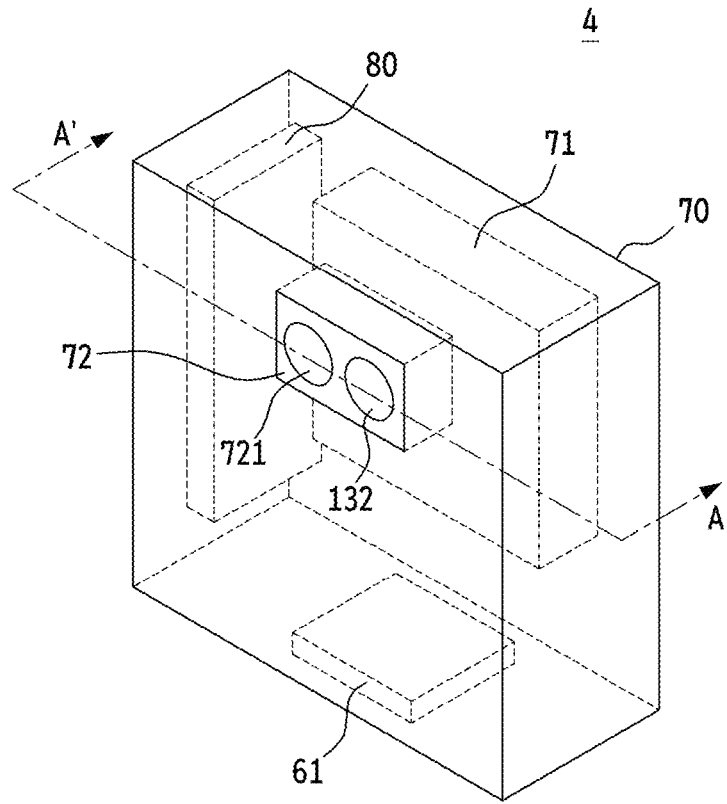
FIG. 7 is a schematic perspective view illustrating a photoacoustic measuring apparatus according to still yet another embodiment of the present disclosure.
Figure 8:
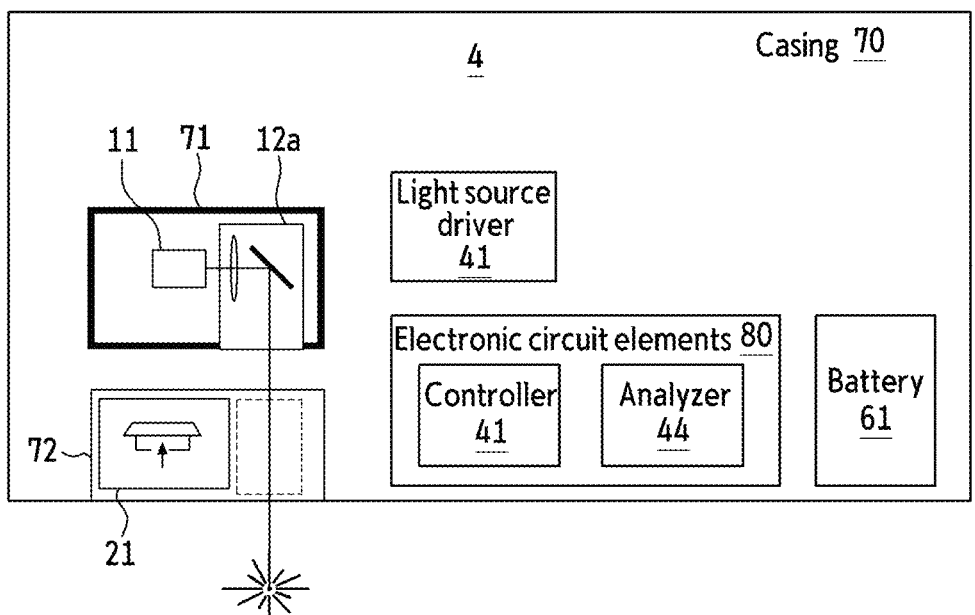
FIG. 8 is a schematic block diagram illustrating a photoacoustic measuring apparatus according to still yet another embodiment of the present disclosure.
Figure 9:
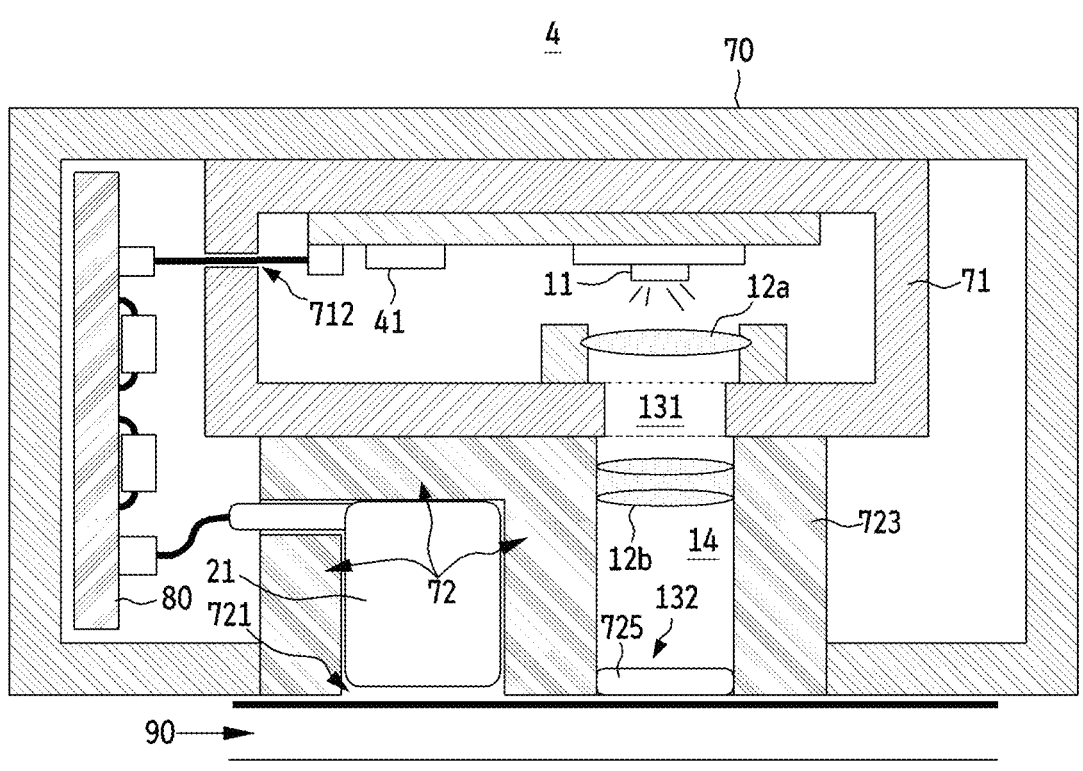
FIG. 9 is a schematic cross-sectional view illustrating a structure in which a first housing and a second housing are joined to each other in a photoacoustic measuring apparatus according to still yet another embodiment of the present disclosure.

FIG. 7 is a schematic perspective view illustrating a photoacoustic measuring apparatus according to still another embodiment of the present disclosure, and FIG. 8 is a schematic block diagram illustrating a photoacoustic measuring apparatus according to still yet another embodiment of the present disclosure. FIG. 9 is a schematic cross-sectional view illustrating a structure in which a first housing and a second housing are joined to each other in a photoacoustic measuring apparatus according to still yet another embodiment of the present disclosure. In this regard, functions and detailed descriptions of components not separately mentioned below refer to the descriptions of the previous embodiments. In addition, in the following drawings, the same reference numerals are used for the same components as those in the previous embodiments.

Referring to FIGS. 7, 8, and 9 together, the photoacoustic measuring apparatus 4 may include a first housing 71, a light source 11, the light source driver 41, a first optical element 12a, a second housing 72, an ultrasonic sensor 21, a battery 61, and a casing 70.

The first housing 71 provides an inner space for accommodating a light source and an optical element therein, and functions as a basic structure for arrangement and protection of the optical system. In some cases, the first housing 71 may be referred to as an optical unit housing.

According to an embodiment, the first housing 71 may receive the light source 11 therein, and may further receive therein one or more first optical elements 12a necessary to guide the light generated from the light source 11 and adjust optical properties thereof. In addition, according to an embodiment, the first housing 71 may further receive therein the light source driver 41 for driving the light source 11. In one example, according to an embodiment, the first housing 71 may receive therein the light source 11 and one or more first optical elements 12a, but may not receive therein the light source driver 41.

The first housing 71 may include a first optical opening 131 so that light emitted from the light source 11 may be finally emitted from the first housing 71 toward the measurement target 90. In addition, the first housing 71 may further include a port 712 formed to be electrically connected to other electronic circuit elements outside the first housing 71 when the light source driver 41 is embedded therein.

The second housing 72 may provide an internal space for receiving the ultrasonic sensor 21 therein, and may fix the ultrasonic sensor 21 thereto. The ultrasonic sensor 21 may have the measurement surface acoustically contacting the measurement target 90 and detect the photoacoustic wave transmitted from the measurement target 90.

According to an embodiment, the second housing 72 may accommodate or receive a substantial portion of a body of the ultrasonic sensor 21 except for the measurement surface or an output port of the ultrasonic sensor 21 in the internal space thereof, and may fix the ultrasonic sensor 21 thereto. According to an embodiment, even when the substantial portion of the body of the ultrasonic sensor 21 is not accommodated in the inner space thereof, the second housing 72 may fix at least the ultrasonic sensor 21 such that the ultrasonic sensor 21 is not acoustically coupled with the first housing 71 and is maintained to be spaced therefrom, and furthermore, may fix the ultrasonic sensor 21 so as not to be removed from the measurement position on the measurement target 90 during measurement.

The casing 70 may accommodate the first housing 71, the second housing 72, and the electronic circuit element therein. According to an embodiment, the casing 70 may be formed such that a portion of the first housing 71 or the second housing 72 is exposed to the outside out of the casing 70. For example, a portion of the second housing 72 may be exposed to the outside so that the light generated from the light source 11 may be incident on the measurement target 90, for example, the skin at a predetermined incident angle, for example, at a right angle, and so that the ultrasonic sensor 21 may be in direct close contact with the measurement target 90, for example, the skin.

According to an embodiment, the first housing 71 and the second housing 72 may be acoustically coupled with each other. That is, the first housing 71 and the second housing 72 may be in surface contact or in point contact with each other, directly, or indirectly while another object is therebetween, such that vibration, sound, noise, elastic wave, or any other type of mechanical waves may be propagated therebetween.

Further, the light source driver 41 mounted inside the first housing 71 may generate a pulse current having a predetermined peak voltage value, a peak current value, a pulse width, and a pulse period in order to pulse-drive the light source 11. For example, the light source driver 41 may generate a pulse current having a peak voltage of 1V to 710V, a peak current of 0.1 A to 71A, a pulse width of 0.05 μs to 710 ms, and a pulse period of 0.1 ms to 1 s to drive the light source 11 with the pulse current. Such a pulse current may cause a weak but measurable level of mechanical vibration in various circuit elements.

In addition, a portion of the light energy emitted from the light source 11 is lost even before leaving the first housing 71. A local photoacoustic phenomenon or thermal unbalance that may occur inside the first optical element 12a or the first housing 71 in connection with this loss may also cause fine mechanical vibration.

In addition, according to an embodiment, even when the light source driver 41 is mounted outside the first housing 71, it is generally advantageous that the light source driver 41 is located close to the light source 11. Further, because the light source driver 41 should be physically connected to the light source 11 via an electric wire, the vibration generated from the light source driver 41 may be easily propagated to the first housing 71 surrounding the light source 11 when the light source driver 41 is located close to the light source 11.

Under these various conditions, the mechanical vibration of the first housing 71 is likely to be detected by the ultrasonic sensor when the ultrasonic sensor is directly mounted on the first housing 71. Accordingly, the acoustic signal measured by the ultrasonic sensor may include not only an intended photoacoustic signal resulting from the irradiation of light to the measurement target 90 but also an unintended mechanical vibration. The unintended mechanical vibration may act as noise and adversely affect the signal-to-noise ratio of the acoustic signal to be measured. In particular, this becomes more serious in an application that measures a weak sound signal such as a photoacoustic wave.

Accordingly, in order to prevent or minimize the unintended mechanical vibration from being detected by the ultrasonic sensor 21, in the present embodiment, a first material constituting the first housing 71 may be selected to be different from a second material constituting the second housing 72. Specifically, each of the first material and the second material may be selected such that the specific acoustic impedance of the first material constituting the first housing 71 is greater than the specific acoustic impedance of the second material constituting the second housing 71.

In another embodiment, the first material and the second material may be individually selected such that the specific acoustic impedance of the first material constituting the first housing 71 is smaller than the specific acoustic impedance of the second material constituting the second housing. In this way, setting the difference between the specific acoustic impedance values of the first material and the second material to be sufficiently greater may allow impedance mismatching between the two materials to occur, thereby suppressing the unnecessary transmission of the mechanical wave.

In this regard, the specific acoustic impedance or the acoustic characteristic impedance may be defined as follows.

(1) Specific acoustic impedance (Z)=sound velocity in material (c)×material density (p)

(2) Acoustic impedance (z)=specific acoustic impedance (Z)*area(S)

At the boundary between objects made of two materials having different specific acoustic impedances Z, mechanical waves such as vibration transmit through or are reflected from the boundary surface. In this regard, a transmission coefficient T and a reflection coefficient R may be defined as follows.

$$T = \frac{2Z_2}{Z_1 + Z_2}$$

$$R = \frac{Z_2 - Z_1}{Z_2 + Z_1}$$

In this regard, $Z_1$ denotes the specific acoustic impedance of the first material of the first housing 71, and $Z_2$ denotes the specific acoustic impedance of the second material of the second housing 72.

Specifically, when a mechanical wave such as vibration propagates from the first housing 71 of the first material to the second housing 72 of the second material, and the amount thereof absorbed in the propagation process is ignored, the mechanical wave may be reflected from the boundary surface by approximately the percentage corresponding to the reflection coefficient R and may return to the first housing 71, and may be transmitted to the second housing 72 through the boundary by approximately the percentage corresponding to the transmission coefficient T. Accordingly, as the difference between $Z_1$ and $Z_2$ increases, the percentage thereof by which the mechanical wave is reflected therefrom increases and the percentage thereof by which the mechanical wave transmits therethrough decreases, so that the phenomenon in which the unintended vibration is transmitted to the ultrasonic sensor 21 may be effectively suppressed.

According to an embodiment, the first and second materials may be selected to attenuate by 3 dB or greater until the mechanical wave generated from the first housing 71 is transmitted to the second housing 72. In this regard, the attenuation of 3 dB or greater means that the energy transferred to the second housing is reduced to 2/1 or smaller of the vibration energy generated in the first housing. In addition, according to an embodiment, the first and second materials may be selected such that the transmittance coefficient T of the vibration from the first housing 71 to the second housing 72 is 0.5 or lower. This means that half or smaller of the mechanical waves generated from the first housing is transmitted to the second housing, and the remaining amount thereof is reflected from or extinguished at the boundary surface.

When each of the first material and the second material is selected so that the specific acoustic impedance of the first material of the first housing 71 is greater than the specific acoustic impedance of the second material constituting the second housing, the first material may be selected from, for example, aluminum, alumina, aluminum alloy, stainless steel, carbon steel, magnesium, magnesium alloy, titanium, and titanium alloy, but is not limited to the listed materials. In one example, the specific acoustic impedance of aluminum 1100-0 at room temperature is about $17.1\ 10^6\ kg/m^2\ s$ (hereinafter, unit $10^6\ kg/m^2\ s$ is denoted as MRy), the specific acoustic impedance of aluminum 2024-T4 is about 17.6 MRy, the specific acoustic impedance of stainless steel 304 is about 44.6 to 45.4 MRy, and the specific acoustic impedances of the AZ31B magnesium alloy, tin, and zinc are known as 10.32 MRy, 24.2 MRy, and 29.6 MRy, respectively.

The second material may be selected from, for example, synthetic resin, epoxy, silicone, rubber, and acryl, but is not limited to the listed materials. In one example, the specific acoustic impedance at room temperature is known as about 2.3 MRy for ABS resin, about 2.7 MRy for polycarbonate, about 2.9 MRy for polyethylene, about 2.3 MRy for polypropylene, about 6.4 MRy for boron epoxy, about 1.4 MRy for silicone rubber, about 1.7 MRy for natural rubber, and about 3.2 MRy for acryl. According to an embodiment, the second material may further have heat insulation, flame retardancy, non-flammability, or fire retardancy.

For example, when the unintended mechanical wave propagates from the first housing 71 made of aluminum to the second housing 72 made of ABS resin, the transmittance coefficient T thereof may be about 0.24 and attenuation of about 12.4 dB may be expected. In another example, when the first housing 71 is made of stainless steel and the second housing 72 is made of ABS resin, the transmission coefficient T thereof may be about 0.098 and attenuation of about 20.2 dB may be obtained.

Alternatively, when the first material and the second material are individually selected such that the specific acoustic impedance of the first material of the first housing 71 is smaller than the specific acoustic impedance of the second material of the second housing, the first material may be selected from, for example, synthetic resin, epoxy, silicon, rubber, and acryl, and the second material may be selected from, for example, aluminum, alumina, aluminum alloy, stainless steel, carbon steel, magnesium, magnesium alloy, titanium, and titanium alloy. However, the first and second materials are not limited to the listed materials.

According to an embodiment, the first material may further have heat insulation, flame retardancy, non-flammability, or fire retardancy.

For example, when the unintended mechanical wave propagates from the first housing 71 made of ABS resin to the second housing 72 made of aluminum, the transmittance coefficient T thereof may be about 0.24 and attenuation of about 12.4 dB may be expected. In another example, when the first housing 71 is made of ABS resin and the second housing 72 is made of stainless steel, the transmittance coefficient may be about 0.098 and attenuation of about 20.2 dB may be obtained.

Therefore, a photoacoustic measuring apparatus 4 according to the embodiments may be less affected by the mechanical wave generated from the light source driver or the light source, and may more accurately measure the intended photoacoustic signal from the measurement target.

In one example, the ultrasonic sensor 21 may have directivity according to an internal structure, and may have an acoustic axis along a direction in which the directivity is greatest. According to an embodiment, the ultrasonic sensor 21 may be oriented such that the acoustic axis thereof is parallel to the incident direction of light incident on the measurement target 90, or may be oriented such that the acoustic axis thereof faces the photoacoustic wave generating area inside the measurement target 90.

According to an embodiment, the second housing 72 may further include an optical tube 723 that provides a light path 14 from the first optical opening 131 to the second optical opening 132 so that the light emitted from the light source 11 passes through the first optical opening 131 and is then guided to the measurement target 90 such as, for example, skin. For example, the optical tube 723 may provide the optical path 14, which is a cylindrical or truncated conical empty space, between the first optical opening 131 of the first housing 71 and the measurement target 90.

According to an embodiment, the direction of the central axis of the optical tube 723 may substantially coincide with the direction of the acoustic axis of the ultrasonic sensor 21 accommodated in the second housing 72. In other words, the central axis of the optical tube 723 and the acoustic axis of the ultrasonic sensor 21 may be parallel to each other.

Accordingly, even though the optical characteristics, acoustic characteristics, light incident conditions, external environment, etc. of the measurement target 90 vary depending on the application, a design of the second housing 72 may be changed instead of totally redesigning the first housing 71 and the internal first optical elements 12a, thereby coping with the variation.

According to an embodiment, a second optical element 12b capable of adjusting optical properties of the light generated from the light source 11 while the light passes through the optical path 14 may be further provided in the second housing 72. For example, the second optical element 12b may be one or a combination of two or more of a lens, a zoom lens, a reflective mirror, a dichroic mirror, a beam splitter, a polarizing beam splitter, a prism, an optical fiber, a grating, and a polarizing plate.

According to an embodiment, the second housing 72 may further include an optically transparent cover 725 to protect the optical path 14 and further protect the first optical opening 131. The cover 725 may be appropriately coated with a coating material to block UV rays or prevent fogging.

FIGS. 10 to 15 are schematic cross-sectional views illustrating modified examples of some embodiments of the present disclosure.

Figure 10:
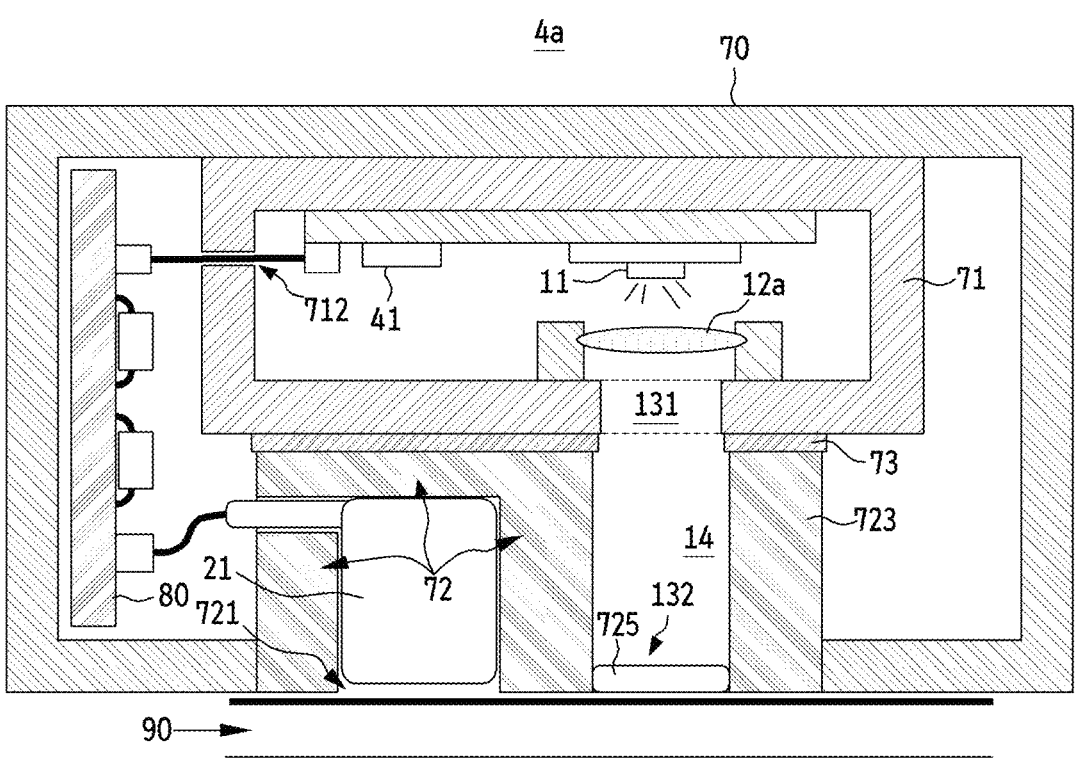
FIGS. 10 to 15 are schematic cross-sectional views illustrating modified examples of some embodiments of the present disclosure.

FIG. 10 is a schematic cross-sectional view illustrating a structure in which a first housing and a second housing are joined to each other via an intermediate layer in a photoacoustic measuring apparatus according to embodiments.

Referring to FIG. 10, a photoacoustic measuring apparatus 4a according to the embodiments may include the first housing 71, the light source 11, the light source driver 41, the first optical element 12a, the second housing 72, the ultrasonic sensor 21, the casing 70, and an intermediate layer 73.

The intermediate layer 73 may be interposed between at least portions of respective surfaces facing each other of the first housing 71 and the second housing 72. According to an embodiment, the intermediate layer 73 may be selected from materials having a specific acoustic impedance capable of acoustically decoupling the first housing 71 and the second housing 72 from each other. For example, the material of the intermediate layer 73 may be selected such that the transmission coefficient thereof with respect to each of the material of the first housing 71 and the material of the second housing 72 is 0.5 or smaller, or a total transmission coefficient thereof with respect to a combination of the material of the first housing 71 and the material of the second housing is 0.5.

According to an embodiment, the intermediate layer 73 may be selected from materials having the specific acoustic impedance acoustically decoupled from the first housing 71 and acoustically coupled with the second housing 72. For example, the material of the intermediate layer 73 may be selected such that the transmission coefficient thereof with respect to the material of the first housing 71 is 0.5 or smaller, whereas the transmission coefficient thereof with respect to the material of the second housing 72 is 0.5 or greater.

According to an embodiment, the intermediate layer 73 may be selected from adhesive materials capable of permanently or temporarily bonding the second housing 72 to the first housing 71. For example, the intermediate layer 73 may be acoustically decoupled from the first housing 71 and acoustically coupled with the second housing 72 after the selected adhesive material exhibits adhesive properties.

According to an embodiment, the intermediate layer 73 may be selected from a thermal insulating material or a refractory material that blocks heat transfer between the first housing 71 and the second housing 72.

According to an embodiment, the intermediate layer 725 may be one of a synthetic resin film, a rubber plate, a sound absorbing film, an acoustic meta material, an adhesive film, a fabric, a nonwoven fabric, an insulating film, and a refractory film, or a combination thereof.

According to an embodiment, when the first material or the second material is made of aluminum, magnesium, or titanium, the first housing 71 or the second housing 72 may have an oxide film formed on its surface through anodizing treatment. In this case, since the specific acoustic impedance of the oxide film is about 40 MRy, the oxide film may acoustically decouple the first housing 71 and the second housing 72 from each other and thus function as the intermediate layer 73.

Figure 11:
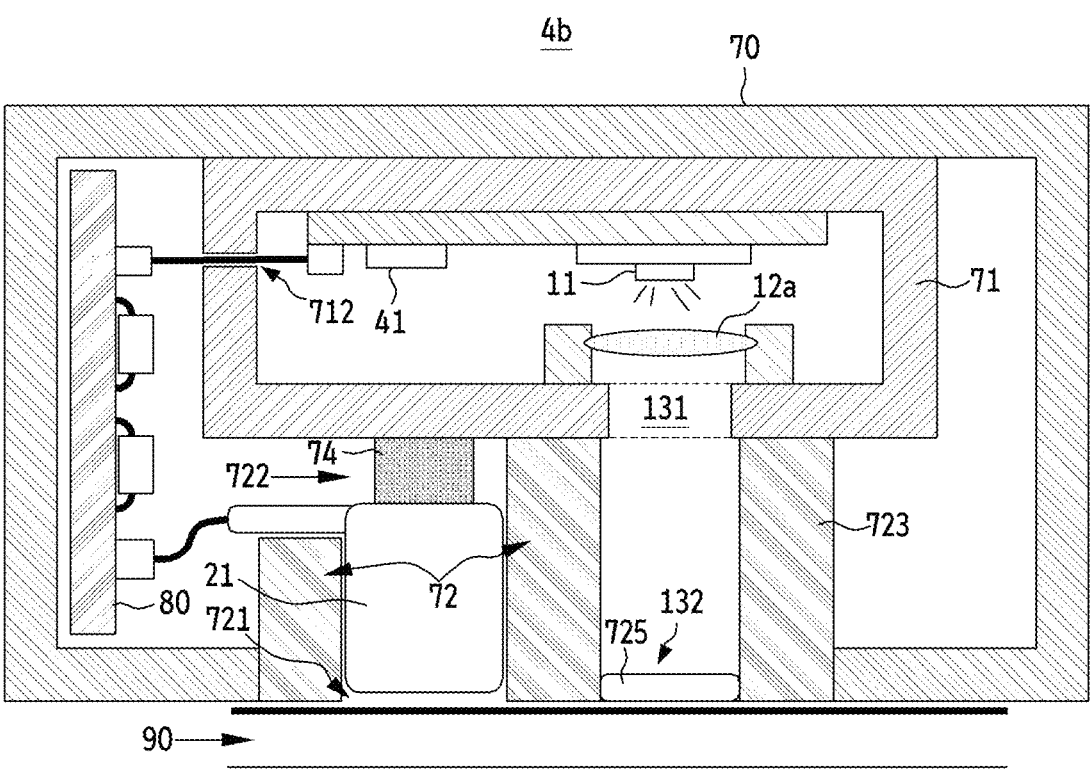

FIG. 11 is a schematic cross-sectional view illustrating a structure in which a shock-absorbing member is interposed between the first housing and the ultrasonic sensor when the first housing and the second housing are joined to each other in the photoacoustic measuring apparatus according to some embodiments of the present disclosure.

Referring to FIG. 11, a photoacoustic measuring apparatus 4b according to the embodiments may include the first housing 71, the light source 11, the light source driver 41, the first optical element 12*a*, the second housing 72, the ultrasonic sensor 21, the casing 70, and a shock-absorbing member 74.

The shock-absorbing member 74 may be constructed such that one side thereof is in close contact with the first housing 71 and the other side thereof is in close contact with the ultrasonic sensor 21 through an opening 722 of the second housing 72 to fix the ultrasonic sensor 21 so that the ultrasonic sensor 21 may maintain its posture without being removed from the measurement position during the measurement of the photoacoustic measuring apparatus 4. For example, the second housing 72 may include the opening 722 through which the ultrasonic sensor 21 is inserted into the accommodation space therein. The ultrasonic sensor 21 may be mounted in the accommodation space in the second housing 72 through the opening 722 and the shock-absorbing member material 74 may be used as a means for fixing the ultrasonic sensor 21.

In some embodiments, the shock-absorbing member material 74 may be selected from materials having a specific acoustic impedance capable of acoustically decoupling the first housing 71 and the second housing 72 from each other. For example, the material of the shock-absorbing member material 74 may be selected such that he transmission coefficient thereof with respect to each of the material of the first housing 71 and the material of the second housing 72 is 0.5 or smaller, or a total transmission coefficient thereof with respect to a combination of the material of the first housing 71 and the material of the second housing is 0.5.

According to an embodiment, the shock-absorbing member material 74 may be selected from materials having a specific acoustic impedance acoustically decoupled from the first housing 71 and acoustically coupled with the second housing 72. For example, the material of the shock-absorbing member 74 may be selected such that the transmission coefficient thereof with respect to the material of the first housing 71 is 0.5 or smaller, whereas the transmission coefficient thereof with respect to the material of the second housing 72 is 0.5 or greater.

According to an embodiment, the shock-absorbing member material 74 may be one of a synthetic resin, rubber, a sound absorbing material, an acoustic meta material, an thermal insulating material, a fire-resistant material, or a combination thereof.

Figure 12:
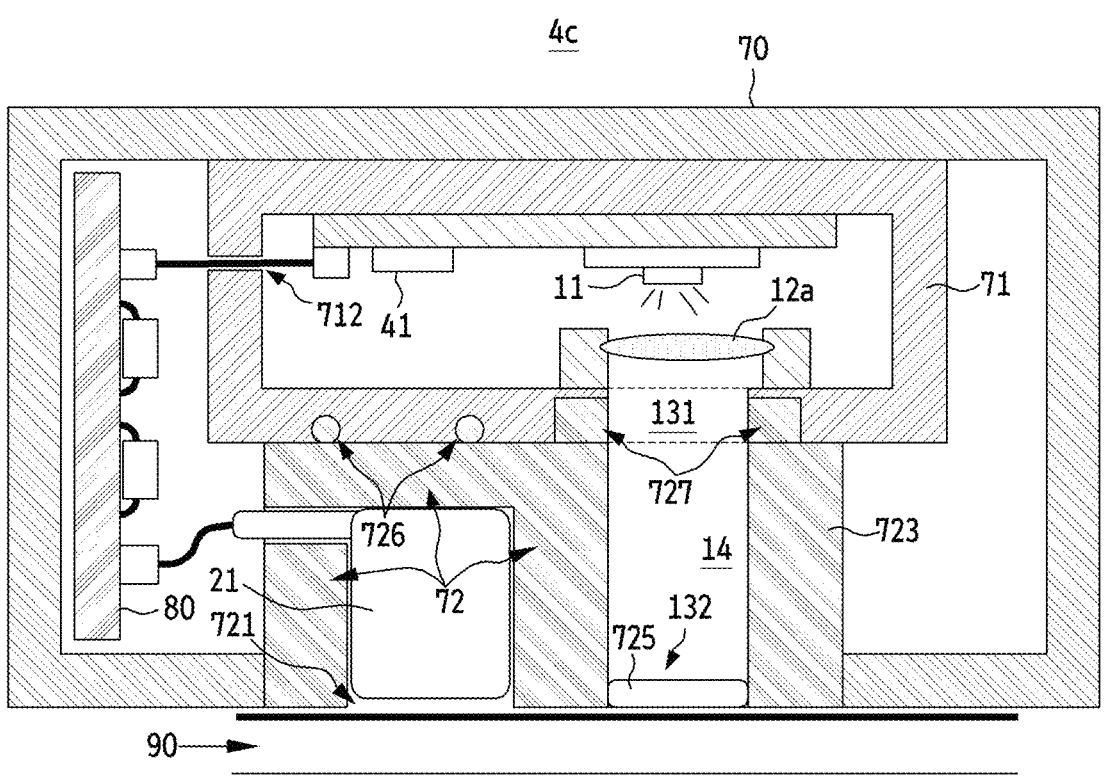

FIG. 12 is a schematic cross-sectional view illustrating a structure in which a first housing and a second housing are mechanically joined to each other in a photoacoustic measuring apparatus according to some embodiments of the present disclosure.

Referring to FIG. 12, a photoacoustic measuring apparatus 4*c* according to the embodiments may include the first housing 71, the light source 11, the light source driver 41, the first optical element 12*a*, the second housing 72, the ultrasonic sensor 21, and the casing 70, and the first housing 71 and the second housing 72 may be mechanically fastened to each other by a fastener 726 and 727. For example, the fastener 726 and 727 may be implemented in a well-known fastening manner such as elastic fastening, insertion fastening, screw fastening, or the like.

Figure 13:
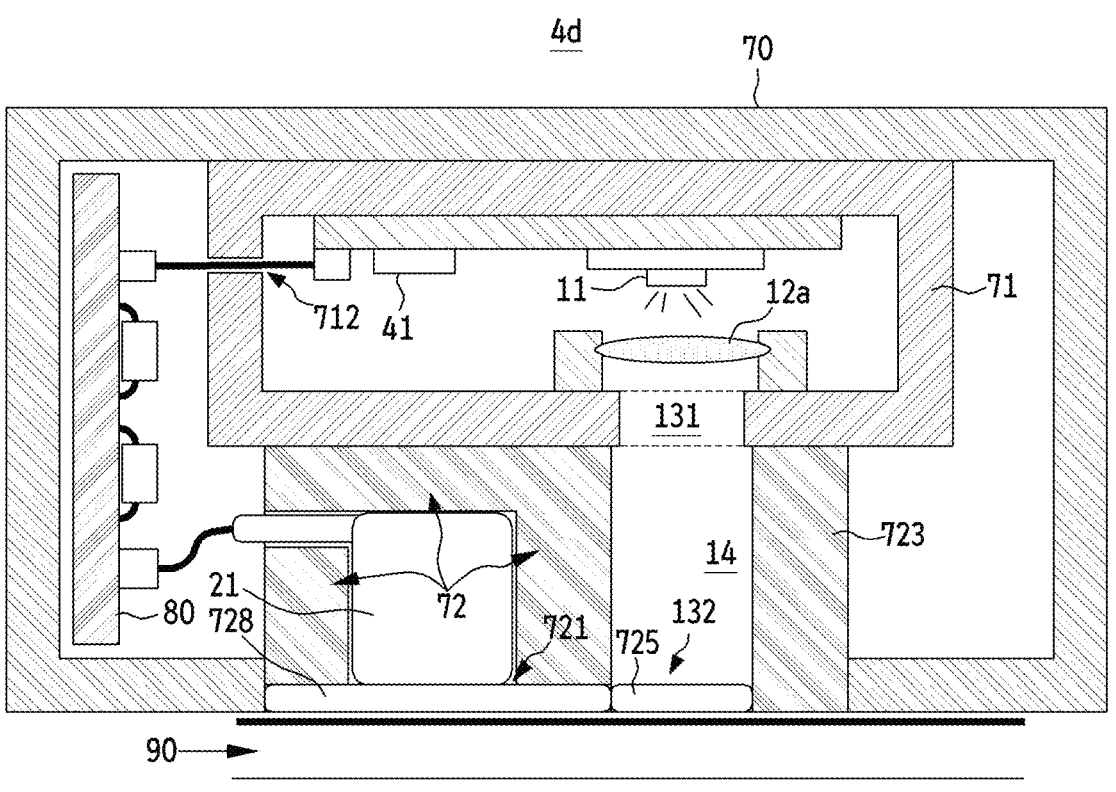

FIG. 13 is a schematic cross-sectional view illustrating a structure for providing an acoustic coupling between an ultrasonic sensor and an measurement target when a first housing and a second housing are joined to each other in a photoacoustic measuring apparatus according to some embodiments of the present disclosure.

Referring to FIG. 13, a photoacoustic measuring apparatus 4*d* according to some embodiments of the present disclosure may include the first housing 71, the light source 11, the light source driver 41, the first optical element 12*a*, the second housing 72, the optical tube 723, an acoustic coupler 728, the ultrasonic sensor 21, and the casing 70.

The acoustic coupler 728 may provide acoustic impedance matching between the ultrasonic sensor 21 and the measurement target 90. To this end, a fourth material constituting the acoustic coupler 728 may be selected as a material having a specific acoustic impedance value smaller than the specific acoustic impedance of the ultrasonic sensor 21 and greater than the specific acoustic impedance of the measurement target 90.

In some embodiments, instead of the cover 725, the acoustic coupler 728 may extend to the second optical opening 132 to serve as the cover 725. In some embodiments, the cover 725 may extend to the measurement opening 721 of the ultrasonic sensor 21 to serve as the acoustic coupler 728.

Figure 14:
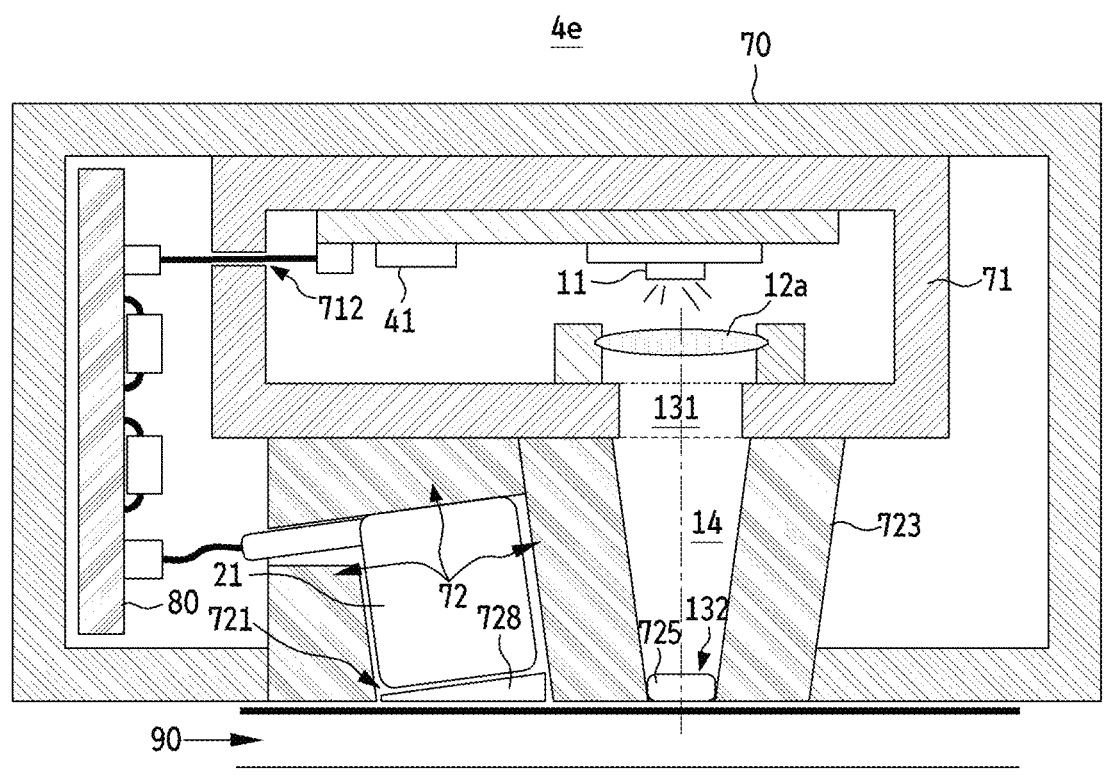

FIG. 14 is a schematic cross-sectional view illustrating a structure in which the optical axis and the acoustic axis of the ultrasonic sensor are not parallel to each other when the first housing and the second housing are joined to each other in the photoacoustic measuring apparatus according to embodiments.

Referring to FIG. 14, a photoacoustic measuring apparatus 4*e* according to the embodiments may include the first housing 71, the light source 11, the light source driver 41, the first optical element 12*a*, the second housing 72, the optical tube 723, the acoustic coupler 728, the ultrasonic sensor 21, and the casing 70.

The central axis of the optical tube 723 and the acoustic axis of the ultrasonic sensor 21 accommodated in the second housing 72 may be oriented to intersect with each other at the incident surface of the measurement target 90 such as the skin or the inside thereof. In contrast, in the embodiments illustrated in FIGS. 9 to 13 and 15, the central axis of the optical tube 723 and the acoustic axis of the ultrasonic sensor 21 in the second housing 72 may be substantially parallel to each other.

According to an embodiment, the optical tube 723 may be implemented in a cylindrical shape so that the cross-sectional area of the inner hollow of the optical tube is constant, or may be implemented in a truncated conical shape in which the cross-sectional area of the inner hollow of the optical tube is gradually reduced in a tapered manner.

According to an embodiment, the central axis of the optical tube 723 may intersect the measurement target e 90 at a right angle, and the acoustic axis of the ultrasonic sensor 21 may be inclined to intersect the central axis of the optical tube 723 in the measurement target 90, in other words, toward the photoacoustic wave generating area (not shown) in the measurement target 90.

The acoustic coupler 728 may provide acoustic impedance matching between the ultrasonic sensor 21 and the measurement target 90. To this end, the fourth material constituting the acoustic coupler 728 may be selected as a material having a specific acoustic impedance value smaller than the specific acoustic impedance of the ultrasonic sensor 21 and greater than the specific acoustic impedance of the measurement target 90. The acoustic coupler 728 may be implemented in a round wedge shape fitting into the space between the measurement opening 711 and the measurement target 90.

Figure 15:
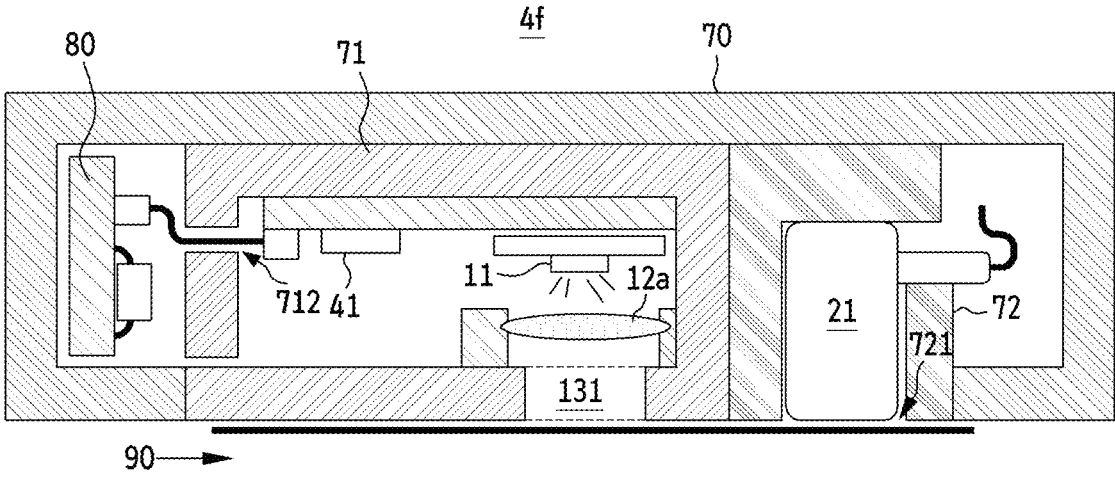

FIG. 15 is a schematic cross-sectional view illustrating a structure in which a first housing and a second housing are joined to each other in a photoacoustic measuring apparatus according to further embodiments.

Referring to FIG. 15, a photoacoustic measuring apparatus 4f according to the embodiments may include the first housing 71, the light source 11, the light source driver 41, the first optical element 12a, the second housing 72, the ultrasonic sensor 21, an electronic circuit elements 80, and the casing 70.

According to an embodiment, the second housing 72 and the first housing 71 may be arranged in a line and side by side such that the measurement surface of the ultrasonic sensor 21 is coplanar with the first optical opening 131.

The photoacoustic measuring apparatus 4f is compared with the photoacoustic measuring apparatuses 4a to 4e of FIGS. 10 to 14. In the photoacoustic measuring apparatuses 4a to 4e, light emitted from the light source 11 is incident on the measurement target 90 through the first optical opening 131 and the optical path 14, the ultrasonic sensor 21 and the optical path 14 are arranged side by side and close proximity to each other, and there is only a partition wall of the second housing 72 between the optical path 14 and the ultrasonic sensor 21. Accordingly, when other conditions are the same, in the photoacoustic measuring apparatuses 4a to 4e, a distance between the ultrasonic sensor 21 and the photoacoustic wave generating area may be more advantageous in terms of the photoacoustic measurement, compared to the photoacoustic measuring apparatus 4f. On the other hand, when other conditions are the same, the photoacoustic measuring apparatus 4f may be advantageous for miniaturization compared to the photoacoustic measuring apparatuses 4a to 4e.

According to the above-described embodiment, the first housing and the second housing are selected to be made of different materials, such that photoacoustic detection performance robust to noise may be secured even in a miniaturized form factor.

Next, further embodiments of a photoacoustic measuring apparatus that has an optimized optical path and geometry based on a miniaturized form factor and a compact optical system to maximize photoacoustic detection performance will be described in detail.

Figure 16:
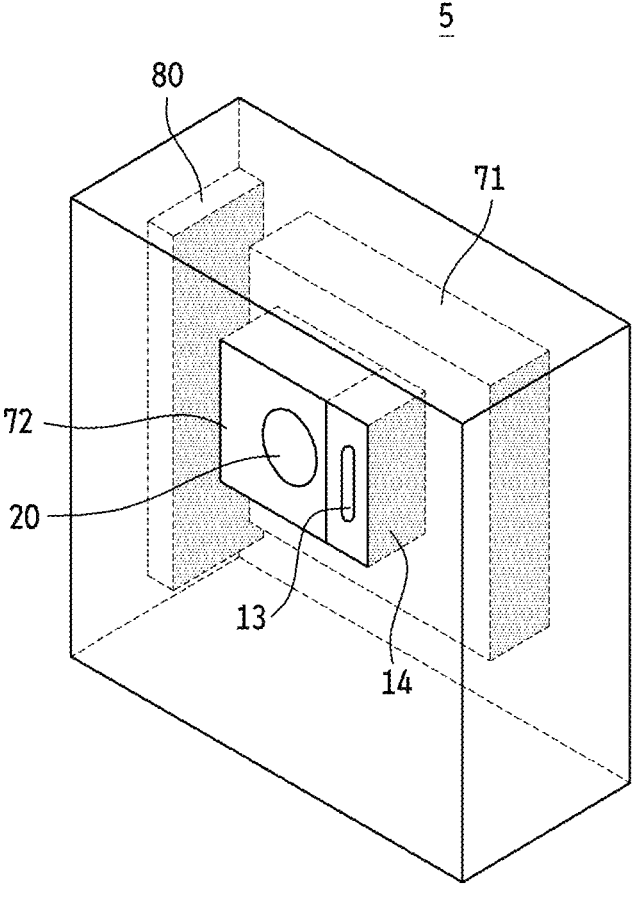
FIG. 16 is a schematic perspective view illustrating a photoacoustic measuring apparatus according to some still further embodiments of the present disclosure.
Figure 17:
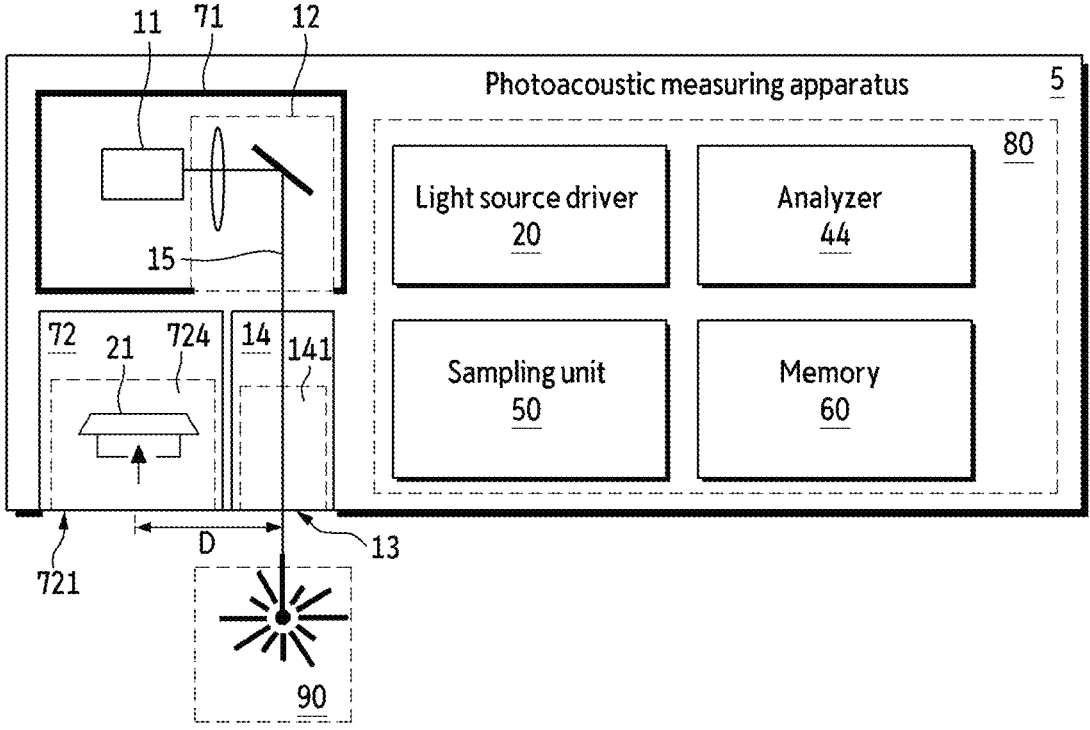
FIG. 17 is a schematic block diagram illustrating a photoacoustic measuring apparatus according to some still further embodiments of the present disclosure.

FIG. 16 is a schematic perspective view illustrating a photoacoustic measuring apparatus according to some still further embodiments of the present disclosure, and FIG. 17 is a schematic block diagram illustrating a photoacoustic measuring apparatus according to some still further embodiments of the present disclosure.

Referring together to FIGS. 16 and 17, a photoacoustic measuring apparatus 5 may include a light source unit housing 71, a light source 11, an optical element 12, a light source driver 721, a light path 14, an optical opening 31, a light path space 1721, a sensor housing 72, a measurement opening 721, a sensor receiving space 724, the ultrasonic sensor 21, a sampling unit 45, the memory 43, and the analyzer 44. In the following description, duplicate descriptions of the same components as those in the previous embodiments will be omitted or briefly set forth.

The light source unit housing 71 may have the light source 11 embedded therein. Since the light source unit housing of the present embodiment has substantially the same function and structure as those of the first housing of the previous embodiment, the light source unit housing and the first housing are denoted as the same reference numeral 71. According to an embodiment, the light source unit housing 71 may also include the light source driver 721 for driving the light source 11. The light source driver 721 may drive the light source 11 by supplying power to the light source 11 with a predetermined light output and light emission time. According to an embodiment, the light source 11 may include a plurality of light sources, for example, two light sources, and a detailed description thereof will be described later.

The one or more optical elements 12 are optical devices necessary to guide light generated from the light source 11 and adjust optical properties thereof, and may be disposed to focus light onto the surface of the measurement target or the photoacoustic wave generating area inside the measurement target. The optical element 12 is, for example, one or a combination of two or more of optical elements such as a lens, a zoom lens, a reflective mirror, a dichroic mirror, a beam splitter, a prism, an optical fiber, a grating, a polarizing plate, and the like, and is not limited to the elements listed herein.

According to an embodiment, the light source unit housing 71 may receive therein the one or more optical elements 12. According to an embodiment, the light source unit housing 71 may receive therein the light source 11 and the one or more optical elements 12, but may not receive therein the light source driver 721.

The light path 14 may guide the beam 15 of light transmitted through the opening of the light source unit housing 71 and emit the beam through the optical opening 31 open toward the measurement target 90. An optical path space 141 in the optical path 14 is preferably optically transparent, but does not necessarily have to be an empty space, and may be, for example, an optical guide of an optical glass material.

The sensor housing 72 has a measurement opening 721 that is acoustically open toward the measurement target 90, and may accommodate and fix the ultrasonic sensor 21 in a sensor receiving space 724 therein. Since the sensor housing of the present embodiment has substantially the same function as the second housing of the previous embodiment, both are denoted as the same reference numeral 72.

According to an embodiment, the sensor housing 72 may receive or contain a substantial portion of the body of the ultrasonic sensor 21 except for the measurement surface of the ultrasonic sensor 21 in the sensor accommodation space 724 and fix the ultrasonic sensor 21. According to an embodiment, even when a substantial portion of the body of the ultrasonic sensor 21 is not accommodated in the sensor accommodation space 724, the sensor housing 72 may fix the ultrasonic sensor 21 so as not to be acoustically coupled with the light source unit housing 71 and to maintain a spaced state therefrom, and furthermore, may fix the ultrasonic sensor 21 so as not to be removed from the measurement position on the measurement target 90 during measurement.

According to an embodiment, the photoacoustic measuring apparatus 5 may include the sampling unit 45 configured to target the photoacoustic signal detected by the ultrasonic sensor 21 to generate sampling data, the memory 43 configured to store the sampling data therein, and an analyzer 44 configured to analyze the sampling data to obtain quantitative or qualitative information about a specific substance in the measurement target 90. Various electronic circuit elements including the above components may be embedded and implemented in a circuit board.

The photoacoustic signal is essentially an acoustic wave. Thus, it may be considered that the photoacoustic signal is reduced inversely to the distance or inversely to the square of the distance, depending on the relative geometry of the measurement position and the photoacoustic source. Accordingly, the geometry between the measurement position and the photoacoustic source and the distance D between the center of the optical opening 31 of the optical path 14 and the center of the measurement opening 721 of the sensor housing 72 may play a significant role in the performance of the photoacoustic measuring apparatus 1.

Accordingly, in the present embodiment, the present disclosure discusses schemes for optimizing the incidence of the beam 15 and reducing or optimizing the distance D between the center of the optical opening 13 and the measurement opening 721 so that attenuation of the photoacoustic wave observed at the position of the ultrasonic sensor in the photoacoustic measuring apparatus 5 is minimized.

FIGS. 18 to 22 are diagrams illustrating an arrangement relationship between an optical path space and a sensor accommodation space of a photoacoustic measuring apparatus according to some embodiments of the present disclosure. In each of the drawings of FIGS. 18 to 22, (a) is a three-dimensionally depicting the optical path space 141 and the sensor receiving space 724 of the photoacoustic measuring apparatus 5, and (b) is a diagram depicting a cross-section of A-A'.

Figure 18:
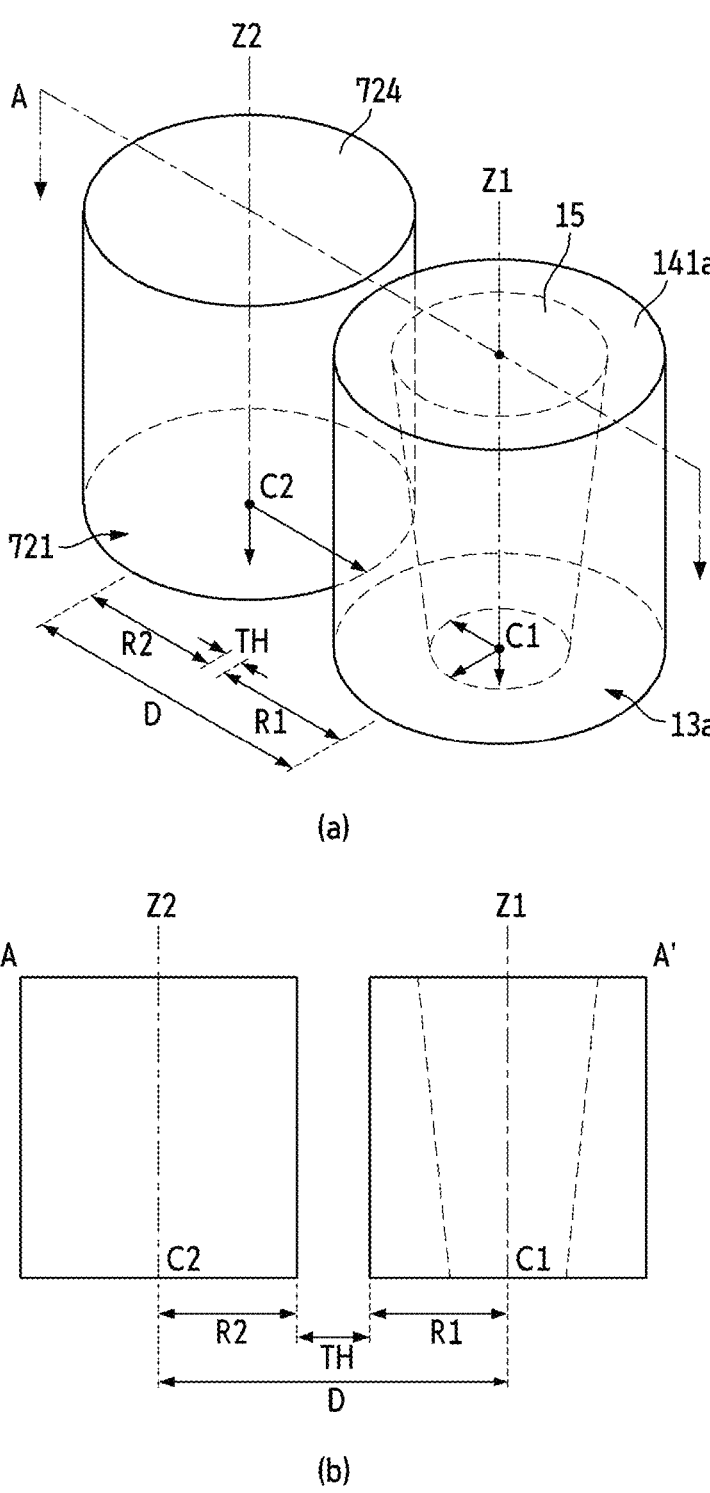
FIGS. 18 to 22 are diagrams illustrating an arrangement relationship between an optical path space and a sensor accommodation space of a photoacoustic measuring apparatus according to some embodiments of the present disclosure.

Referring to FIG. 18, each of the optical path space 141a and the sensor accommodation space 724 of the photoacoustic measuring apparatus is generally cylindrical, and each of the radii R1 and R2 and the cross-sectional areas thereof is generally constant. The beam 15 is incident on the optical path space 141a along the optical axis Z1 and is guided to the optical opening 13a. The beam 15 has a generally circular cross-section, and is condensed while traveling along the optical axis Z1 such that the shape thereof is similar to an entirely inverted truncated cone. A proportion of an area where the beam 15 does not intersect in a total area of the optical opening 13a is large.

The distance D between the center C1 of the optical opening 13a and the center C2 of the measurement opening 721 may be a value obtained by adding the radius R1 of the optical path space 141a, the radius R2 of the sensor accommodation space 724, and the thickness TH of the partition wall to each other. According to an embodiment, even though the partition wall between the optical opening 13a and the measurement opening 721 has the minimum thickness, the cross-section of the optical path space 141 may vary according to the optical axis Z1, and the thickness of the wall may be substantially zero in a partial area between the optical path space 141a and the sensor accommodation space 724.

Figure 19:
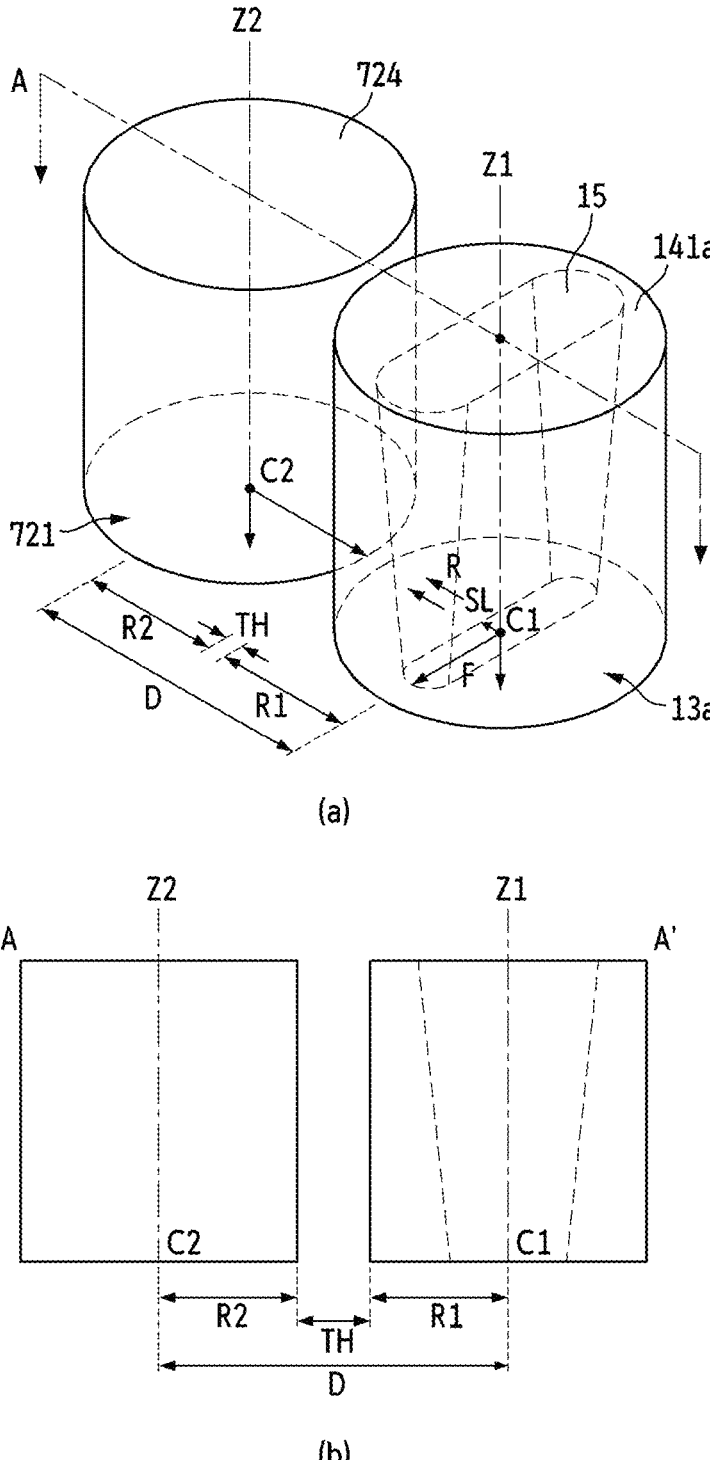

Referring to FIG. 19, each of the optical path space 141a and the sensor accommodation space 724 of the photoacoustic measuring apparatus is substantially cylindrical like FIG. 18, and each of the radii R1 and R2 and the cross-sectional areas thereof is substantially constant. A proportion of a space through which the beam 15 passes in the optical path space 141a is large.

The cross-section of the beam 15 may be referred to as an oval or a round rectangular shape rather than a circular shape, and a short axis of the beam 15 may be referred to as a slow axis SL and a long axis thereof may be referred to as a fast axis F. An optical axis Z1 of the beam 15 and the acoustic axis Z2 of the ultrasonic sensor 21 may be parallel to each other.

A cross-section of the optical path space 141a may have a major axis L coincident with the fast axis F of the cross-section of the beam 15, and a minor axis SH coincident with the slow axis SL of the cross-section of the beam 15. The distance D between the center C1 of the optical opening 31 and the center C2 of the measurement opening 721 may be a value obtained by adding the radius R1 of the optical path space 141a, the radius R2 of the sensor accommodation space 724, and the thickness TH of the partition wall to each other. According to an embodiment, even though the partition wall PW between the optical opening 13a and the measurement opening 721 has the minimum thickness, the thickness of the wall may be substantially zero in a partial area between the optical path space 141a and the sensor accommodation space 724.

The beam 15 may be guided to pass through the optical opening 13a such that a straight line between the optical axis Z1 of the optical path and the center C2 of the measurement opening 721 coincides with the slow axis SL of the cross-section of the beam 15. In this case, the photoacoustic wave generated along the fast axis F of the beam 15 among the photoacoustic waves generated when the beam 15 is incident on the measurement target 90 propagates in the radial direction R and is directed toward the sensor accommodation space 724, so that detection of the photoacoustic wave by the ultrasonic sensor 21 may be maximized.

Figure 20:
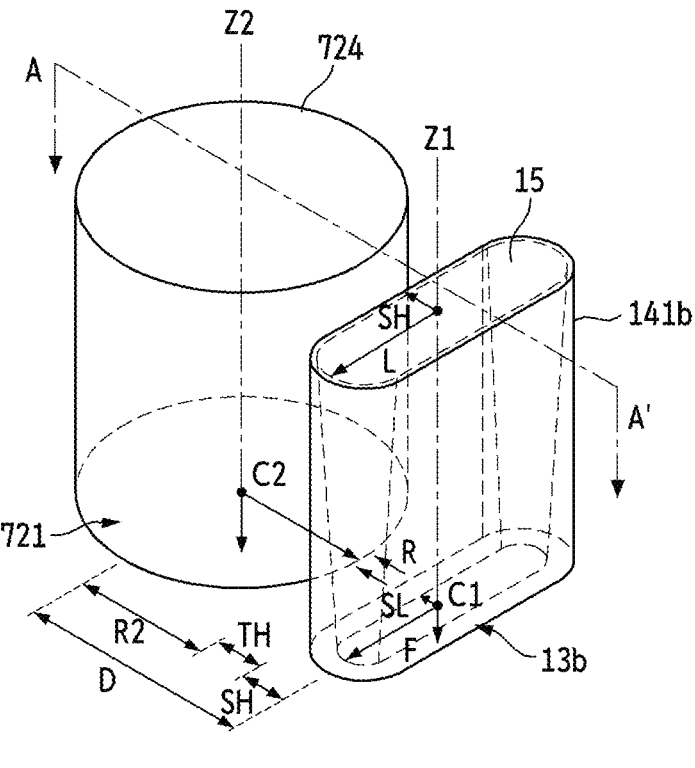
Figure 20:
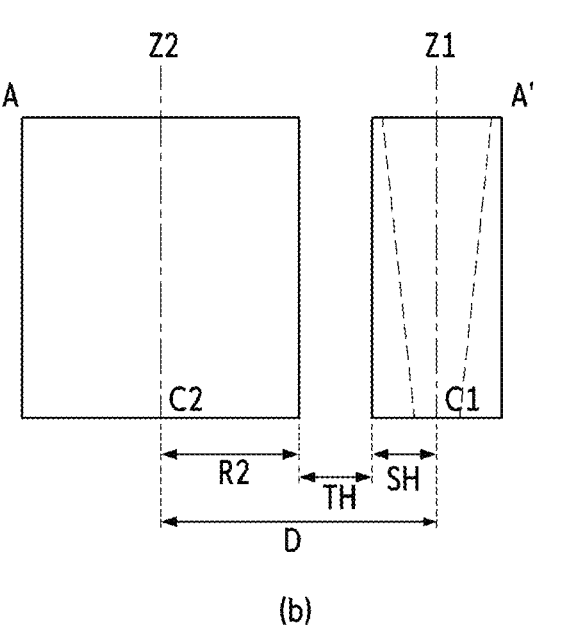

Referring to FIG. 20, the optical path space 141b of the photoacoustic measuring apparatus is generally a cylindrical shape of an elliptical cross-section or a rounded rectangular cross-section, and the cross-section may have a long axis L and a short axis SH. Compared to the optical path space 141a of FIG. 19, the optical path space 141b of FIG. 20 is conformal to the cross-sectional outline of the beam 15 while a slight clearance is defined therebetween. The cross-sectional area of the optical path space 141b may be substantially constant. The optical opening 13b is also generally oval or round rectangular. The sensor receiving space 724 is generally cylindrical, and each of the radius R2 and the cross-sectional area of the sensor receiving space 724 is generally constant. A proportion of the space through which the beam 15 does not pass in the optical path space 141b is smaller than that of FIG. 18 or 19.

The cross-section of the beam 15 may be referred to as an oval or a round rectangular shape rather than a circular shape, and the short axis of the beam 15 may be referred to as a slow axis SL and the long axis thereof may be referred to as a fast axis F. The optical axis Z1 of the beam 15 and the acoustic axis Z2 of the ultrasonic sensor 21 may be parallel to each other.

The major axis L of the cross-section of the optical path space 141b may coincide with the fast axis F of the cross-section of the beam 15, and the minor axis SH thereof may coincide with the slow axis SL of the cross-section of the beam 15. The distance D between the center C1 of the optical opening 13b and the center C2 of the measurement opening 721 may be a value obtained by adding the short axis SH of the optical path space 141b, the radius R2 of the sensor accommodation space 724, and the thickness TH of the partition wall to each other. According to an embodiment, even when the partition wall PW between the optical opening 13b and the measurement opening 721 has a thickness, the thickness may be substantially zero at least in part between the optical path space 141b and the sensor accommodation space 724.

The beam 15 may be guided to pass through the optical opening 13b such that a straight line between the optical axis Z1 of the optical path and the center C2 of the measurement opening 721 coincides with the slow axis SL of the cross-section of the beam 15. In this case, the photoacoustic wave generated along the fast axis F of the beam 15 among the photoacoustic waves generated when the beam 15 is incident on the measurement target 90 propagates in the radial direction R and is directed toward the sensor accommodation space 724, so that detection of the photoacoustic wave by the ultrasonic sensor 21 may be maximized.

Figure 21:
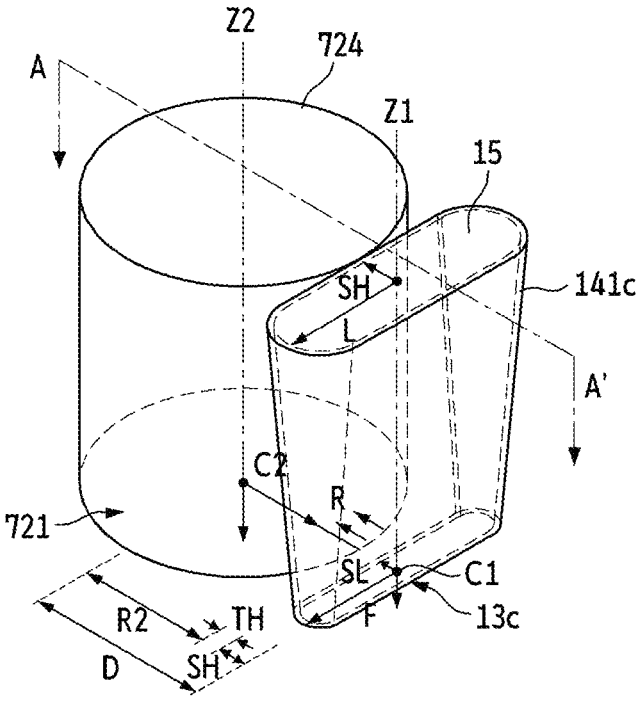
Figure 21:
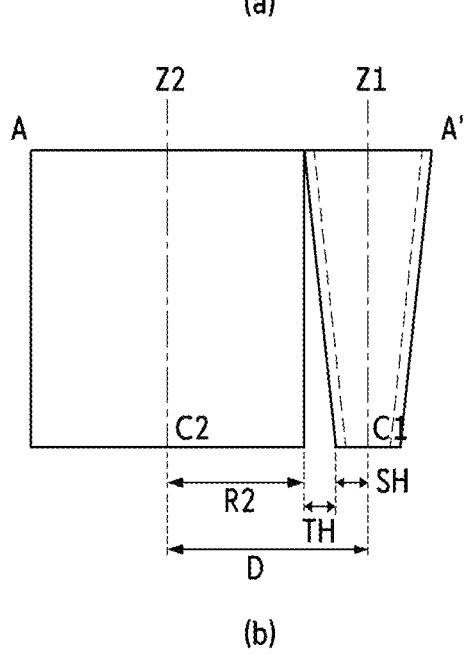

Referring to FIG. 21, the optical path space 141c of the photoacoustic measuring apparatus may have a generally elliptical cross-section or a generally rounded rectangular cross-section, and the cross-section thereof may have a long axis L and a short axis SH. Compared to the optical path space 141b of FIG. 20, the optical path space 141c of FIG. 21 is conformal to the cross-sectional outline of the beam 15 while a slight clearance is defined therebetween. In this case, the cross-sectional area of the optical path space 141c gradually decreases as the optical path space 141c extends along the traveling direction of the optical path. That is, the cross-sectional area is monotonically reduced as the optical path space 141c extends along the traveling direction.

In addition, the optical opening 13 is also generally oval or round rectangular. The sensor receiving space 724 is generally cylindrical, and the radius R2 and the cross-sectional area of the sensor receiving space 724 are generally constant. A proportion of the space through which the beam 15 does not pass in the optical path space 141c is very small compared to FIG. 18 or 19 and is also smaller than that of FIG. 20.

The cross-section of the beam 15 may be an oval or a round rectangular shape rather than a circular shape, and the short axis of the beam 15 may be referred to as a slow axis SL and the long axis thereof may be referred to as a fast axis F. The optical axis Z1 of the beam 15 and the acoustic axis Z2 of the ultrasonic sensor 21 may be parallel to each other.

The major axis L of the cross-section of the optical path space 141c may coincide with the fast axis F of the cross-section of the beam 15, and the minor axis SH thereof may coincide with the slow axis SL of the cross-section of the beam 15. The distance D between the center C1 of the optical opening 13c and the center C2 of the measurement opening 721 may be a value obtained by adding the short axis SH of the optical path space 141c, the radius R2 of the sensor accommodation space 724, and the thickness TH of the partition wall to each other.

According to an embodiment, even when the partition wall PW between the optical opening 13c and the measurement opening 721 has a thickness, the thickness may be substantially zero at least in part between the optical path space 141c and the sensor accommodation space 724.

The beam 15 may be guided to pass through the optical opening 13c such that a straight line between the optical axis Z1 of the optical path and the center C2 of the measurement opening 721 coincides with the slow axis SL of the cross-section of the beam 15. In this case, the photoacoustic wave generated along the fast axis F of the beam 15 among the photoacoustic waves generated when the beam 15 is incident on the measurement target 90 propagates in the radial direction R and is directed toward the sensor accommodation space 724, so that detection of the photoacoustic wave by the ultrasonic sensor 21 may be maximized.

Figure 22:
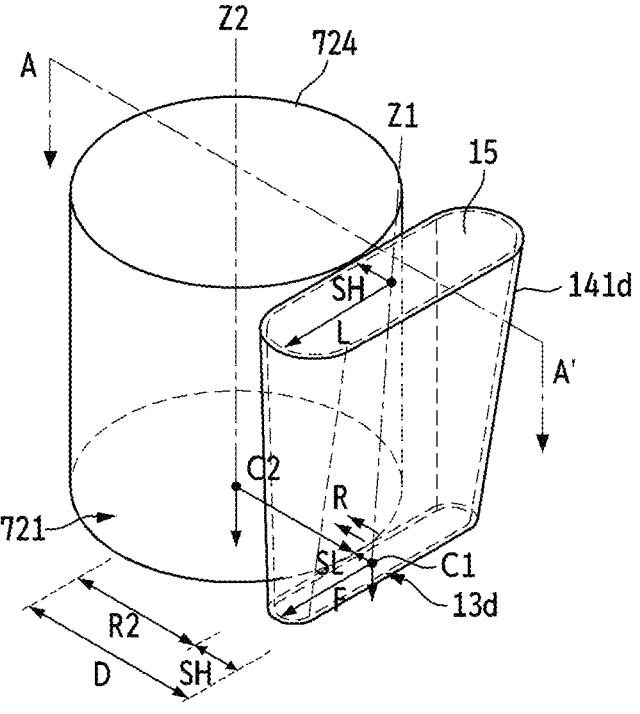
Figure 22:
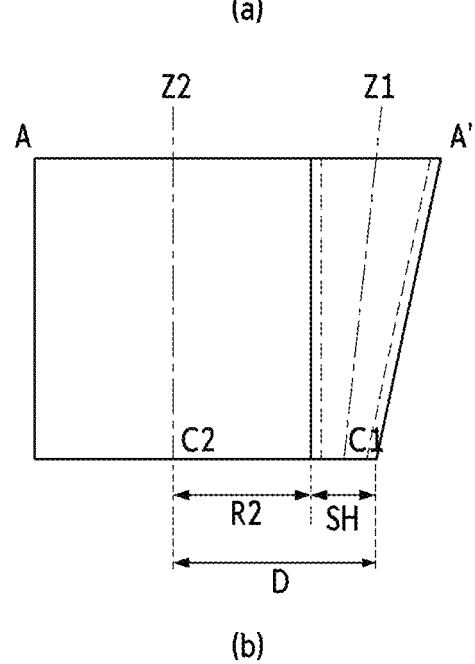

Referring to FIG. 22, the optical path space 141d of the photoacoustic measuring apparatus may have a generally elliptical cross-section or a generally rounded rectangular cross-section, and the cross-section thereof may have a long axis L and a short axis SH. Like the optical path space 141c of FIG. 21, the optical path space 141d of FIG. 22 is conformal to the cross-sectional outline of the beam 15 while a clearance is not substantially defined therebetween. The optical opening 13 is also generally oval or rounded rectangular.

The sensor accommodation space 724 is generally cylindrical, and the radius R2 and the cross-sectional area of the sensor accommodation space 724 are generally constant. A proportion of the space through which the beam 15 does not pass in the optical path space 141d is very small compared to the case of FIG. 18 or 19, and is also small compared to the case of FIG. 20 or 21.

The cross-section of the beam 15 may be an oval or a round rectangular shape rather than a circular shape, and the short axis of the beam 15 may be referred to as a slow axis SL and the long axis may be referred to as a fast axis F. Compared to the structure that the optical axis Z1 of the beam 15 of FIG. 21 is parallel to the acoustic axis Z2 of the ultrasonic sensor 21, the optical axis Z1 of the beam 15 of FIG. 22 is inclined toward the acoustic axis Z2 of the ultrasonic sensor 21.

The major axis L of the cross-section of the optical path space 141d may coincide with the fast axis F of the cross-section of the beam 15, and the minor axis SH thereof may coincide with the slow axis SL of the cross-section of the beam 15. The distance D between the center C1 of the optical opening 13 and the center C2 of the measurement opening 721 may be a value obtained by adding the minor axis SH of the optical path space 141d and the radius R2 of the sensor accommodation space 724 to each other. The thickness of the wall may be substantially zero in the entire area between the optical path space 141d and the sensor accommodation space 724.

The beam 15 may be guided to pass through the optical opening 13d such that a straight line between the optical axis Z1 and the center C2 of the measurement opening 721 coincides with the slow axis SL of the cross-section of the beam 15. In this case, compared to the case of FIG. 6, the beam 15 penetrates into a position of the measurement target 90 closer to the measurement opening 721, so that the photoacoustic wave generating area may also be closer to the measurement opening 721. In addition, the photoacoustic wave generated along the fast axis F of the beam 15 among the photoacoustic waves generated when the beam 15 is incident on the measurement target 90 propagates in the radial direction R and is directed toward the sensor accommodation space 724, so that detection of the photoacoustic wave by the ultrasonic sensor 21 may be maximized.

In one example, as described above, the light source may include a plurality of light sources, but in this case, miniaturization of the apparatus may not be achieved. Accordingly, in another embodiment of the present disclosure, a miniaturized photoacoustic measuring apparatus having a compact optical system is implemented by optimizing the position of the optical element such that the optical path is shared. Hereinafter, embodiments related thereto will be described in detail.

Figure 23:
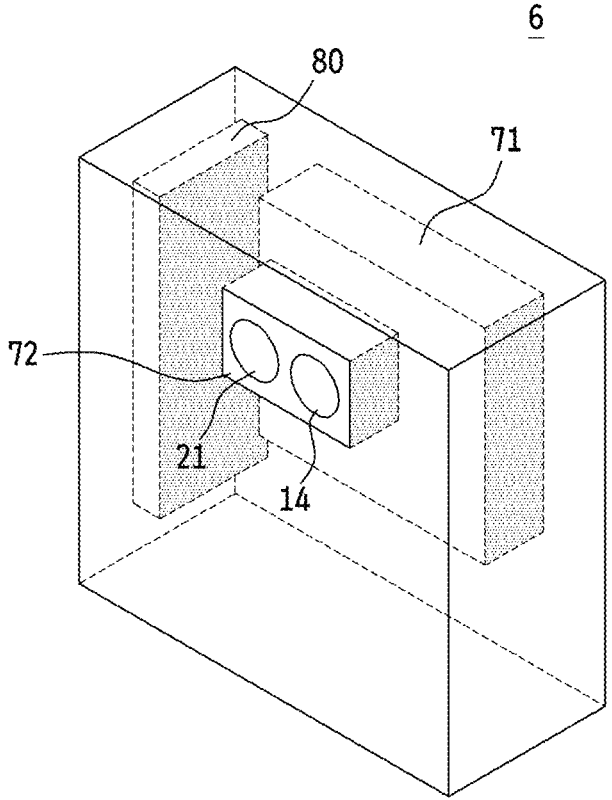
FIG. 23 is a schematic perspective view illustrating a photoacoustic measuring apparatus according to some still further embodiments of the present disclosure.
Figure 24:
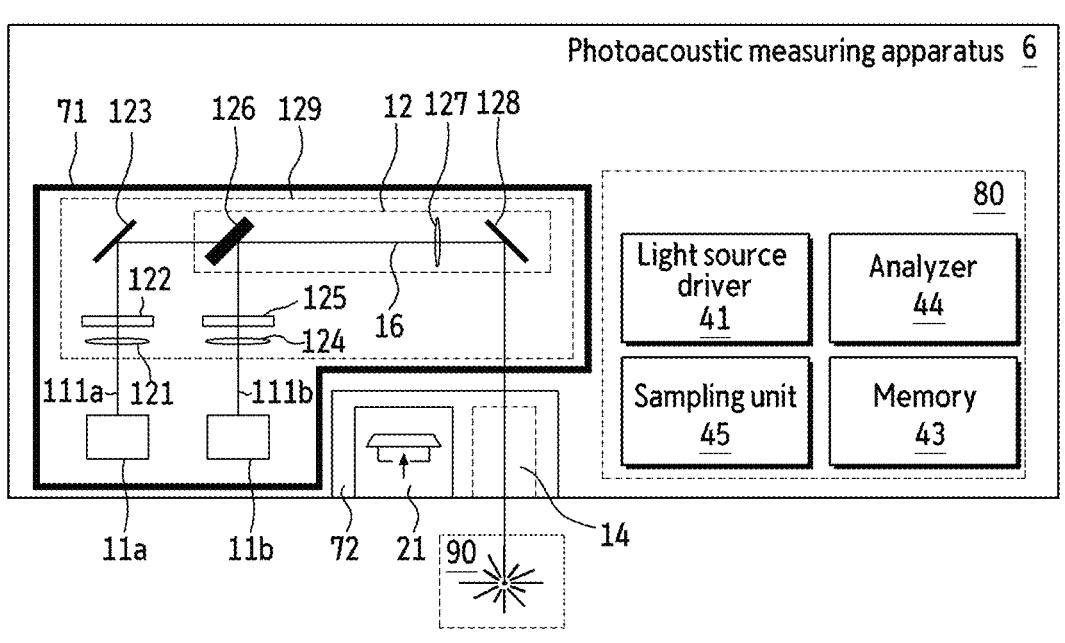
FIG. 24 is a schematic block diagram illustrating a photoacoustic measuring apparatus according to some still further embodiments of the present disclosure.

FIG. 23 is a schematic perspective view illustrating a photoacoustic measuring apparatus according to still another embodiment of the present disclosure, and FIG. 24 is a schematic block diagram illustrating a photoacoustic measuring apparatus according to still another embodiment of the present disclosure.

Referring to FIGS. 23 and 24 together, the photoacoustic measuring apparatus 6 may include the light source unit housing 71, a first light source 11a, a second light source 11b, the optical element 12, the sensor housing 72, the optical path 14, the ultrasonic sensor 21, the light source driver 41, the sampling unit 45, the memory 43, and the analyzer 44. Hereinafter, components constituting the optical system will be mainly described in detail.

According to an embodiment, each of the first light source 11a and the second light source 11b may be embodied as a light emitting diode LED or a laser diode LD that directly generates light. The first light source 11a emits first light 111a of the first wavelength, and the second light source 11b emits second light 111*b* of the second wavelength. The first wavelength and the second wavelength may be selected from wavelengths belonging to near-infrared light in a band of 750 to 1500 nm or mid-infrared light in a band of 1500 to 5430 nm, respectively. In some embodiments, the first wavelength and the second wavelength may be different from each other, and the first wavelength may be shorter than the second wavelength.

According to an embodiment, the first light source 11*a* and the second light source 11*b* may operate at the same pulse period and in synchronization with each other, or may alternately operate. According to an embodiment, the first light source 11*a* and the second light source 11*b* may operate according to the same or intentionally different operation times, energies, fluences, and outputs.

The optical element 12 is an optical device necessary to adjust the optical properties of the first light 111*a* and the second light 111*b* generated from the first and second light sources 11*a* and 11*b*, respectively, and to guide the first light 111*a* and the second light 111*b* to be condensed together into the optical path 14. According to an embodiment, the optical element 12 may include a first convex lens 121, a first polarizing plate 122, a first mirror 123, a second convex lens 124, a second polarizing plate 125, a beam combiner 126, an objective lens 127, and a second mirror 128.

The first convex lens 121 of the optical element 12 may condense the first light 111*a* of the first light source 11*a*, the condensed first light 111*a* may be reflected from the first mirror 123, and the reflected first light 111*a* may be incident on the beam combiner 126.

According to an embodiment, the first light 111*a* may pass through the first convex lens 121 and then the first polarizing plate 122 and then be reflected from the first mirror 123 in a polarized state, and then may be incident on the beam combiner 126 in a polarized state.

The second convex lens 124 of the optical element 12 may condense the second light 11*b* of the second light source 11*b*, and the condensed second light 11*b* may be incident on the beam combiner 126. According to an embodiment, the second light 11*b* may pass through the second convex lens 124 and then the second polarizing plate 125 and then be incident on the beam combiner 126 in a polarized state.

The beam combiner 126, the objective lens 127 and the second mirror 128 may constitute the common optical element 129. The beam combiner may direct the first light 111*a* and the second light 111*b* into one common optical path 16. To this end, the beam combiner 126 may transmit the first light 111*a* reflected from the first mirror 123 therethrough and reflect the second light 111*b* toward the common light path 16.

According to an embodiment, the beam combiner 126 may be a dichroic mirror that transmits or reflects lights beams of different wavelengths therethrough or therefrom in an exclusive manner from each other.

According to an embodiment, the beam combiner 126 may be a polarizing beam splitter that transmits or reflects lights beams of different polarization states in an exclusive manner from each other. For example, the first light 111*a* may become a s-polarized beam in the first polarizing plate 122, and the second light may become a p-polarized beam in the second polarizing plate 125 and then the s-polarized beam and the p-polarized beam may be incident on the beam combiner 126.

The first and second lights 111*a* and 111*b* guided to the common optical path 15 may be condensed at substantially the same focal length by the objective lens 127. In this case, since the wavelengths of the first light 111*a* and the second light 111*b* are different from each other, the first convex lens 121 and the second convex lens 124 may have different focal lengths so as to have the same focal length inside the measurement target 90 using the same objective lens 127. According to an embodiment, the wavelength of the first light 111*a* having a relatively greater optical path length may be greater than the wavelength of the second light 111*b*.

The first and second lights 111*a* and 111*b* condensed by the objective lens 127 may be reflected from the second mirror 128 and guided to the measurement target 90 through the optical path 14.

The sensor housing 72 may accommodate therein the optical path 14 for allowing the first and second lights 111*a*, 111*b* to be incident on the measurement target 90, and the ultrasonic sensor 21 for detecting a photoacoustic wave from the measurement target 90. The sensor housing 72 may be implemented to mechanically contact the light source unit housing 71, and be acoustically decoupled therefrom.

The light source driver 41 may drive the first and second light sources 11*a* and 11*b* by supplying power to the first and second light sources 11*a* and 11*b* with a predetermined light output and light emission time.

Figure 25:
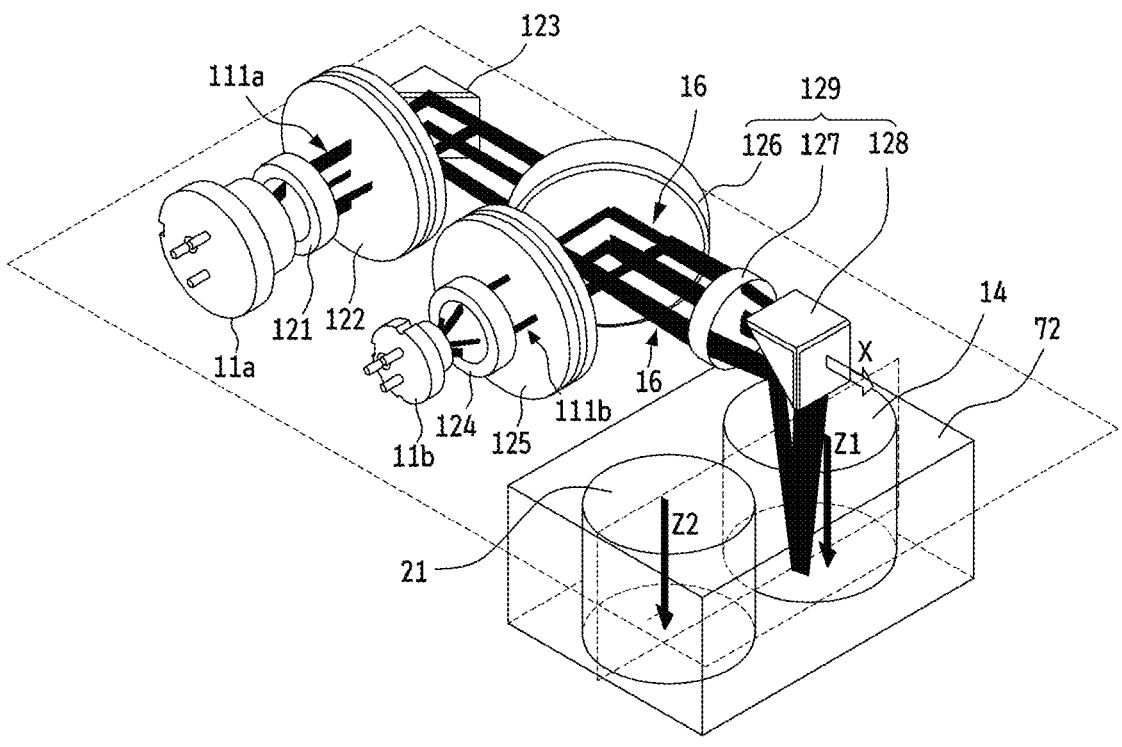
FIG. 25 is a schematic perspective view illustrating an arrangement relationship between a light source and optical elements and an ultrasonic sensor of a photoacoustic measuring apparatus according to some embodiments of the present disclosure.
Figure 26:
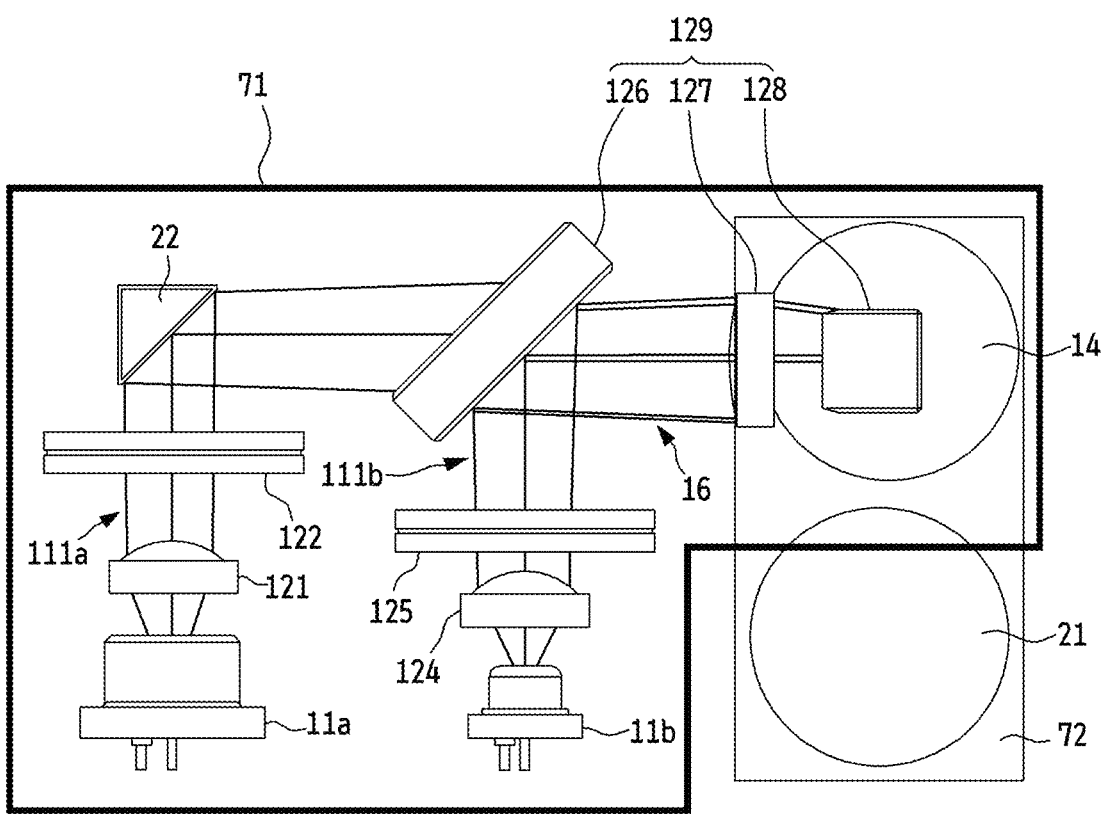
FIG. 26 is a schematic plan view illustrating a structure in which a light source and optical elements are disposed inside a light source unit housing, and an ultrasonic sensor is disposed in a sensor housing in a photoacoustic measuring apparatus according to some embodiments of the present disclosure.

FIG. 25 is a schematic perspective view illustrating an arrangement relationship between a light source and optical elements and an ultrasonic sensor of a photoacoustic measuring apparatus according to some embodiments of the present disclosure, and FIG. 26 is a schematic plan view illustrating a structure in which the light source and optical elements are disposed inside a light source unit housing and the ultrasonic sensor is disposed in a sensor housing in the photoacoustic measuring apparatus according to the embodiments.

Referring to FIGS. 25 and 26, the first and second light sources 11*a* and 11*b* and the optical elements 12 are disposed on the same plane, and the volume of the optical system may be minimized based on a common optical path 16.

The wavelength of the infrared light used for photoacoustic measurement with respect to the skin is relatively long and the infrared light used for photoacoustic measurement with respect to the skin should be focused on a position within a distance of several mms under the skin layer. Thus, the operating distance from the objective lens 127 to the measurement target 90 being relatively large may disable the miniaturization of the optical system. The embodiments of the present disclosure may solve the miniaturization problem by changing the traveling direction of the beam after the objective lens 127 using the second mirror 128, and positioning the ultrasonic sensor 21 side by side with and adjacent to the optical path space generated according to the design change to use the space maximally.

According to an embodiment, the optical axis direction X by the beam combiner 126 and the objective lens 127 and the optical axis direction Z1 changed by the second mirror 128 may be orthogonal to each other, and the changed optical axis direction Z1 may be parallel to the acoustic axis Z of the ultrasonic sensor 21. Accordingly, the optical axis direction X by the beam combiner 126 and the objective lens 127 and the acoustic axis Z of the ultrasonic sensor 21 may be orthogonal to each other.

Next, an embodiment for setting the optimized geometry will be described in detail.

Figure 27:
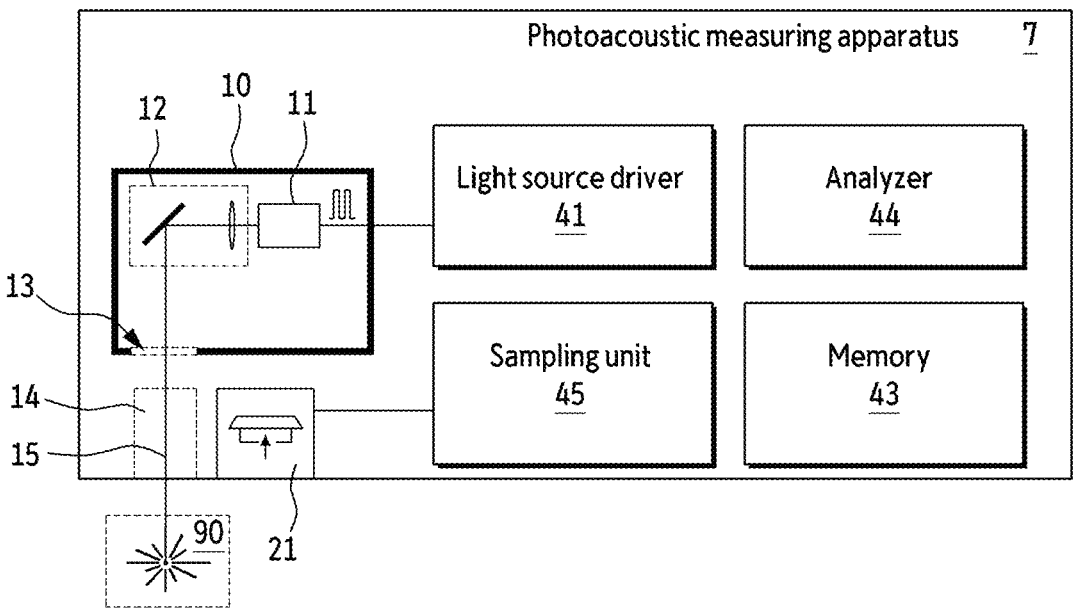
FIG. 27 is a schematic block diagram illustrating a photoacoustic measuring apparatus according to some still further embodiments of the present disclosure.
Figure 28:
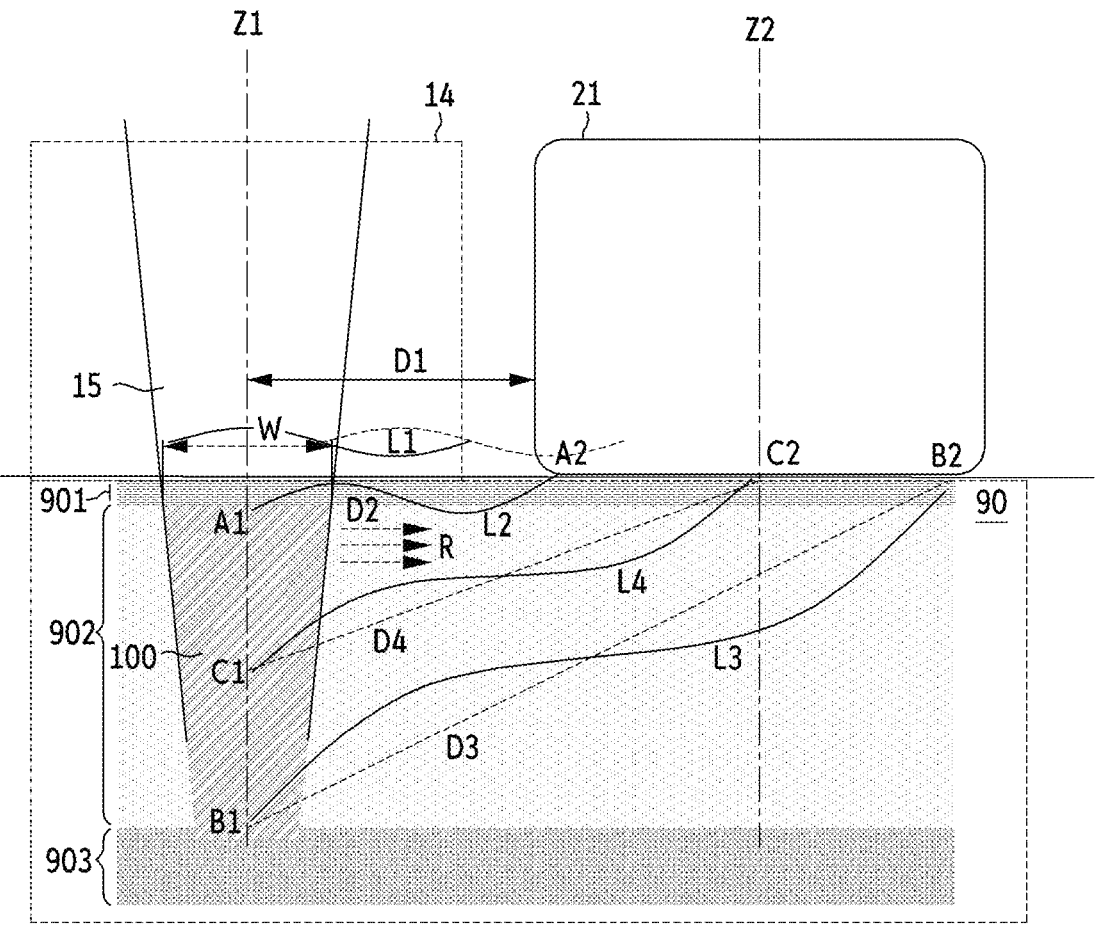
FIGS. 28 and 29 are conceptual diagrams illustrating a geometry among a width of a laser pulse beam, a distribution of a beam within a measurement target, and a measurement surface of an ultrasonic sensor when the measurement target is irradiated with a laser pulse beam to analyze a component in the measurement target using a photoacoustic measuring apparatus according to some still further embodiments of the present disclosure.
Figure 29:
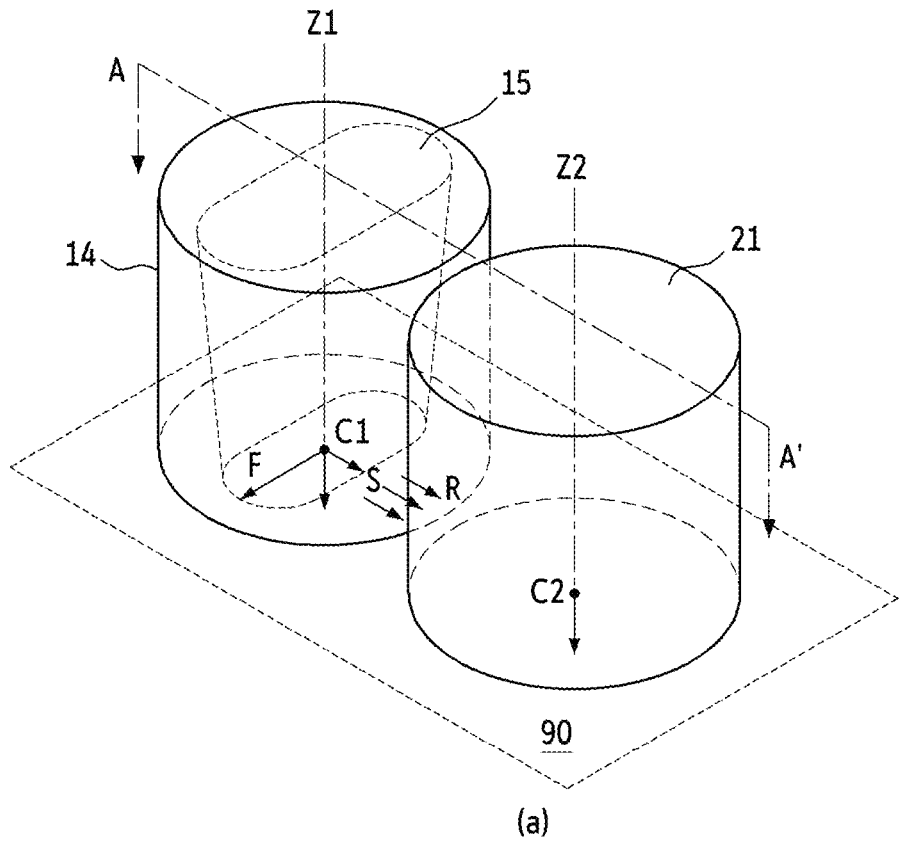
Figure 29:
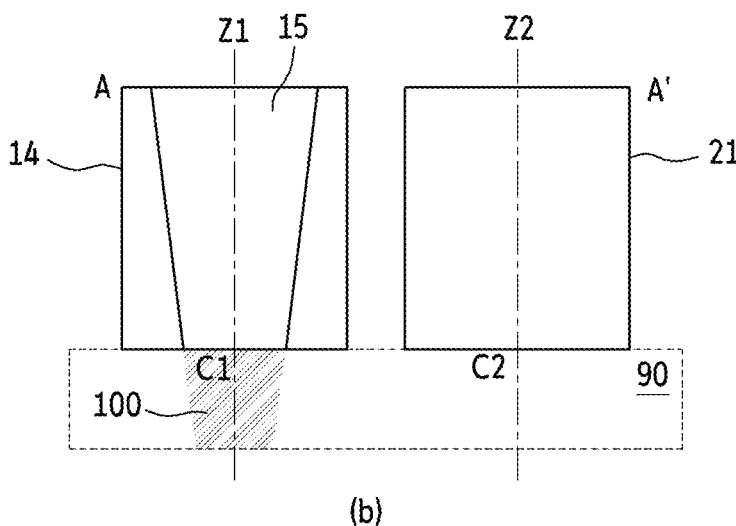

FIG. 27 is a schematic block diagram illustrating a photoacoustic measuring apparatus according to some still further embodiments of the present disclosure, and FIGS. 28 and 29 are 29 are conceptual diagrams illustrating a geometry among a width of a laser pulse beam, a distribution of a beam within a measurement target, and a measurement surface of an ultrasonic sensor when the measurement target is irradiated with a laser pulse beam to analyze a component in the measurement target using a photoacoustic measuring apparatus according to some still further embodiments of the present disclosure.

Referring to FIGS. 27, 28, and 29 together, the photoacoustic measuring apparatus 7 may include the light source unit 10, the light source 11, the optical element 12, the optical opening 13, the light path 14, the light source driver 41, the ultrasonic sensor 21, the sampling unit 45, the memory 43, and the analyzer 44. In the following description, descriptions of components duplicate with those in the previous embodiment will be omitted or briefly set forth.

According to an embodiment, the light source unit 10 may have the light source 11 embedded therein. In addition, according to an embodiment, the light source unit 10 may further contain therein one or more optical elements 12 necessary to guide light generated from the light source 11 and adjust optical properties thereof.

Light having passed through the optical opening 13 of the light source unit 10 may pass through the optical path 14 and be incident on the measurement target 90. According to an embodiment, the optical path 14 may be an optically transparent optical guide or an optical tube, and may further include a dust cover or an acoustic coupler if necessary. In some embodiments, the optical path 14 may not be separately provided, and the optical opening 13 may face the measurement target 90.

The ultrasonic sensor 21 may detect the photoacoustic wave transmitted from the measurement target 90 while the measurement surface thereof acoustically contacts the measurement target 90. The ultrasonic sensor 21 may have an acoustic axis, and in general, a measurement surface of the ultrasonic sensor 21 may be orthogonal to the acoustic axis.

Referring to FIG. 28, the laser pulse beam 15 passes through the optical path 14 and is incident on the measurement target 90. The laser pulse beam 15 is a parallel light beam or a non-parallel light beam that is condensed at a predetermined focal position. While the laser pulse beam 15 is traveling in the measurement target 90, the energy thereof is gradually absorbed by the substance in the measurement target, thereby losing the energy and weakening. The energy absorbed by the substance in the measurement target 90 thermally expands and contracts the substance according to a predetermined physical property to generate the photoacoustic wave, and an area in the measurement target 90 that absorbs the energy of the laser pulse beam 15 to generate the photoacoustic wave may be referred to as a photoacoustic wave generating area 100.

When the laser pulse beam 15 is a parallel light beam, the photoacoustic wave generating area 100 will have a cylindrical shape in which the area of the cross-section is generally constant along the optical axis Z1 direction. When the laser pulse beam 15 is a non-parallel light beam, the photoacoustic wave generating area 100 may be abstracted as a truncated cone in which the area of the cross-section is gradually reduced or gradually increased along the optical axis Z1 direction, or a shape in which the area of the cross-section is gradually reduced and then increased again, i.e., a double cone shape.

In the following description and FIG. 28, for convenience of description, it is assumed that the laser pulse beam 15 is a non-parallel light beam and the focal position is inside the measurement target 90, so that the photoacoustic wave generating area 100 has a truncated cone shape in which the area of the cross-section gradually decreases along the optical axis Z1 direction. In this regard, although the term "cone" is used, it does not necessarily mean that the cross-section shape is a circle in a strict meaning, and the cross-section shape includes various shapes of a beam cross-section that may be realistically formed by the light source and the optical elements, including an oval, a rectangle, a round rectangle, and the like. On the other hand, the following description may be equally applied to a case even when the cross-sectional area of the photoacoustic wave generating area 100 is constant, when it monotonically increases along the optical axis Z1 direction, or when it gradually decreases and then increases again.

For example, when the measurement target 90 is the skin, the skin may be roughly divided into an epidermal layer 901 that is thin by about 0.1 mm, a dermal layer 902 that is about 2 to 3 mm thick, and a subcutaneous fat layer 903 thereunder. According to the related art, near-infrared rays of about 743 nm to 1000 nm in the near-infrared band may penetrate up to 2 to 5 mm inside the skin when the light is directly incident on the skin. Accordingly, a laser beam of about 743 to 1000 nm band, preferably 743 to 940 nm band, loses about 43% to 90% of energy while passing through the epidermis layer and the dermis layer. In this regard, the epidermis layer is very thin compared to the dermis layer, such that it may be estimated that a substantial amount of the energy lost from the laser beam is absorbed by the dermis layer, and a portion of the absorbed energy causes the photoacoustic phenomenon in the dermis layer.

Accordingly, assuming that the substance is uniformly distributed in the dermis layer 72, the photoacoustic wave generating area 100 as an area through which the laser pulse beam 15 passes in the dermis layer 72 may refer to an area in which the photoacoustic wave having a magnitude corresponding to the amount of energy absorption at each position is generated.

A center C1 of the photoacoustic wave generating area 100 may be defined as a geometric center based on the distribution of energy absorption in the photoacoustic wave generating area 100. The center C1 of the photoacoustic wave generating area 100 may be calculated similarly to calculating of the center of mass of an object in consideration of the distribution of mass instead of the distribution of energy absorption.

The acoustic wave generated in the photoacoustic wave generating area 100 is mainly composed of components in the radial direction R that are spread in a substantially perpendicular manner to the optical axis Z1 because components in the optical axis Z1 direction of the acoustic wave generally cancel each other. Accordingly, the ultrasonic sensor 21 may detect a portion of the acoustic wave propagated substantially in the radial direction in the photoacoustic wave generating area 100.

According to an embodiment, when a predetermined pulse energy and a pulse width for the light source driver 41 to generate the laser pulse beam 15 from the light source 11 having a predetermined wavelength, a predetermined frequency band and a sampling rate at which the ultrasonic sensor 21 detects the photoacoustic wave, and intended positions B1 and C1 of the photoacoustic wave generating area 100 are given, a geometry including an light-incident position A1 of the laser pulse beam 15, a beam width W of the laser pulse beam, an light-incident position A1 of the photoacoustic wave generating area 100 in the measurement target 90 by the laser pulse beam 15, a position A2, B2, C2 of the ultrasonic sensor 21, etc. may be determined as follows.

Considering the geometry as shown in FIG. 29 with respect to the light-incident position A1 and the beam width W of the laser pulse beam 15, the center C1 of the photoacoustic wave generating area 100, and the center C2 of the ultrasonic sensor 21, the ultrasonic sensor 21 should be able to detect acoustic waves generated at any position between the light-incident position A1 and the distal position B1 in the photoacoustic wave generating area 100 using a given frequency band.

To this end, the wavelength range of the acoustic wave that may be detected by the ultrasonic sensor 21 may be set to include the acoustic wave having a wavelength corresponding to a distance from any position between the light-incident position A1 and the distal position B1 in the photoacoustic wave generating area 100 to the measurement surface of the ultrasonic sensor 21. Specifically, the wavelength range of the acoustic wave detectable by the ultrasonic sensor 21 may be set as follows.

A first candidate of the shortest wavelength in the wavelength range, that is, a specific wavelength (a wavelength shorter than the specific wavelength is not preferable) may be set to a first wavelength L1 corresponding to two times of the beam width W of the light-incident position A1 of the photoacoustic wave generating area 100. The laser pulse beam 15 has a wide beam width at the light-incident position A1. Thus, among the acoustic waves generated at a distant point of the beam and the acoustic waves generated at a proximal position of the beam, the acoustic waves having a shorter wavelength than the first wavelength L1 corresponding to twice of the beam width W may cancel each other when reaching the ultrasonic sensor 21 to act as noise. Therefore, it may be more advantageous that the ultrasonic sensor 21 does not detect acoustic waves shorter than the first wavelength L1.

A second candidate of the shortest wavelength in the wavelength range may be set to a second wavelength L2 which is the longest wavelength among the acoustic waves that may be generated near the light-incident position A1 of the photoacoustic wave generating area 100 and reach a proximal position A2 of the ultrasonic sensor 21. Among the acoustic waves between the light-incident position A1 and the proximal position A2 of the ultrasonic sensor, acoustic waves having a wavelength shorter than the second wavelength L2 may cancel each other at the proximal position A2 of the ultrasonic sensor 21 while the photoacoustic phenomenon is continued, thereby acting as noise. Therefore, it may be more advantageous that the ultrasonic sensor 21 does not detect the acoustic waves having a shorter wavelength than the second wavelength L2.

A first candidate of the longest wavelength in the wavelength range, that is, a specific wavelength (a wavelength longer than the specific wavelength is not preferable) may be set to a third wavelength L3 of the longest wavelength among the acoustic waves that may be generated at the distal position B1 of the photoacoustic wave generating area 100 and reach the distal position B2 of the ultrasonic sensor 21.

A second candidate of the longest wavelength in the wavelength range may be set in consideration of the proximity effect of the generated acoustic wave because the ultrasonic sensor 21 is close to the photoacoustic wave generating area 100. As the proximity effect is greater, the acoustic wave of the corresponding wavelength is detected as having a magnitude than an actual magnitude. Thus, it may be preferable to exclude the wavelength having the greater proximity effect from the wavelength range to be detected. The influence of the proximity effect of the acoustic wave may be expressed as a function of $2\pi r/\lambda$, where r is the distance from the measurement position to the sound source and $\lambda$ is the wavelength of the sound wave. The smaller the $2\pi r/\lambda$ value, that is, the larger the wavelength $\lambda$ at the same distance r, the greater the proximity effect. Thus, a criterion for determining the proximity effect may be the upper limit of the wavelength range of the acoustic wave to be measured at a given r.

In theory, when the $2\pi r/\lambda$ value is greater than 1, the influence of the proximity effect of the acoustic wave is reduced to about 1 dB to 1.2 dB. When the $2\pi r/\lambda$ value is greater than 2, the influence thereof is reduced to 0.2 dB or lower. Therefore, when the wavelength $\lambda$ is set to be smaller than $2\pi r/p$, the proximity effect may be suppressed. For example, when the reference value about the magnitude of the proximity effect is set to 1 in a relatively tolerant manner of the proximity effect, the upper limit of wavelength $\lambda$ is $2\pi r$. When the reference value is set to 2 in a relatively strict manner against the proximity effect, the upper limit of wavelength A is nr.

For example, when r is defined as the distance D3 between the distal position B2 of the ultrasonic sensor 21 and the distal position B1 of the photoacoustic wave generating area 100 or the distance D4 between the center C2 of the ultrasonic sensor 21 and the center C1 of the photoacoustic wave generating area 100, the upper limit of the wavelength range may be set to $\pi D3$, $2\pi D3$, $\pi D4$, or $2\pi D4$.

Accordingly, when the ultrasonic sensor 21 is set to detect an acoustic wave of a wavelength included in a wavelength range in which the lower limit is, for example, the first wavelength L1 or the second wavelength L2 and the upper limit is, for example, the third wavelength L3, or the wavelength range of $\pi D3$, $2\pi D3$, $\pi D4$, or $2\pi D4$, the ultrasonic sensor 21 may sufficiently well detect acoustic waves generated at any position between the light-incident position A1 and the distal position B1.

Furthermore, the wavelength range of the acoustic wave detectable by the ultrasonic sensor 21 may be set to necessarily include one or more intentionally selected wavelengths.

According to an embodiment, the wavelength range may be set to necessarily include a fourth wavelength L4 corresponding to a distance between the center C1 of the photoacoustic wave generating area 100 and the center C2 of the ultrasonic sensor 21.

As described above, the wavelength range of the ultrasonic sensor 21 may be set. A frequency band of the ultrasonic sensor 21 may also be set based on the set wavelength range. According to an embodiment, the frequency band of the ultrasonic sensor 21 may be set to include a frequency having a length of two times of the beam width W as one wavelength at the light-incident position A1 and a frequency having a length of a distance from the photoacoustic wave generating area 100 according to the geometry to the ultrasonic sensor 21 as one wavelength.

In one example, the ultrasonic sensor 21 typically has a tendency to have the best performance near a specific center frequency within the frequency band and to have low performance in the band around the center frequency. Accordingly, when the main terms of the frequency selected from among the acoustic waves generated in the photoacoustic wave generating area 100 is set as the center frequency of the ultrasonic sensor 21, the magnitude of the photoacoustic signal that the ultrasonic sensor 21 can detect from the photoacoustic wave generating area 100 may be maximized. For example, a distance between the center C1 of the photoacoustic wave generating area 100 and the center C2 of the ultrasonic sensor 21 may be set based on a wavelength length of the center frequency of the ultrasonic sensor 21.

The sampling rate of the sampling unit 45 does not need to be higher than twice of the highest frequency of the frequency band of the ultrasonic sensor 21. Thus, the sampling rate may be set based on a given frequency band of the ultrasonic sensor 21. For example, the upper limit of the sampling rate may be set based on two times of the ultrasonic frequency having a length of one of the shortest first wavelength L1 or the shortest second wavelength L2 in the wavelength range of the ultrasonic sensor 21 as one wavelength.

In one example, in FIG. 29, (a) is a three-dimensionally depicting the optical path 14 and the ultrasonic sensor 21, and (b) is a diagram depicting a cross-section A-A'.

The laser pulse beam 15 may have a beam cross-section whose a shape is closer to an ellipse or a round rectangular shape than a circular shape, and may have a fast axis F and a slow axis S. The fast axis of the cross-section of the beam may mean a direction in which the divergence of the beam is relatively large and thus the beam is widely spread, and the slow axis of the cross-section of the beam may mean a direction in which the divergence of the beam is relatively small and thus the beam is narrowly spread.

As illustrated in FIG. 29, when the laser pulse beam 15 is disposed so that the slow axis S is oriented toward the ultrasonic sensor 21, the laser pulse beam 15 and the ultrasonic sensor 21 may overlap each other by the relatively longer width of the fast axis F. On the other hand, when the laser pulse beam 15 is disposed so that the fast axis F is oriented toward the ultrasonic sensor 21, the laser pulse beam 15 and the ultrasonic sensor 21 may overlap each other only by the relatively shorter width of the slow axis S.

Accordingly, the ultrasonic sensor 21 may detect a larger amount of the photoacoustic signal in the radial direction R spreading from the laser pulse beam 15 when the slow axis S is oriented toward the ultrasonic sensor 21 than when the fast axis F is oriented toward the ultrasonic sensor 21.

When the slow axis S of the laser pulse beam 15 is oriented toward the ultrasonic sensor 21, the beam width W of FIG. 28 may correspond to the beam width of the slow axis S.

For example, when the geometry given for photoacoustic measurements with respect to a particular component in the dermal layer of skin is as follows and the acoustic wave velocity in the skin can be approximated to about 1430 m/s, i.e., 1.5 mm/μs, the frequency band of the ultrasonic sensor 21 may be set as follows:

The example geometry is set as follows: a beam width of the fast axis F at the light-incident position A1 of the laser pulse beam 15 is 0.6 mm, a beam width of the slow axis S at the light-incident position A1 of the laser pulse beam 15 is 3 mm, a distance between the optical axis Z1 and the acoustic axis Z2 of the ultrasonic sensor 21 is about 4 mm, a depth from the light-incident position A1 of the laser pulse beam 15 to the center C1 of the photoacoustic wave generating area 100 is about 1 mm, a depth therefrom to the distal position B1 of the photoacoustic wave generating area 100 is about 2 mm, and a radius of the ultrasonic sensor 21 is set as 2 mm. Further, by definition, frequency (f)=sound velocity (v)/wavelength (λ).

Accordingly, the first wavelength L1 for setting the lower limit of the wavelength range of the ultrasonic sensor 21 is 2*0.6 mm, that is, 1.2 mm, which is two times of the beam width W of the fast axis F, and corresponds to about 1.25 MHz in terms of the frequency. The second wavelength L2 corresponds to about 2 mm as the shortest distance D2 from the light-incident position A1 of the laser pulse beam 15 to the proximal position A2 of the ultrasonic sensor 21, and corresponds to about 0.75 MHz in terms of the frequency.

The third wavelength L3 for setting the upper limit of the wavelength range of the ultrasonic sensor 21 is about 4.5 mm as a distance D3 from the distal position B1 of the photoacoustic wave generating area 100 to the distal position B2 of the ultrasonic sensor 21, and corresponds to about 0.33 MHz in terms of the frequency. The fourth wavelength L4 is about 4 mm as a distance D4 from the center C1 of the photoacoustic wave generating area 100 to the center C2 of the ultrasonic sensor 21, and corresponds to about 0.38 MHz in terms of the frequency.

In order to set the upper limit of the wavelength range of the ultrasonic sensor 21 (i.e., the lower limit of the frequency band), when the reference value of the proximity effect is set as 1 in a relatively generous or tolerant of the proximity effect, the wavelength A is about 28 mm (=2 πD3) or 25 mm (=2 πD4), and the frequency corresponds to 0.05 MHz or 0.06 MHz, respectively. When the reference value of the proximity effect is set as 2 in a relatively strict manner against the proximity effect, the wavelength λ is about 14 mm (=πD3) or 12.5 mm (=πD4), and the frequency corresponds to 0.11 MHz or 0.12 MHz, respectively.

Accordingly, from the above-described example geometry, the frequency band of the ultrasonic sensor 21 may be set to detect an acoustic wave of the 0.05 to 0.75 MHz band, the 0.05 to 1.25 MHz band, the 0.11 to 0.75 MHz band, or the 0.11 to 1.25 MHz band, and the sampling rate of the sampling unit 45 may be set to have a sampling rate of 1.5 MHz or 2.5 MHz so as to sample up to a maximum frequency of 0.75 MHz or 1.25 MHz.

In another example, when the geometry given for photoacoustic measurement with respect to a particular component in the dermal layer of the skin is as follows, and the acoustic wave velocity in the skin can be approximated to about 1500 m/s, i.e., 1.5 mm/μs, the geometry of the photoacoustic wave generating area 100 and the ultrasonic sensor 21 based on the frequency band of the ultrasonic sensor 21 may be set as follows:

A given example frequency band of the ultrasonic sensor 21 is in a range of 0.33 to 1.25 MHz, and the radius of the measurement surface of the ultrasonic sensor 21 is set as 2 mm. The depth from the light-incident position A1 of the laser pulse beam 15 to the center C1 of the photoacoustic wave generating area 100 is set as about 1 mm, and the depth to the distal position B1 of the photoacoustic wave generating area 100 is set as about 2 mm which is the depth of the dermis layer, so that the photoacoustic wave generating area 100 may be formed in the dermis layer of the skin. Moreover, by definition, the frequency f=the sound velocity v/wavelength L.

Since the first wavelength L1 corresponding to two times of the length of the beam width W of the light-incident position A1 of the laser pulse beam 15 corresponds to the wavelength 1.2 mm of 1.25 MHz, which is the highest frequency among frequencies belonging to the frequency band of the ultrasonic sensor 21, the beam width W may be set to 0.6 mm as a half thereof.

The distance D3 between the distal position B1 of the photoacoustic wave generating area 100 and the distal position B2 of the ultrasonic sensor 21 may be set to about 4.5 mm, based on a wavelength of the lowest frequency 0.33 MHz among frequencies belonging to the frequency band of the ultrasonic sensor 21 being about 4.5 mm.

The distance from the light-incident position A1 of the photoacoustic wave generating area 100 to the distal position B2 of the ultrasonic sensor 21 may be determined to be about 4 mm based on the approximate right triangle defined by the positions A1, B1, and B2, and accordingly, the distance D1 from the light-incident position A1 of the photoacoustic wave generating area 100 to the proximal position A2 of the ultrasonic sensor 21 may be determined to be about 2 mm. Further, the distance D4 from the center C1 of the photoacoustic wave generating area 100 to the center C2 of the ultrasonic sensor 21 may be set to about 3.2 mm.

In one example, in the present disclosure, the pulse width of the laser pulse beam 15 may be set based on a difference between the maximum pressure time and the minimum pressure time of the heat pressure wave calculated based on the wavelength length belonging to the frequency band of the ultrasonic sensor 21 and the magnitude of the pulse energy of the laser pulse beam 15.

According to the mechanism related to the photoacoustic effect on the fluid, the pressure Pt generated in the fluid by the very short laser pulse beam may be approximated as in Equation 1 as set forth below.

$$P_t = \frac{E}{\pi R_b^2} \cdot \alpha\beta\upsilon^2/C_p \qquad \text{[Equation 1]}$$

where E is energy of the laser pulse, $R_b$ is a beam radius of the laser pulse, $\alpha$ is an absorption coefficient of the fluid, $\beta$ is a thermal expansion coefficient of the fluid, $\upsilon$ is an acoustic velocity in the fluid, and $C_p$ is specific heat of the fluid.

When the absorption coefficient is about $10^{-5}$ cm$^{-1}$, the laser beam penetrates deeply into the fluid while maintaining its radius. Thus, the photoacoustic generation area (PA source) may be regarded as having a cylinder shape. Furthermore, when the duration of the laser pulse beam is similar to or shorter than the time duration for which the photoacoustic pulse generated from the laser pulse beam has deviated from the photoacoustic wave generating area in the radial direction, the amplitude of the pressure wave Ps observed at a certain position away from the photoacoustic wave generating area may be approximated as in Equation 2 as set forth below.

$$P_s = E\alpha\beta\upsilon^2/C_p R_s^{3/2} r^{1/2} \qquad \text{[Equation 2]}$$

where E is the energy of the laser pulse, $\alpha$ is the absorption coefficient of the fluid, $\beta$ is the thermal expansion coefficient of the fluid, $\upsilon$ is the sound velocity in the fluid, $C_p$ is the specific heat of the fluid, $R_s$ is the radius of the photoacoustic wave generating area (PA source radius), and r is the distance from the center of the photoacoustic wave generating area to the observation position.

Furthermore, the distribution p(r, t) based on the distance and the time of the pressure wave may be expressed as in Equation 3.

$$p(r, t) = \frac{E\alpha\beta\sqrt{\upsilon}}{8\sqrt{\pi}\,C_p\sqrt{r}}\tau_e^{-3/2}\frac{d\Phi_0(\xi)}{d\xi} \qquad \text{[Equation 3]}$$

$$\tau_e = \sqrt{\tau_p^2 + (R/\upsilon)^2},$$

42

-continued
$$\xi = (t - r/\upsilon)\tau_e$$

E is the energy of the laser pulse, $\alpha$ is the absorption coefficient of the fluid, $\beta$ is the coefficient of thermal expansion of the fluid, $\upsilon$ is the sound velocity in the fluid, $C_p$ is the specific heat of the fluid, R is the radius of the photoacoustic wave generating area, r is the distance from the center of the photoacoustic wave generating area to the observation position, $\tau_p$ is the one-time duration of the pulse, and $d\Phi_0(\xi)/d\xi$ is the wave shape function. The wave shape function of the pressure wave may be a wave shape in which a relatively strong and short compression pulse is followed by a relatively weak and wide rarefaction pulse to simulate the heat pressure wave of the fluid.

From the above Equation 3, the time difference $\delta t$ between the maximum pressure time point corresponding to the peak of the compressive pulse and the minimum pressure time point corresponding to the peak of the rarefaction pulse may be approximated as in Equation 4 as set forth below.

$$\delta t = 2.35 \cdot \sqrt{(\tau_p^2 + (R/\upsilon)^2)} \qquad \text{[Equation 4]}$$

where $\tau_p$ is the width of the one-time pulse of the laser pulse, R is the radius of the photoacoustic wave generating area, and $\upsilon$ is the speed of sound in the fluid.

According to an embodiment, the pulse width $\tau_p$ of the laser pulse beam 15 may be set so that the frequency of the wave having, as one period, two times of the time difference $\delta t$ between the maximum pressure time and the minimum pressure time of the photoacoustic thermal pressure wave by the laser pulse beam according to the above Equation 4 is included in the frequency band of the ultrasonic sensor 21.

In the case of the above example geometry, when the range of the pulse width $\tau_p$ of the laser pulse beam 15 is calculated using the Equation 4 so as to correspond to the 0.33 to 0.75 MHz band or the 0.33 to 1.25 MHz band as the example frequency band of the ultrasonic sensor 21, the range of the pulse width $\tau_p$ may be set to about 0.6 μs or about 440 ns or smaller.

When the pulse width $\tau_p$ is calculated using the Equation 4 such that 2.6 μs as one period of the center frequency 0.38 MHz estimated at the fourth wavelength L4 as the distance from the center C1 of the photoacoustic wave generating area 100 to the center C2 of the ultrasonic sensor 21 corresponds to two times of St of the Equation 4, the pulse width $\tau_p$ may be set to about 0.5 μs or about 500 ns or smaller.

However, as $\tau_p$ is smaller than R/υ, the effect thereof on the St is smaller. If $\tau_p$ is smaller than R/υ by ⅕ or smaller, any value of $\tau_p$ may be arithmetically acceptable. However, during a time duration corresponding to too short pulse width $\tau_p$, the energy that the pulse beam may transmit may be insufficient, or it may be difficult to drive the light source.

When the pulse width $\tau_p$ is 0.1 μs together with the 0.33 to 0.75 MHz band or the 0.33 to 1.25 MHz band as the example frequency band of the ultrasonic sensor 21, the time difference $\delta t$ between the maximum pressure time and the minimum pressure time of the heat pressure wave according to the Equation 4 is about 0.53 μs when R is 0.3 mm and υ is 1.5 mm/μs. The frequency having two times of the time difference $\delta t$ as one period is about 0.95 MHz, which may be included in the 0.33 to 1.25 MHz band as the example frequency band of the ultrasonic sensor 21.

Figure 30:
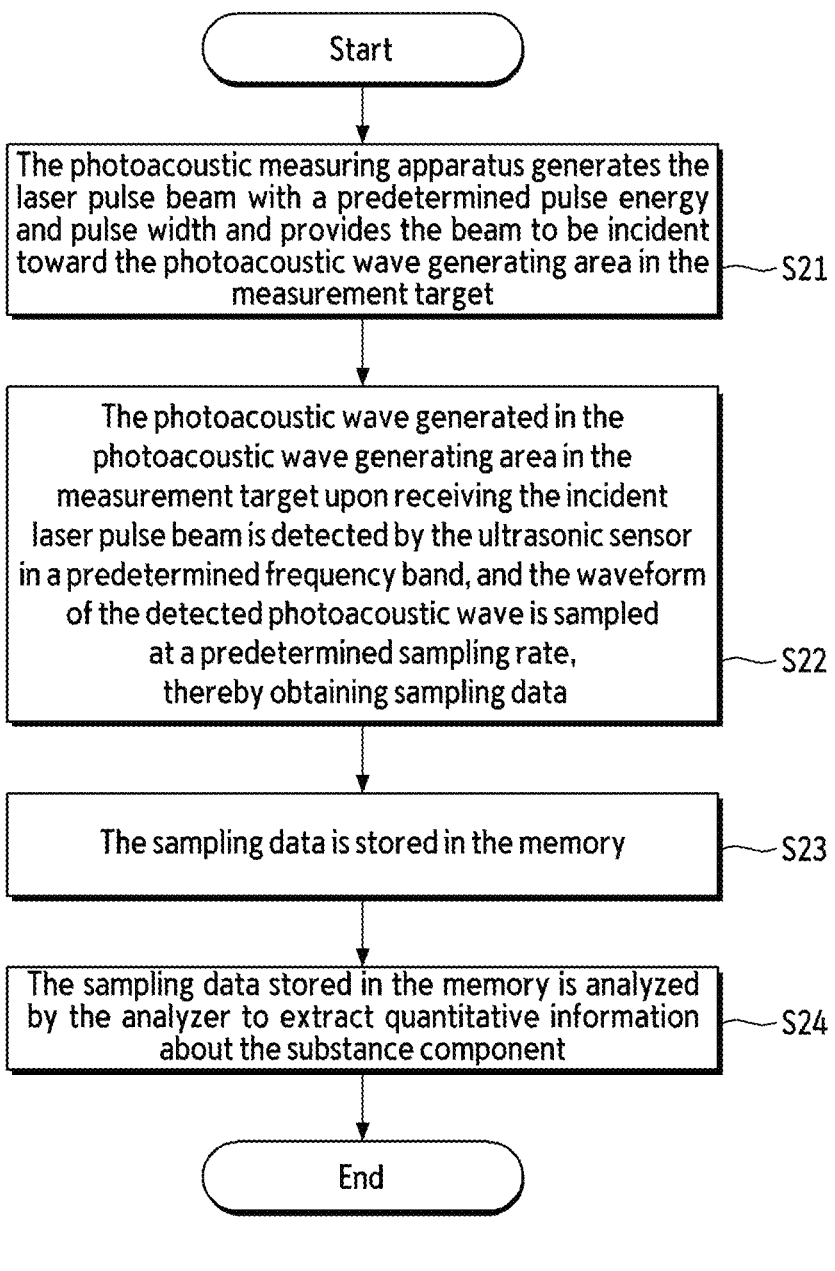
FIG. 30 is a diagram illustrating an operation of measuring a photoacoustic wave by generating a laser pulse once in a photoacoustic measurement method according to some still further embodiments of the disclosure.

FIG. 30 is a diagram illustrating an operation of measuring a photoacoustic wave by generating a laser pulse once in a photoacoustic measurement method according to some still further embodiments of the disclosure.

Referring to FIG. 30, according to an embodiment, in a photoacoustic measurement method for quantitatively measuring a component of a measurement target using a photoacoustic wave generated from a laser pulse having a predetermined wavelength, the light-incident position A1 of the laser pulse beam 15, the beam width W of the laser pulse beam 15, and the relative positions A2, B2, and C2 of the ultrasonic sensor 21 are respectively determined from a given frequency band of the ultrasonic sensor 21 and a given position of the photoacoustic wave generating area 100 in the measurement target 90 to form a geometry, and the method may be performed based on a state in which the ultrasonic sensor 21 is disposed adjacent to the light-incident position A1 of the laser pulse beam 15 according to the geometry.

According to an embodiment, in the photoacoustic measurement method for quantitatively measuring the components of a measurement target using a photoacoustic wave generated from a laser pulse having a predetermined wavelength is based on a state in which the ultrasonic sensor 21 is disposed adjacent to the light-incident position A1 of the laser pulse beam 15 according to a predetermined geometry composed of the beam width W and the light-incident position A1 of the laser pulse beam 15 with respect to the measurement target 90, the center C1 of the photoacoustic wave generating area in the measurement target 90, and the positions A2, B2, and C2 of the ultrasonic sensor 21.

The photoacoustic measurement method according to the embodiment may start in S21 in which the photoacoustic measuring apparatus 7 generates the laser pulse beam 15 with a predetermined pulse energy and pulse width and provides the beam to be incident toward the photoacoustic wave generating area 100 in the measurement target 90.

In S22, the photoacoustic wave generated in the photoacoustic wave generating area 100 in the measurement target 90 upon receiving the incident laser pulse beam 15 may be detected by the ultrasonic sensor 21 in a predetermined frequency band, and the waveform of the detected photoacoustic wave may be sampled at a predetermined sampling rate, thereby obtaining sampling data.

In S23, the sampling data may be stored in the memory 43.

According to an embodiment, the frequency band of the ultrasonic sensor 21 may include one or more frequencies having a distance from the photoacoustic wave generating area 100 to the ultrasonic sensor 21 according to a given geometry as one wavelength.

According to an embodiment, the sampling rate on the photoacoustic wave received from the ultrasonic sensor 21 may be determined to be two times or greater of the ultrasonic frequency having, as one wavelength, one of a length of two times of the beam width W of the laser pulse beam 15 or a length of the distance L2 between the light-incident position A1 of the laser pulse beam 15 and the ultrasonic sensor 21 according to a given geometry.

According to an embodiment, in S22, detection may be performed while sampling of the photoacoustic wave received from the ultrasonic sensor is performed 100 times or greater and 3000 times or smaller. The number of sampling times may be determined based on the length of a time duration during which quantitative information about the components of the substance in the measurement target 90 is maintained in the photoacoustic signal in a valid manner. When the number of sampling times is too small compared to the valid information maintaining time, the information may not be sufficiently analyzed, whereas when the number of sampling times is too large, the time taken for acquisition becomes longer, and the time taken for analysis and information processing will be increased.

In S24, the sampling data stored in the memory 43 may be analyzed by the analyzer 44 to extract quantitative information about the substance component.

Figure 31:
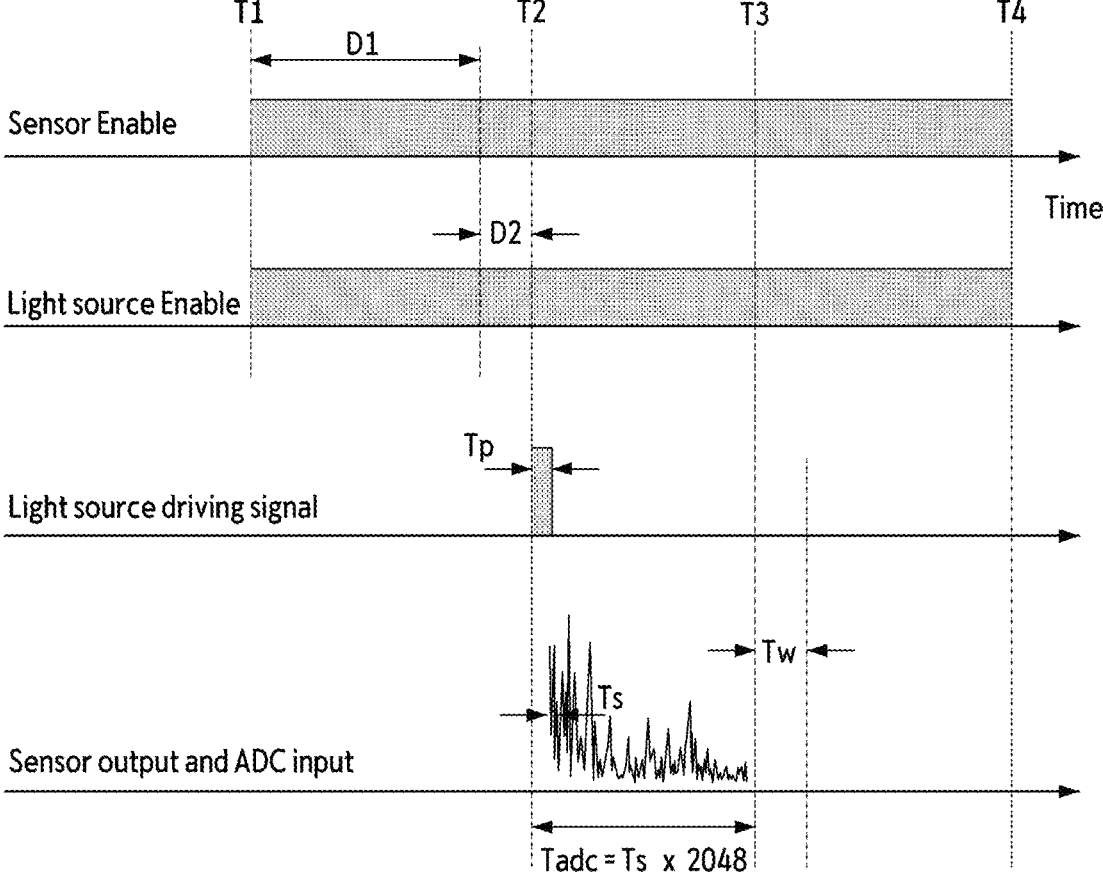
FIG. 31 is a diagram illustrating an operation of measuring a photoacoustic wave over time by emitting a laser pulse once in a photoacoustic measurement method according to some still further embodiments of the disclosure.

FIG. 31 is a diagram illustrating an operation of measuring a photoacoustic wave over time by emitting a laser pulse once in a photoacoustic measurement method according to some still further embodiments of the disclosure.

Referring to FIG. 31, according to the photoacoustic measuring method according to the present embodiment, a photoacoustic measuring apparatus 7 may first activate the power of each of the light source driver 41, the ultrasonic sensor 21, and the sampling unit 45 at a first timing T1 and perform the necessary preparation operations during the predetermined preparation times D1 and D2, respectively.

When the preparation is completed, the photoacoustic measuring apparatus 7 drives the light source driver 41 at a second timing T2 to drive the light source 11 for a predetermined pulse width Tp, and in synchronization therewith, starts receiving and sampling the acoustic wave from the ultrasonic sensor 21. After a time corresponding to the pulse width Tp has elapsed from the second timing T2, the light source 11 stops the oscillation. The sampling unit 45 performs sampling the analog acoustic wave signal received from the ultrasonic sensor 21 at a sampling interval Ts, for example, performs 4148 times of the sampling during the sampling period Tadc to generate the sampling data.

At a third timing T3, the photoacoustic measuring apparatus 7 may store the generated sampling data of one sampling cyled in the memory 43 during a writing period Tw, and may cut off the power to the light source driver 41 and the ultrasonic sensor 21 at a fourth timing T4.

Subsequently, the photoacoustic measuring apparatus 7 may analyze the sampling data using the analyzer 44 to extract quantitative information about the substance component in the measurement target 90.

Figure 32:
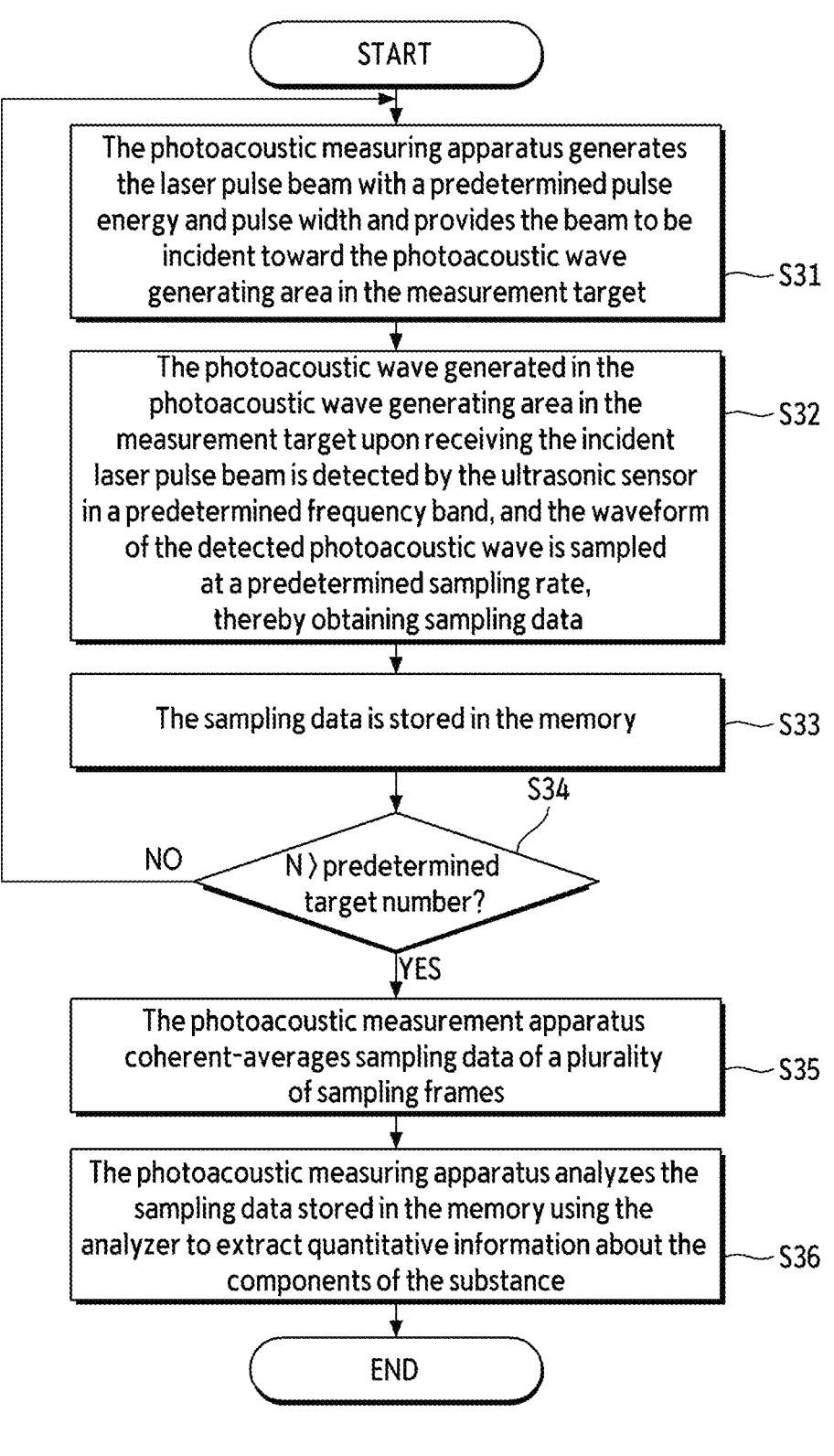
FIG. 32 is a diagram illustrating an operation of measuring photoacoustic wave by repeatedly emitting a laser pulse in a photoacoustic measurement method according to some still further embodiments of the disclosure.

FIG. 32 is a diagram illustrating an operation of measuring photoacoustic wave by repeatedly emitting a laser pulse in a photoacoustic measurement method according to some still further embodiments of the disclosure.

Referring to FIG. 32, in a similar manner to the photoacoustic measurement method of FIG. 30, the photoacoustic measurement method according to the present embodiment for quantitatively measuring a component of a measurement target using a photoacoustic wave generated from a laser pulse having a predetermined wavelength may be based on a state in which the ultrasonic sensor 21 is disposed adjacent to the light-incident position A1 of the laser pulse beam 15 according to the geometry formed when the light-incident position A1 of the laser pulse beam 15, the beam width W of the laser pulse beam 15, and the relative positions A2, B2, and C2 of the ultrasonic sensor 21 are respectively determined from a given frequency band of the ultrasonic sensor 21 and a given position of the photoacoustic wave generating area 100 in the measurement target 90.

According to an embodiment, the photoacoustic measurement method for quantitatively measuring a component of a measurement target using photoacoustic waves generated from a laser pulse having a predetermined wavelength may be based on a state in which the ultrasonic sensor 21 is disposed adjacent to the light-incident position A1 of the laser pulse beam 15 according to a predetermined geometry composed of the beam width W and the light-incident position A1 of the laser pulse beam 15 with respect to the measurement target 90, the center C1 of the photoacoustic wave generating area in the measurement target 90, and the positions A2, B2, and C2 of the ultrasonic sensor 21.

The photoacoustic measurement method according to the embodiment may start with S31 in which the photoacoustic measuring apparatus 7 generates the laser pulse beam 15 with a predetermined pulse energy and pulse width and emits the beam to be incident toward the photoacoustic wave generating area 100 in the measurement sample 90.

In S32, the photoacoustic wave generated in the photoacoustic wave generating area 100 in the measurement target 90 upon receiving the incident laser pulse beam 15 may be detected by the ultrasonic sensor 21 in a predetermined frequency band, and the waveform of the detected photoacoustic wave may be sampled at a predetermined sampling rate, thereby obtaining sampling data.

In S33, the sampling data may be stored in the memory 43.

According to an embodiment, the frequency band of the ultrasonic sensor 21 may include one or more frequencies having a length of a distance from the photoacoustic wave generating area 100 to the ultrasonic sensor 21 according to a given geometry as one wavelength.

According to an embodiment, the sampling rate on the photoacoustic wave received from the ultrasonic sensor 21 may be determined to be two times or greater of the ultrasonic frequency having, as one wavelength, one of a length of two times of the beam width W of the laser pulse beam 15 or a length of the distance L2 between the light-incident position A1 of the laser pulse beam 15 and the ultrasonic sensor 21 according to a given geometry.

According to an embodiment, in S32, the photoacoustic measuring apparatus 7 may perform detection while a sampling on the photoacoustic wave received from the ultrasonic sensor 21 is performed 100 times or greater and 3000 times or smaller.

The procedures from the pulse beam oscillation of S31 to the sampling data storage of S33 constitute one sampling cycle.

In S34, the photoacoustic measuring apparatus 7 may determine whether the number N of sampling cycles (Nis a natural number of 2 or larger) has reached a predetermined target number. In response to that the number has not yet reached the predetermined target number (No), the process may return to S31. In response to that the number has reached the predetermined target number (Yes), the process may proceed to S35.

According to an embodiment, N may be determined in a range of, for example, 100 to 1000. This is because, for example, when the N is greater than 1000 times, the time required for the entire measurement process may increase, the required capacity of the memory may also increase. When the Nis smaller than 100 times, for example, it is difficult to sufficiently improve the signal-to-noise ratio.

In S35, the photoacoustic measuring apparatus 7 may coherently average sampling data of a plurality of sampling cycles. The coherent-averaging is a process of averaging sampling data at the same sampling time points of respective sampling cycles. Thus, noise that may occur during each of the pulse beam oscillation, photoacoustic pressure wave generation, ultrasonic detection, and sampling process may be reduced and a signal-to-noise ratio (SNR) may be greatly improved.

According to an embodiment, after all sampling cycles have been completed, the photoacoustic measuring apparatus 7 may perform the coherent-averaging. In another embodiment, the photoacoustic measuring apparatus 7 may perform the coherent-averaging by averaging sampling data obtained for each current sampling cycle with sampling data of the immediately preceding sampling cycle.

In S36, the photoacoustic measuring apparatus 7 may analyze the sampling data stored in the memory 43 using the analyzer 44 to extract quantitative information about the components of the substance.

Figure 33:
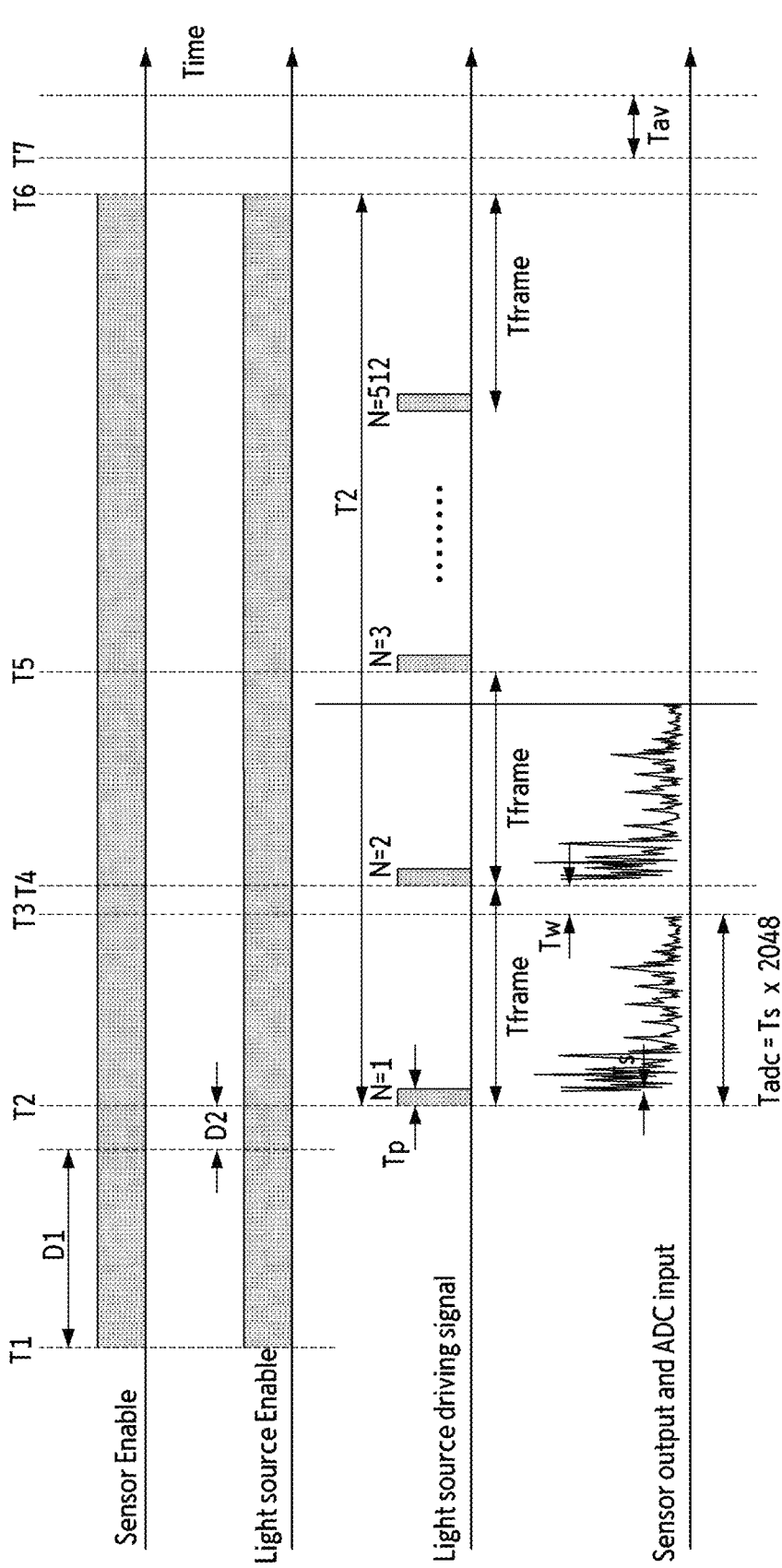
FIG. 33 is a diagram illustrating an operation of measuring photoacoustic wave over time by repeatedly emitting a laser pulse in a photoacoustic measurement method according to still another embodiment of the disclosure.

FIG. 33 is a diagram illustrating an operation of measuring photoacoustic wave over time by repeatedly emitting a laser pulse in a photoacoustic measurement method according to still another embodiment of the disclosure.

Referring to FIG. 33, similarly to the case of FIG. 31, according to the photoacoustic measurement method according to the embodiment, the photoacoustic measuring apparatus 7 may first activate the power of each of the light source driver 41, the ultrasonic sensor 21, and the sampling unit 45 at the first timing T1, and may perform necessary preparation operations during predetermined preparation times D1 and D2, respectively.

When the preparation is completed, the photoacoustic measuring apparatus 7 drives the light source 11 for a time duration corresponding to a predetermined pulse width Tp by operating the light source driver 41, and starts receiving and sampling acoustic waves from the ultrasonic sensor 21 in synchronization therewith to obtain sampling data of the first sampling cycle at the second timing T2. After the time duration corresponding to the pulse width Tp has elapsed from the second timing T2, the light source 11 stops oscillation. The sampling unit 45 starts to generate the sampling data by performing sampling of the analog acoustic wave signal received from the ultrasonic sensor 21 at a sampling interval Ts, for example, performs 2048 times of sampling during the sampling period Tadc.

At the third timing T3, the photoacoustic measuring apparatus 7 stores the generated sampling data of the first sampling cycle in the memory 43 during the writing period Tw. The sampling period Tadc and the writing period Tw constitute one sampling cycle period Tframe.

From a fourth timing T4 to a fifth timing T5, the photoacoustic measuring apparatus 1 repeats the operation from the second timing T2 to the fourth timing T4 to obtain sampling data of a second sampling cycle. The photoacoustic measuring apparatus 7 repeats this procedure N times (N is a natural number of 2 or greater) until a sixth timing T6, and cuts off the sensor enable and the light source enable. At a seventh timing T7, the photoacoustic measuring apparatus 7 performs coherent-averaging on N pieces of sampling data obtained during the N sampling cycles.

Subsequently, the photoacoustic measuring apparatus 7 may analyze the sampling data using the analyzer 44 to extract quantitative information about the substance component in the measurement target 90.

In one example, as described in the above embodiments, a laser light source may be adopted as a light source for generating a photoacoustic signal. In consideration of the potential risk of laser light, it is preferable that the photoacoustic measuring apparatus includes a safety means capable of immediately blocking the laser output when an improper state occurs. Because of the potential danger of laser light, the photoacoustic measuring apparatus needs to be equipped with a means for immediately stopping the laser output depending on the situation. However, there is considerable difficulty in integrating a multi-redundant laser safe-driving and stop function into the miniaturized form factor. Accordingly, the present disclosure provides a miniaturized photoacoustic measuring apparatus that realizes the laser safe-driving and stop function with a minimum number of proximity sensors. Hereinafter, specific examples thereof will be described in detail.

Figure 34:
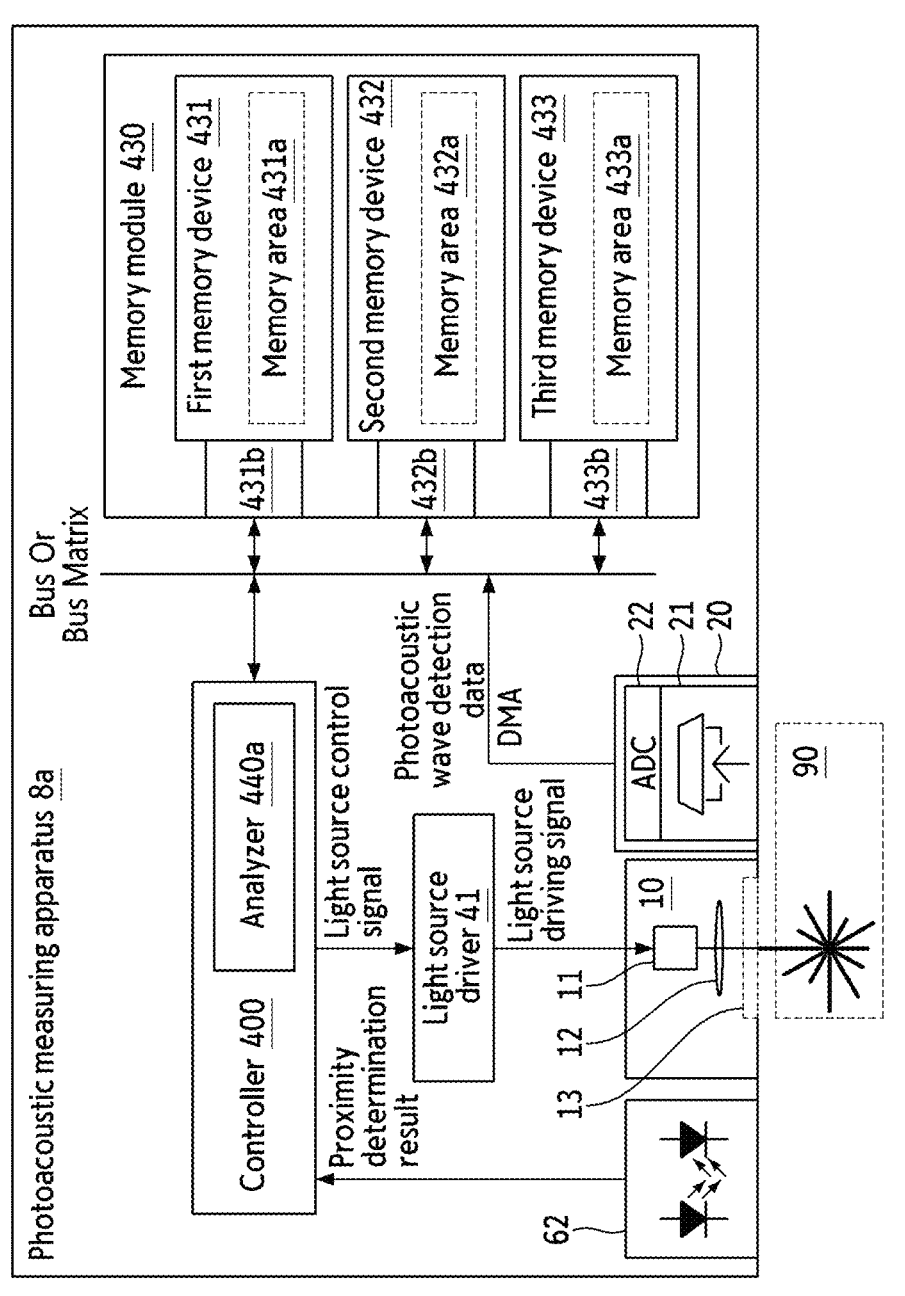
FIG. 34 is a schematic block diagram illustrating a photoacoustic measuring apparatus with a laser safe-driving function according to some still further embodiments of the present disclosure.

FIG. 34 is a schematic block diagram illustrating a photoacoustic measuring apparatus with a laser safe-driving function according to some still further embodiments of the present disclosure.

Referring to FIG. 34, a photoacoustic measuring apparatus 8a having a laser safe-driving function may include the light source unit 10, the light source driver 41, the photoacoustic detector 20, a memory module 430, a controller 400, and a proximity sensor 62. Preferably, the photoacoustic measuring apparatus 1 may be based on a small low power information processing unit commonly referred to as a Micro Control Unit (MCU) or a Micro Processor Unit (MPU), or may be implemented on a similar architecture thereto. In the present disclosure, the term "MCU" and the term "MPU" may be used interchangeably with each other and do not exclude each other unless explicitly stated otherwise. In the following description, descriptions of the same components as those in the previous embodiments will be omitted or briefly set forth.

According to an embodiment, the light source unit 10 may have at least one light source 11 embedded therein to generate laser light of a predetermined wavelength. For example, the light source 11 may be a light emitting diode (LED) or a laser diode (LD) that directly generates light. According to an embodiment, the light source unit 10 may further include one or more optical elements 12 necessary to guide light generated from the light source 11 and adjust optical properties thereof.

A light source driving signal for driving the light source 11 may be provided from the light source driver 20. The light source driver 20 may supply the light source driving signal to the light source 11 to pulse-drive the light source 11 to emit light with a predetermined light output for a predetermined period and oscillation time (duty), for example, for an oscillation time of several microseconds at a period of several milliseconds.

The light source unit 10 may include the optical opening 13 so that pulsed laser light emitted from the light source 11 may be finally emitted from the laser light source unit 10 toward the measurement target 90 through the optical elements 12. The pulsed laser light having passed through the optical opening 13 of the light source unit 10 may be incident on the measurement target 90. According to an embodiment, the optical opening 13 may be an optically transparent optical guide or an optical tube, and may further include a dust cover or an acoustic coupler, if necessary.

The pulsed laser light incident into the measurement target 90 generates the photoacoustic wave in the intended photoacoustic wave generating area. The photoacoustic detector 20 may include the acoustic sensor 21 and an analog-digital converter (ADC) 22. The acoustic sensor 21 of the photoacoustic detector 20 may have the measurement surface is acoustically coupled with the measurement target 90 and thus detect the photoacoustic wave transmitted from the measurement target 90.

When the photoacoustic wave generated in the measurement target 90 reaches the acoustic sensor 21, the acoustic sensor 21 outputs an analog acoustic signal obtained by detecting the photoacoustic wave, and the analog acoustic signal output from the acoustic sensor 21 may be digitized in the ADC 22 operating at a predetermined sampling rate. The digitized sound signal may be stored in one of memory areas 431a, 432a, and 433a in the memory module 430 directly via a direct memory access (DMA) channel without passing through the controller 400. In this regard, the digitized acoustic signal as photoacoustic wave detection data may be directly stored or be subject to a predetermined post-processing and be stored. An example in which the ADC 22 is a part of the photoacoustic detector 20 has been described. However, in another example, the ADC 22 may be a part of the MPU or the MCU in which the controller 40 is implemented, or may be implemented in a separate circuit device.

Since the pulsed laser light is periodically incident on the measurement target 90, the photoacoustic wave detection data is also periodically generated, and the photoacoustic wave detection data may be stored in one of the plurality of memory areas 431a, 432a, and 433a. The first to third memory areas 431a, 432a, and 433a may be set such that one of the controller 400 and the analyzer 440a and the photoacoustic detector 20 do not simultaneously access one memory area at one time.

In other words, a specific memory area is exclusively allocated to a specific function at a specific point in time, and thus two or more functions may be set to access two or more different memory areas so that the functions are simultaneously performed. For example, while the controller 400 or the analyzer 440a is accessing the photoacoustic wave detection data previously stored in the first memory area 431a, the photoacoustic wave detection data generated from the photoacoustic detector 20 may be stored in the second memory area 432a or the third memory area 433a via the DMA.

To this end, the memory module 430 may include a plurality of memory devices 431, 432, and 433 respectively having dedicated memory ports 431b, 432b, and 433b connected to a bus or a bus matrix. In this case, the plurality of memory areas 431a, 432a, and 433a may be set in the plurality of memory devices 431, 432, and 433, respectively. Accordingly, the memory areas 431a, 432a, and 433a may be accessed exclusively and simultaneously through the bus or bus matrix as needed.

The controller 400 may further include an analyzer 440a therein, and the analyzer 440a may analyze the photoacoustic wave detection data stored in the memory areas 431a, 432a, and 433a of the memory module 430. According to an embodiment, the measurement target is the skin, and the photoacoustic wave detection data may include quantitative information about the components of a specific substance in the dermal layer of the skin.

The proximity sensor 62 may output the proximity decision as one of proximity state and non-proximity state based on how close the measurement target 90 and the laser light source unit 10 are to each other. According to an embodiment, the proximity sensor 62 may be implemented with the contact sensor 30 described above. In some embodiments, the proximity sensor 62 may be an optical sensor, an acoustic sensor, a capacitance sensor, a body impedance sensor, or a combination thereof.

When the proximity sensor 62 is an optical sensor, the proximity sensor 62 may be an infrared red (IR) sensor or a time of flight (TOF) sensor. According to an embodiment, the proximity sensor 62 may have asymmetrical characteristics in which a condition for determining the transition from the non-proximity state to the proximity state and a condition for determining the transition from the proximity state to the non-proximity state are different from each other. For example, the proximity sensor 62 may be embodied as a IR sensor. In this case, when the laser light source unit 10 is far away from the skin as the measurement target 90 and then approaches the skin, it may be determined that it is in the proximity state with the skin only when a distance therebetween is only about 2 to 3 mm. When it is removed from the skin, it may be determined that it is in the non-proximity state with the skin only when the distance therebetween is about 5 to 6 mm.

According to an embodiment, the proximity sensor 62 may transmit the proximity decision of identifying the transition from the non-proximity state to the proximity state or identifying the transition from the proximity state to the non-proximity state to the controller 400 in an interrupt manner. In another embodiment, the controller 400 may access the proximity sensor 62 in a polling manner to check the proximity state.

According to an embodiment, when the proximity decision of the proximity sensor 62 is changed from the non-proximity state to the proximity state, the controller 400 may start the operation of each of the light source driver 41 and the photoacoustic detector 20. Accordingly, the photoacoustic measuring apparatus 8a may be controlled to not emit a laser until, for example, the photoacoustic measuring apparatus 8A comes into contact with the skin, and to emit the laser only after the skin contact is identified.

In one example, the device emitting the laser to the skin emits the laser only when it substantially comes into contact with the skin. The device emitting the laser to the skin is regulated to stop the laser oscillation within a certain safety-stop time duration when the photoacoustic measuring apparatus 1 is removed from the skin for any reason. For example, the certain safety-stop time duration may be 100 ms from a time point when it is detected that the photoacoustic measuring apparatus 1 is removed from the skin. From among the IR sensor, the TOF sensor, the ultrasonic proximity sensor, the capacitance sensor, and the BI sensors illustrated as sensors capable of determining whether the apparatus is in contact with the skin, one may be appropriately selected in terms of component size, area, volume, minimum effective distance, accuracy, resolution, detection speed, reliability, power consumption, ease of integration, cost, etc.

Furthermore, for a safer and more reliable laser safety-stop function, it is recommended to use two or more sensors that detect whether the apparatus contacts the skin for multi-redundancy. In particular, the sensing function when the photoacoustic measuring apparatus 1 moves away from the skin as a condition that stops the oscillation of the laser should be multi-redundant.

However, since the photoacoustic measuring apparatus 1 includes large components such as a laser light source, a driving circuit, a photoacoustic detector, a circuit board, a display, and a battery in a miniaturized form factor, it is not easy to maintain the miniaturized form factor while mounting an additional proximity sensor therein. The photoacoustic measuring apparatus 8a according to some embodiments of the present disclosure may analyze the photoacoustic wave detection data when the photoacoustic measuring apparatus 1 moves away from the skin, thereby implementing a sensing function when the photoacoustic measuring apparatus 1 moves away from the skin without mounting an additional proximity sensor.

However, it is also not easy for photoacoustic measuring apparatuses that emit pulsed lasers according to the prior art to stop the laser oscillation within a safety-stop time duration while analyzing the photoacoustic wave detection data in real time. For example, the conventional photoacoustic measuring apparatus needs to directly connect the ADC and the memory device to each other via the DMA channel for 2 to 3 seconds in order to repeat the operation of digitizing and storing photoacoustic wave detection data within a short pulse period of 2 to 3 ms, quickly, for example, 1000 times. In this regard, the DMA channel refers to an exclusive data transmission path formed from the ADC through a bus and a memory port to a specific memory area by the DMA controller of the ADC.

In the conventional photoacoustic measuring apparatus, for example, the DMA channel exclusively uses the corresponding memory device until the planned 1000 times of pulse laser driving and storage of the photoacoustic wave detection data are completed, so that the MCU may not access the photoacoustic wave detection data being stored. Therefore, the operation of analyzing the photoacoustic wave detection data by the MCU may be performed only after a situation in which the DMA channel exclusively uses the corresponding memory device is terminated, that is, after the 2 to 3 seconds has elapsed. It is substantially impossible for the conventional photoacoustic measuring apparatus to perform the safety-stop within 100 ms after the photoacoustic measuring apparatus 1 is removed from the skin, based on the analysis of the photoacoustic wave detection data.

On the other hand, the controller 400 of the photoacoustic measuring apparatus 8a according to some embodiments of the present disclosure may divide the entire measurement period into a plurality of short cycles, and simultaneously generate, store, and analyze the photoacoustic wave detection data for each of the individual cycles.

Specifically, the controller 400 may store the photoacoustic wave detection data generated in a current cycle in one memory area, and may analyze the photoacoustic wave detection data stored in another memory area in the previous cycle. Accordingly, the controller 400 alternately stores the photoacoustic wave detection data in different memory areas, and analyzes the photoacoustic wave detection data stored in the previous cycle, thereby implementing a sensing function for determining whether the photoacoustic measuring apparatus 8a has been away from the skin.

More specifically, the controller 400 may divide the entire measurement period into, for example, 100 short cycles. The controller 400 may select one of the plurality of memory areas, directly access the selected memory area through the DMA channel, and store the photoacoustic wave detection data generated in the current cycle therein. The memory area selected for storing the photoacoustic wave detection data in the current cycle may be selected from among the remaining memory areas except for the memory area in which the unverified photoacoustic wave detection data is stored.

According to an embodiment, the photoacoustic measuring apparatus 8a may be implemented in a small information processing unit based on an MCU or MPU. Typically, a computing device such as a MCU or a MPU, a memory device such as a SRAM or a DRAM, a storage, a ADC, a peripheral device, a USB device, a communication device, a display, etc. may be connected to each other via one system bus or bus matrix. The bus or a bus matrix is implemented so that as many devices as possible may be connected to each other via the bus or a bus matrix at the same time. However, when any two devices are connected to each other through a bus, the other devices may not be connected to the two devices through the bus.

For example, if the DMA controller of the ADC and the first memory port 431b of the first memory device 431 are connected to each other through a bus, the controller 400 may not be connected to the first memory port 431b and thus may not access any memory area in the first memory device 431. However, in the meantime, the controller 400 is connected to the second memory port 432*b* of the second memory device 432 through the bus so that there is no restriction in accessing the second memory area 432*a*.

Accordingly, when the plurality of memory areas 431*a*, 432*a*, and 433*c* are respectively allocated to the memory devices 431, 432, and 433 connected to the bus via the different memory ports 431*b*, 432*b*, and 432*c*, respectively, one memory area may be connected to the DMA channel to store the photoacoustic wave detection data therein, while the other memory area may be connected to the MPU to verify the validity of the photoacoustic wave detection data.

According to an embodiment, two memory areas 431*a* and 432*a* are respectively allocated to two memory devices 431 and 432 having respective memory ports 431*b* and 432*b* such that while the photoacoustic wave detection data of the current cycle is stored in the first memory area 431*a* from the ADC through the DMA channel, the controller 400 verifies the validity of the photoacoustic wave detection data of the immediately preceding cycle stored in the second memory area 432*a* is verified by the controller 400. In this way, the storing and verifying may be repeated.

In this regard, the verification and validity may be understood in the following context. In order to measure the concentration of a specific organic substance inside the skin, the photoacoustic measuring apparatus 8*a* maintains an appropriate contact state with the skin, so that a laser beam of an appropriate intensity and width should be incident into the skin in an appropriate direction and at an appropriate depth, and an appropriately generated photoacoustic wave should also be appropriately detected. When all of these appropriate conditions are not met, incorrect concentration measurements will be calculated from such photoacoustic wave detection data. It is determined that such photoacoustic wave detection data is not valid.

On the contrary, when the laser incidence condition and acoustic measurement conditions on the skin are appropriate, it may be determined that such photoacoustic wave detection data are valid. In this sense, the verification as used herein may be referred to as an operation of estimating the appropriateness of the laser incidence condition and the acoustic measurement condition on the skin from a static or dynamic aspect of photoacoustic wave detection data. When it is determined that the photoacoustic wave detection data is invalid as a result of the verification, the photoacoustic measuring apparatus 8*a* may discard the photoacoustic wave detection data or may further stop the measurement procedure itself.

Accordingly, when the proximity decision of the proximity sensor 62 is changed from the non-proximity state to the proximity state, the controller 400 may start the operation of each of the light source driver 41 and the photoacoustic detector 20, and may store the photoacoustic wave detection data in the current cycle in the first memory area 431*a* among the plurality of memory areas. In addition, the controller may verify the validity of the unverified photoacoustic wave detection data of the previous cycle stored in the second memory area 432*a* in the current cycle, and stop the operation of the laser light source unit 20 based on a first event of determining that the photoacoustic wave detection data in the previous cycle is invalid.

According to an embodiment, the validity of the unverified photoacoustic wave detection data may be determined based on at least one of peak timing, peak-to-peak difference, zero crossing timing, zero crossing area, or envelope shape as time domain features.

According to an embodiment, the validity of the unverified photoacoustic wave detection data may be determined based on at least one of a peak magnitude, a relative peak ratio, energy, or power of specific peak frequencies as frequency domain features.

According to an embodiment, the validity of the unverified photoacoustic wave detection data may be determined based on a relative variation of the photoacoustic wave detection data of the current cycle with respect to the photoacoustic wave detection data of the at least one previous cycle. The validity of the unverified photoacoustic wave detection data will be described in more detail in FIGS. 38 to 42 below.

According to an embodiment, the controller 400 may be configured to determine the start of the operation of each of the light source driver 41 and the photoacoustic detector 20 according to the proximity decision of the proximity sensor 62, and determine the stop of the operation of the laser light source unit 10 based on the decision of the validity of the photoacoustic wave detection data of the previous cycle among the photoacoustic wave detection data detected for the divided cycles.

According to an embodiment, the controller 400 may be configured to determine the stop of the operation of the laser light source unit 10 based on a combination of the first event of determining that the photoacoustic wave detection data is not valid and a second event in which the proximity decision of the proximity sensor 62 is switched from proximity state to non-proximity state.

According to an embodiment, the controller 400 may be configured to determine the start of the operation of each of the light source driver 41 and the photoacoustic detector 20 according to the proximity decision of the proximity sensor 62, and to determine the stop of the operation of the laser light source 10 based on the change in the proximity decision of the proximity sensor 62. According to an embodiment, a time point at which the oscillation of the laser pulses is actually stopped after the suspension of the operation of the laser light source unit 10 is determined may be appropriately selected according to a situation.

For example, the controller 400 may set the length of the cycle so that the time duration between the initial time at which the operation stop of the laser light source unit 10 may be determined and the time at which the oscillation of the laser pulse is actually stopped is not greater than the safety-stop time duration. In this case, the time duration between the time point at which the operation stop of the laser light source unit 20 may be determined and the time point at which the oscillation of the laser pulse is actually stopped may be set not to be longer than the safe-stop time duration by the controller 400.

In this embodiment, the worst case may be a case in which the photoacoustic measuring apparatus 8*a* is removed from the skin when a specific cycle starts, and it is determined that the photoacoustic wave detection data of the immediately preceding cycle is not valid at the beginning of the next cycle to the specific cycle. In this case, a time duration obtained by adding the length of one cycle to the photoacoustic wave detection data validity calculation time duration and the execution time duration of the laser pulse oscillation stop command may be set not to exceed the safety-stop time duration. For example, when the safety-stop time duration is 100 ms, the length of one cycle may be set to about 100 ms, or may be set to about 90 ms, which is a slightly shorter time than the safety-stop time duration, in consideration of the calculation and execution time durations.

According to an embodiment, since the controller 400 generates the light source driving signal at a very precise timing for each cycle, it may be preferable to generate the light source driving signal without stopping the operation of the light source until the end of the cycle once the cycle starts. In this case, after determining the operation stop of the laser light source unit 10, the controller 400 may control the light source driver 41 so that the additional generation of the light source driving signal is not performed by canceling the next cycle after the current cycle has ended. According to an embodiment, the controller 400 may set the length of the cycle such that the sum of the lengths of the two cycles is not greater than the safety-stop time duration.

In this embodiment, the worst case may be a case in which the photoacoustic measuring apparatus 8a is removed from the skin when a specific cycle starts, and the light source driving signal is continuously generated from the start to the end of the next cycle thereto. In this case, the lengths of the two cycles may be set not to exceed the safety-stop time duration. For example, when the safety-stop time duration is 100 ms, the length of one cycle may be set to about 50 ms.

Figure 35:
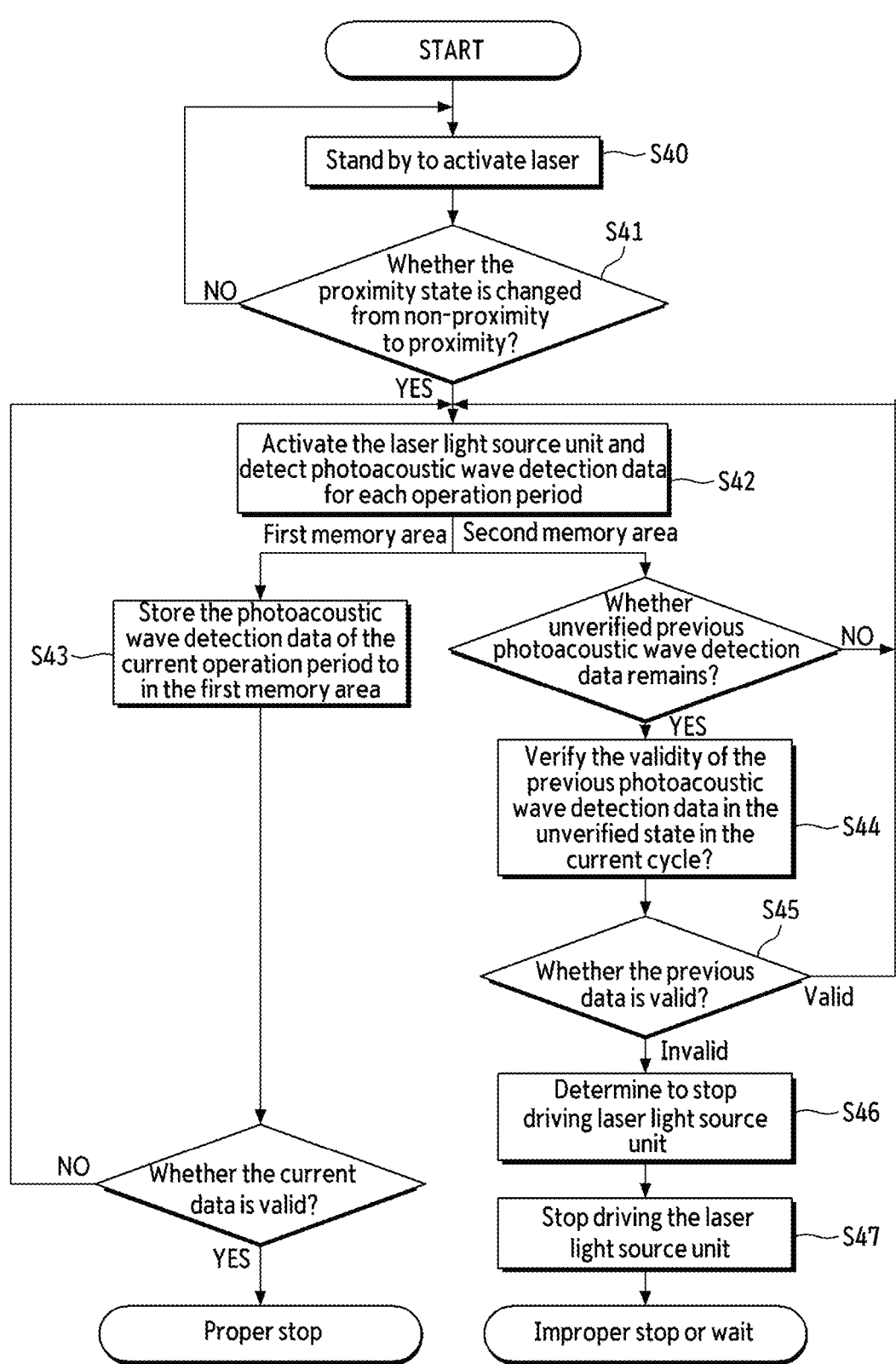
FIGS. 35 to 36B are flowcharts illustrating a laser safe-driving method of a photoacoustic measuring apparatus according to some embodiments of the present disclosure.
Figure 36A:
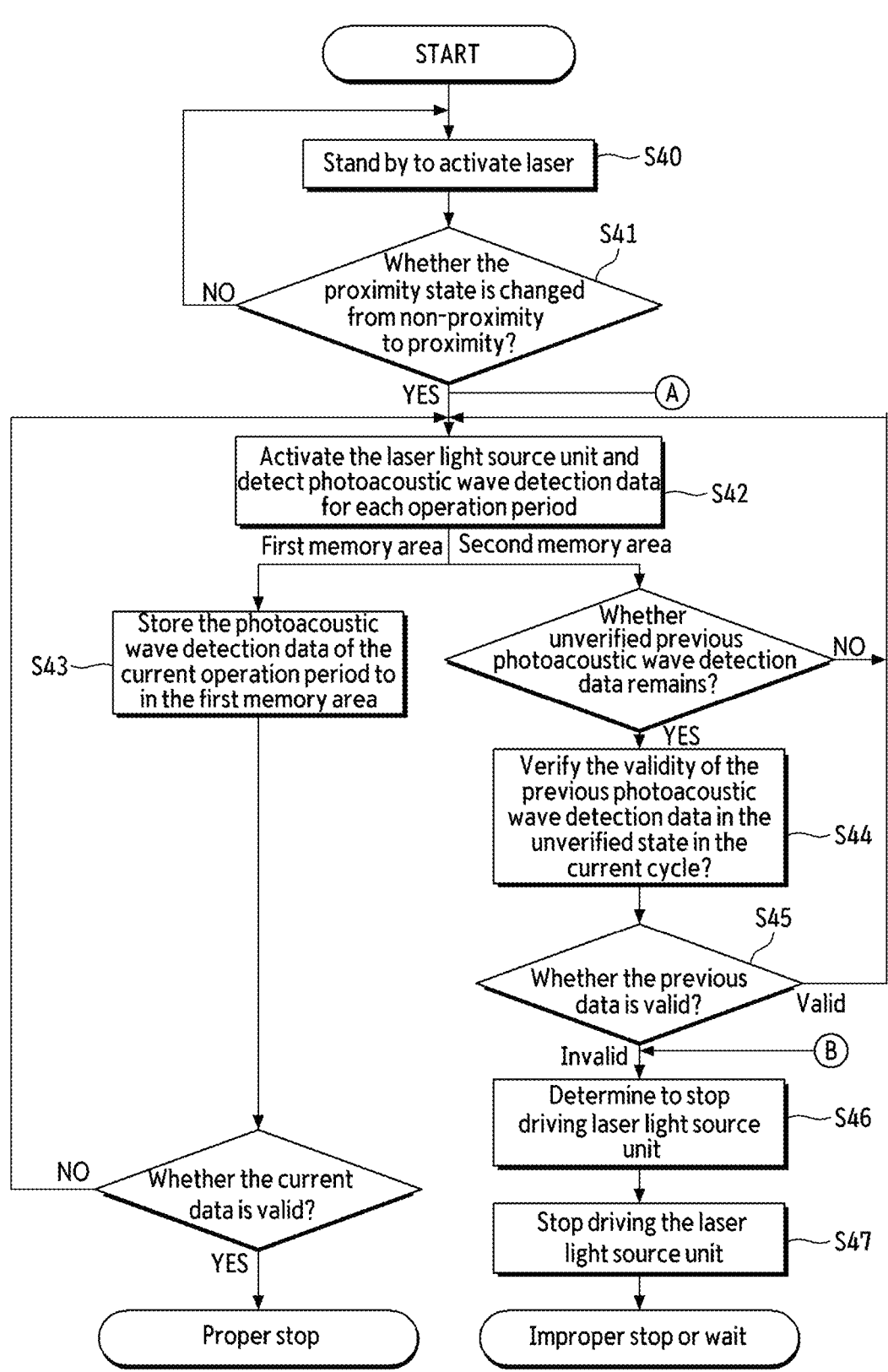
Figure 36B:
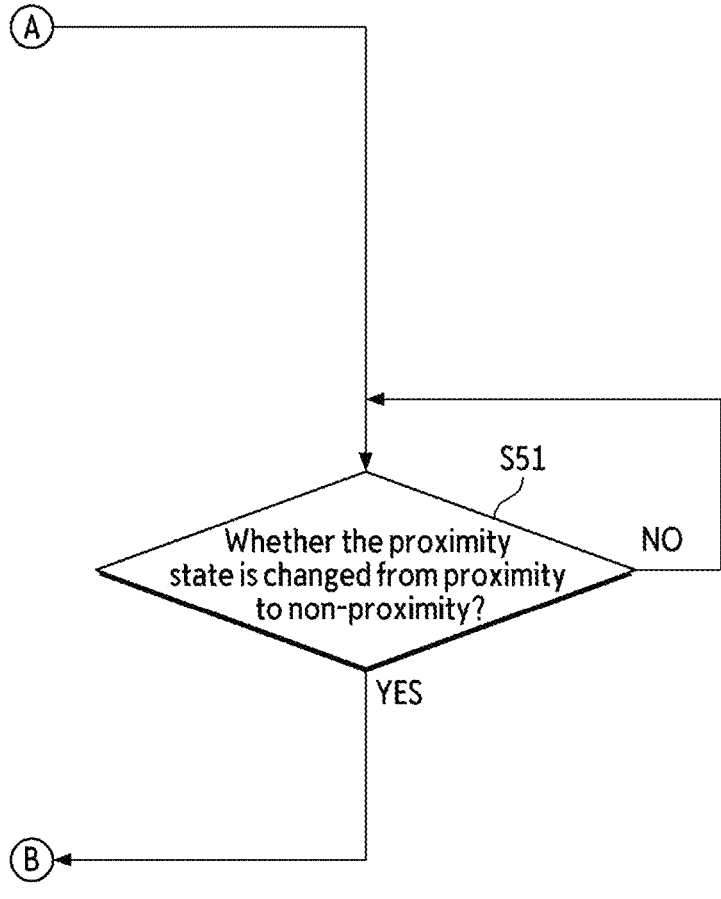

FIGS. 35 to 36B are flowcharts illustrating a laser safe-driving method of a photoacoustic measuring apparatus according to some embodiments of the present disclosure. This is only a preferred embodiment for achieving the purpose of the present disclosure, and it is obvious that some steps may be added or deleted as necessary.

Referring to FIG. 35, the laser safe-driving method of the photoacoustic measuring apparatus may start from S40 of initializing each of the laser light source unit 10, the light source driver 41, the photoacoustic detector 20, the memory module 430, and the proximity sensor 62, and standing by to activate the laser and perform photoacoustic detection immediately upon contact with the skin.

In S41, the controller 400 determines whether the proximity state of the light source unit 10 is changed from the non-proximity state to the proximity state with respect to the measurement target 90 detected by the proximity sensor 62. When the proximity state is not changed from the non-proximity state to the proximity state, the procedure returns to S40, and the controller 400 continuously monitors the proximity state.

When the proximity state is changed from the non-proximity state to the proximity state in S41, the controller 400 may operate the light source driver 41 to generate the light source driving signal for the laser light source unit 10 to emit the light for a predetermined pulse period and oscillation time for each cycle of a predetermined time length, and operate the photoacoustic detector 20 to detect an analog acoustic signal through the acoustic sensor 21 and to generate digitized photoacoustic wave detection data through the ADC 22 in S42.

In S43, the controller 400 specifies the first memory area 431a in which the photoacoustic wave detection data of the current cycle is to be stored, and connects the memory port 431b of the first memory device 431 in which the specified first memory area 431a is located with the DMA controller of the ADC 22 through the bus to generate the DMA channel, thereby controlling the photoacoustic wave detection data of the current cycle to be stored without loss in real time.

In addition, in S44, the controller 400 may specify, in the current cycle, the second memory area 432a in which the photoacoustic wave detection data in the unverified state in the previous cycle, preferably the immediately preceding cycle is stored, other than the first memory area 431a in which the photoacoustic wave detection data during the current cycle is stored. The controller may connect the memory port 432b of the second memory device 432 in which the specified second memory area 432a is located to the DMA controller of the ADC 22 through the bus to verify the validity of the photoacoustic wave detection data in the unverified state as stored in the second memory area 432a.

However, since there is no unverified previous photoacoustic wave detection data in the initial cycle, S44 may not be performed.

If the first event of determining that the photoacoustic wave detection data stored in the second memory area 432a is invalid as a result of the validation of the photoacoustic wave detection data in S45, the controller 400 may determine to stop driving the laser light source unit 10 based on the invalidity determination event of S45, and transmit the corresponding light source control signal to the light source driver 41 in S46.

In S47, the light source driver 41 may stop driving the laser light source unit 10 by stopping the light source driving signal transmitted to the laser light source unit 10. According to an embodiment, the light source driver 41 may stop the light source driving signal immediately or with a minimum delay according to the light source control signal instructing the stop of driving. According to an embodiment, the light source driver 41 may stop the light source driving signal in accordance with the end of the current sampling cycle according to the light source control signal instructing the stop of driving.

If the determination that the data is invalid does not occur during all cycles and a predetermined termination condition is satisfied, the photoacoustic measuring apparatus 8a may properly terminate the measurement and display the measurement result to the user. On the contrary, when an improper situation such as being removed from the skin occurs and the determination that the data is invalid is made, the photoacoustic measuring apparatus 8a may improperly end the measurement and display the measurement failure to the user.

Hereinafter, another example of a laser safe-driving method of a photoacoustic measuring apparatus will be described with reference to FIGS. 36A and 36B. In FIGS. 36A and 36B, descriptions of operations substantially the same as or similar to the operations of FIG. 35 will be omitted.

In the operations of FIG. 35, once the proximity state of the proximity sensor 62 is switched from non-proximity state to proximity state and thus the measurement operation is started, the controller 400 no longer preferentially uses the non-proximity decision of the proximity sensor 62 during subsequent cycles, whereas in operations of FIGS. 36A and 36B, the controller 400 may consider the non-proximity decision of the proximity sensor 62 even after the start of the measurement operation.

Specifically, in S51, the controller 400 determines whether the proximity state of the light source unit 10 is changed from proximity to non-proximity state with respect to the measurement target 90 detected by the proximity sensor 62. When the proximity state is not switched from proximity state to non-proximity state, proper cycles are repeated.

If the second event in which the proximity state is changed from proximity state to non-proximity state occurs in S51, the controller 400 may be configured to determine to stop the operation of the laser light source unit 10 based on a combination of the first event in which the photoacoustic wave detection data is determined to be invalid and the second event in which the proximity decision of the proximity sensor 62 is changed from proximity state to non-proximity state in S46.

According to an embodiment, the controller 400 may be configured to determine to stop the operation of the laser light source unit 10 in response to that both the first event and the second event in which the proximity decision of the proximity sensor 62 is switched from proximity state to non-proximity state occur. According to an embodiment, the controller 400 may be configured to determine to stop the operation of the laser light source unit 10 without waiting for the first event, by prioritizing the second event in which the proximity decision of the proximity sensor 62 is switched from proximity state to non-proximity state over the first event.

Figure 37:
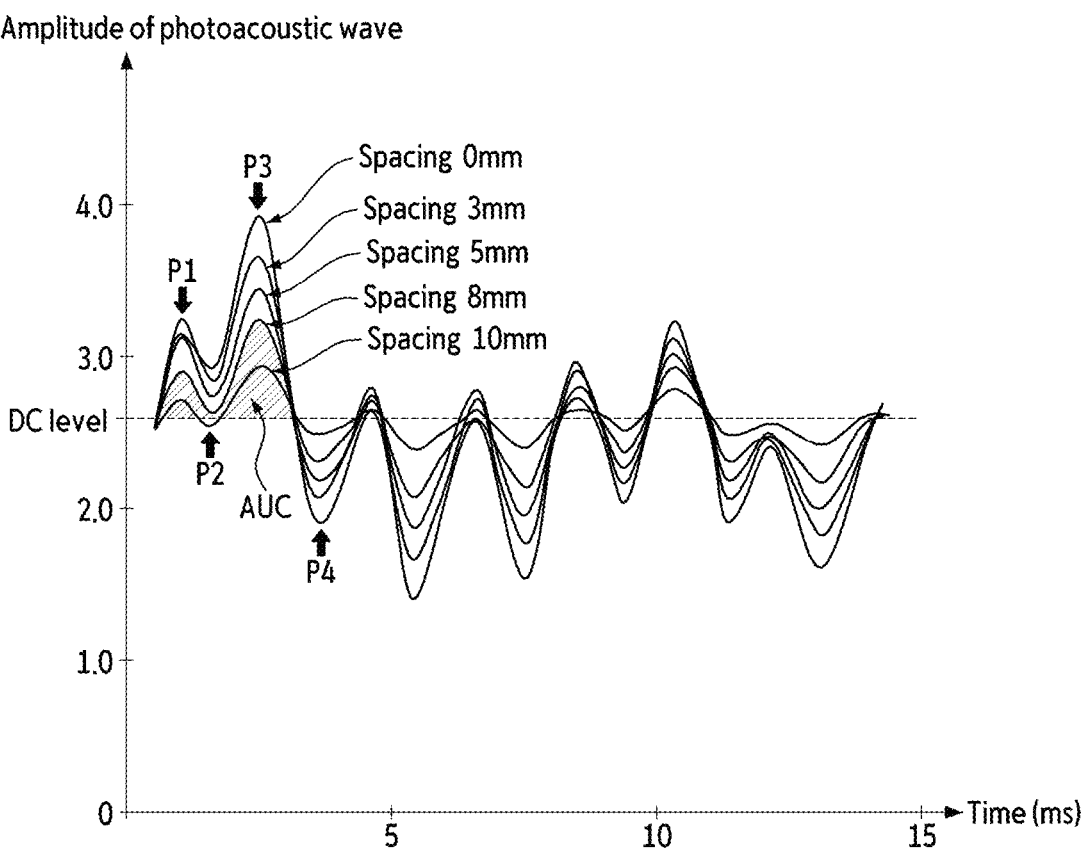
FIG. 37 is a diagram illustrating photoacoustic wave detection data in a time domain while the photoacoustic measuring apparatus is removed from a contact area according to some embodiments of the present disclosure.

FIG. 37 is a diagram illustrating photoacoustic wave detection data in a time domain while the photoacoustic measuring apparatus is removed from a contact area according to some embodiments of the present disclosure.

Referring to FIG. 37, the waveform of the photoacoustic wave detected by the photoacoustic wave detector 20 from the measurement target 90 when the photoacoustic wave measuring apparatus 1 is spaced, by 0 mm, 3 mm, 5 mm, 8 mm, and 10 mm, from the contact portion of the measurement target 90, respectively, is illustrated. When the photoacoustic measuring apparatus 8a is removed from the contact portion, it is difficult for the photoacoustic sound to pass through the air layer from the measurement target 90 and to be transmitted to the photoacoustic detector 20, so that the magnitude of the photoacoustic wave detection data detected by the photoacoustic detector 20 is expected to rapidly decrease. However, since the photoacoustic detector 20 mounted on the photoacoustic measuring apparatus 8a is very sensitive and is close to the photoacoustic wave generating area inside the measurement target 90, it may be appreciated that even when the photoacoustic detector 20 is removed from the contact portion, the photoacoustic wave is detected to some extent due to the near field effect.

Upon observing the graphs of FIG. 37, based on the variation in the photoacoustic waveform due to the increase in the spacing, features may be selected that may be used to reliably determine that the spacing is sufficiently large such that the apparatus is no longer in contact with the skin and thus the photoacoustic wave detection data is no longer valid.

For example, according to an embodiment, the time domain features for such validity determination may include a peak size, a peak-to-peak difference, a zero crossing timing, a zero crossing area under the curve (AUC), or an envelope shape in a waveform from which the DC level is removed. In one example, as used herein, the terms "peak", "zero crossing", and "envelope" relate to waveforms from which the DC level is removed.

For example, the peak magnitude feature may be a value regarding absolute magnitudes of the first peak P1, the second peak P2, and the third peak P3 in a waveform from which the DC level is removed. For example, the peak-to-peak difference feature may be a value regarding a difference between absolute magnitudes of the first peak P1, the second peak P2, and the third peak P3 in the waveform from which the DC level is removed.

For example, the zero crossing timing feature may relate to a sudden fluctuation in which as the spacing between the skin and the apparatus increases, initially-occurring zero crossing is shifted from a value between the third peak P3 and the fourth peak P4 to a value between the first peak P1 and the second peak P2. For example, the zero crossing AUC feature may relate to a rapid decrease in the graph area to the initially-occurring zero crossing as the spacing therebetween increases. For example, the envelope feature may relate to a tendency of the envelope of the waveform to shrink as the spacing therebetween increases.

Figure 38:
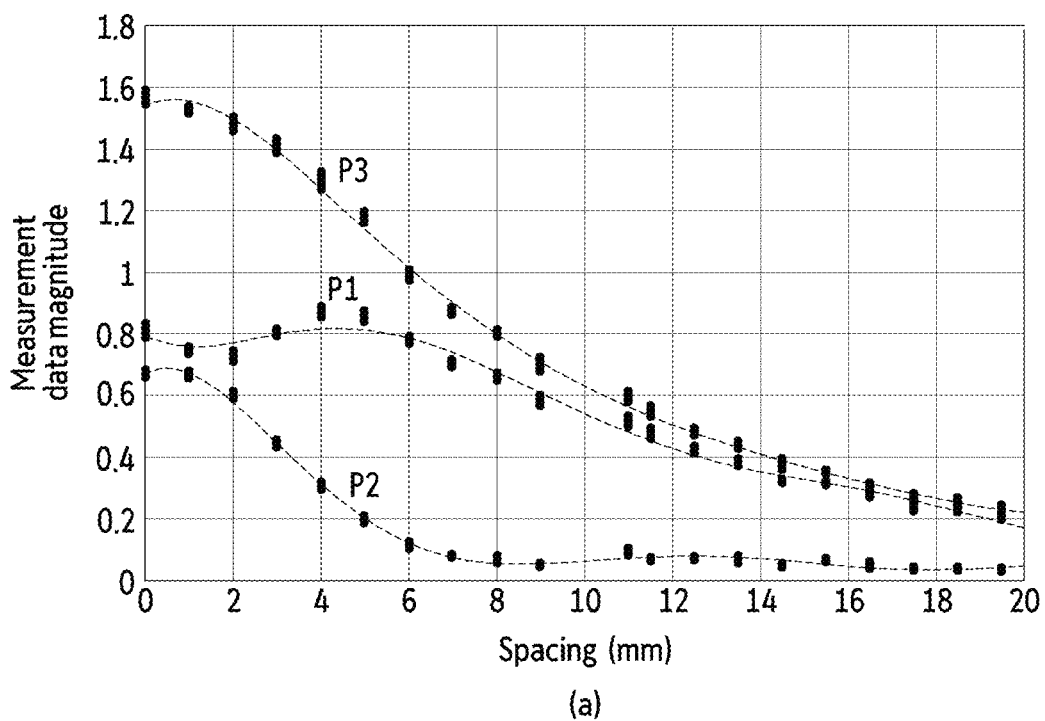
FIGS. 38 and 39 are graphs illustrating dynamic changes in time domain features of photoacoustic wave detection data while the photoacoustic measuring apparatus is removed from the contact site according to some embodiments of the present disclosure.
Figure 38:
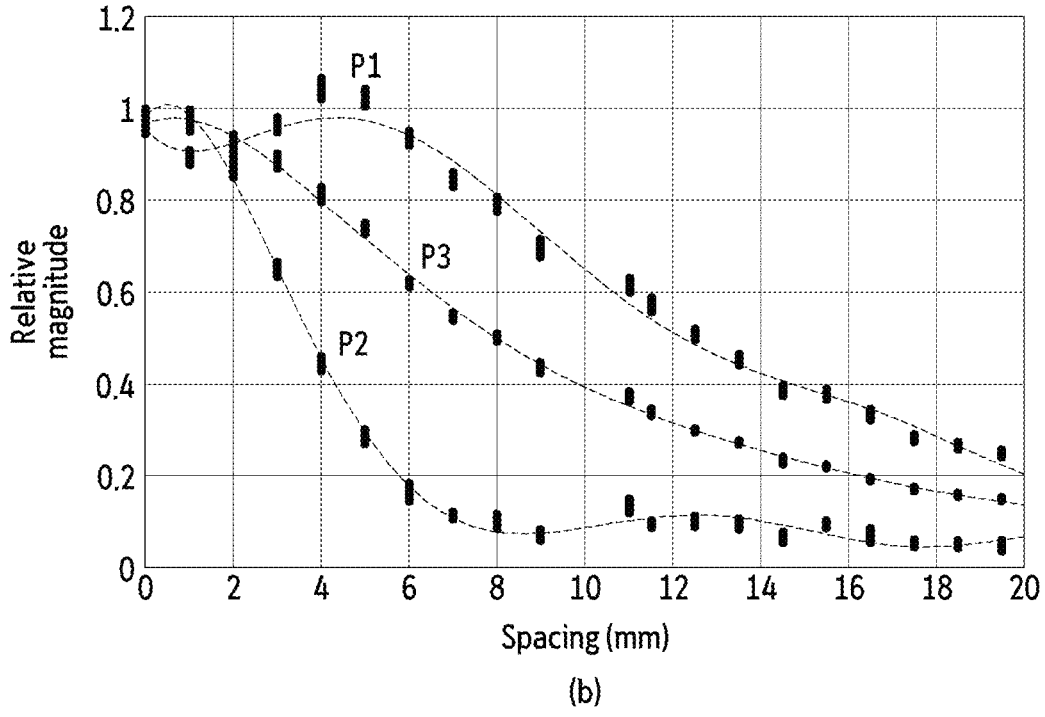
Figure 39:
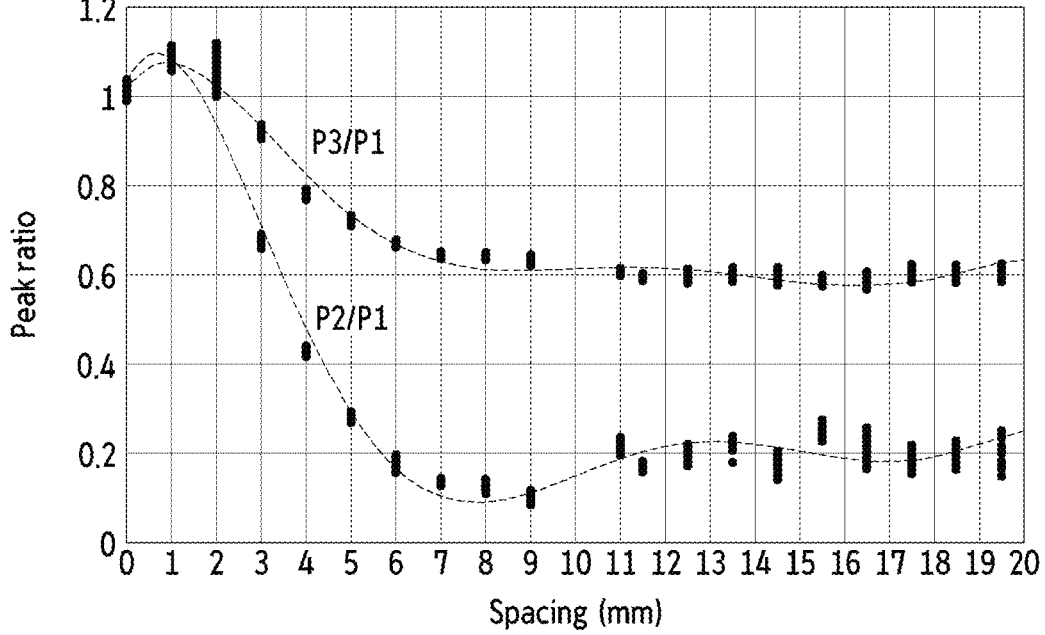

FIGS. 38 and 39 are graphs illustrating dynamic changes in time domain features of photoacoustic wave detection data while the photoacoustic measuring apparatus is removed from the contact site according to some embodiments of the present disclosure.

Realistically, when the photoacoustic measuring apparatus 8a is removed from and is away from the contact site during use, this may occur for several ms for which the pulsed laser light is incident on the skin several times. Thus, the validity of the photoacoustic wave detection data and the proximity state may be determined by observing the dynamic changes in time domain features when the photoacoustic measuring apparatus 8a is removed from and is away from the contact site.

In FIG. 38, (a) illustrates a dynamic change in which the peaks of the photoacoustic wave detection data decrease while the photoacoustic measuring apparatus is removed and moves away from the contact site, and (b) illustrates how much these peaks have decreased relative to that in the contact state. The photoacoustic wave detection data is repeatedly measured, and a plurality of measurement values at each spacing are indicated in an overlapping manner. FIG. 39 shows variation in the ratio of peaks.

In FIG. 38, it may be identified that the third peak P3, which is the largest at the initial timing of the photoacoustic wave detection data, linearly decreases as the spacing increases. When the invalidity determination is made based on the third peak P3, it may be determined that the data may be invalid in response to that the spacing is about 6 to 8 mm.

The first peak P1 that first appears at the beginning of the photoacoustic wave detection data tends to increase and then decrease while the spacing increases. In addition, the second peak P2 having the valley that first appears at the beginning of the photoacoustic wave detection data, tends to decrease rapidly while the spacing between the contact site and the apparatus increases. When the invalidity determination is made based on the second peak P2, it may be determined that the data may be invalid in response to that the spacing is about 4 to 5 mm.

According to the observation result, the variations of the ratios of the third peak P3 and the second peak P2 with respect to the first peak P1, that is, P3/P1 and P2/P1, are respectively indicated in FIG. 39. It may be identified that the P2/P1 ratio fluctuates rapidly enough such that it may be determined that the data may be invalid in response to that the spacing is 3 to 4 mm. Although the P3/P1 ratio is smaller than the P2/P1 ratio, the P2/P1 ratio exhibits the fluctuation enough such that it may be determined that the data may be invalid in response to that the spacing is 4 to 5 mm.

Figure 40:
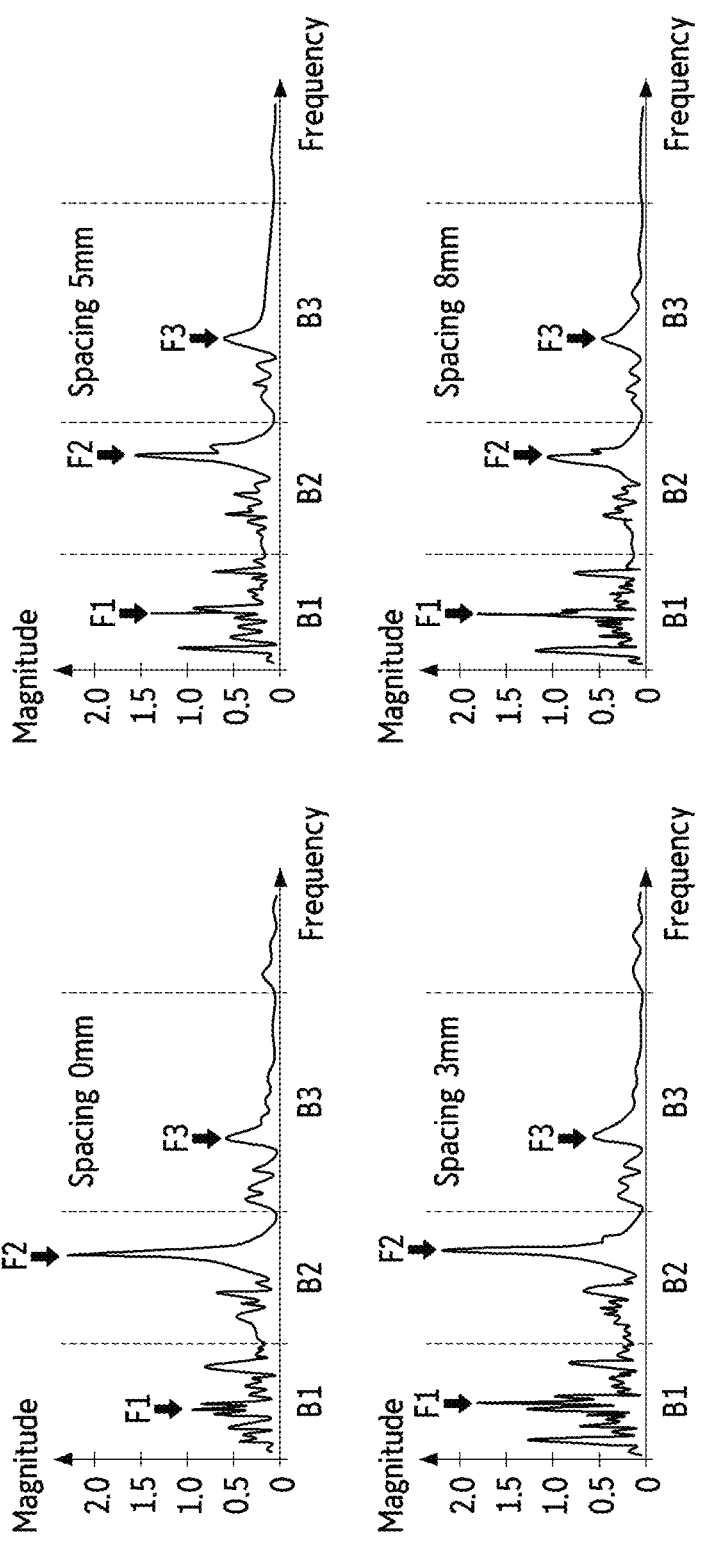
FIGS. 40 and 41 are diagrams illustrating behavior changes and relative variations of photoacoustic wave detection data in the frequency domain while the photoacoustic measuring apparatus is removed from the contact site according to some embodiments of the present disclosure.
Figure 41:
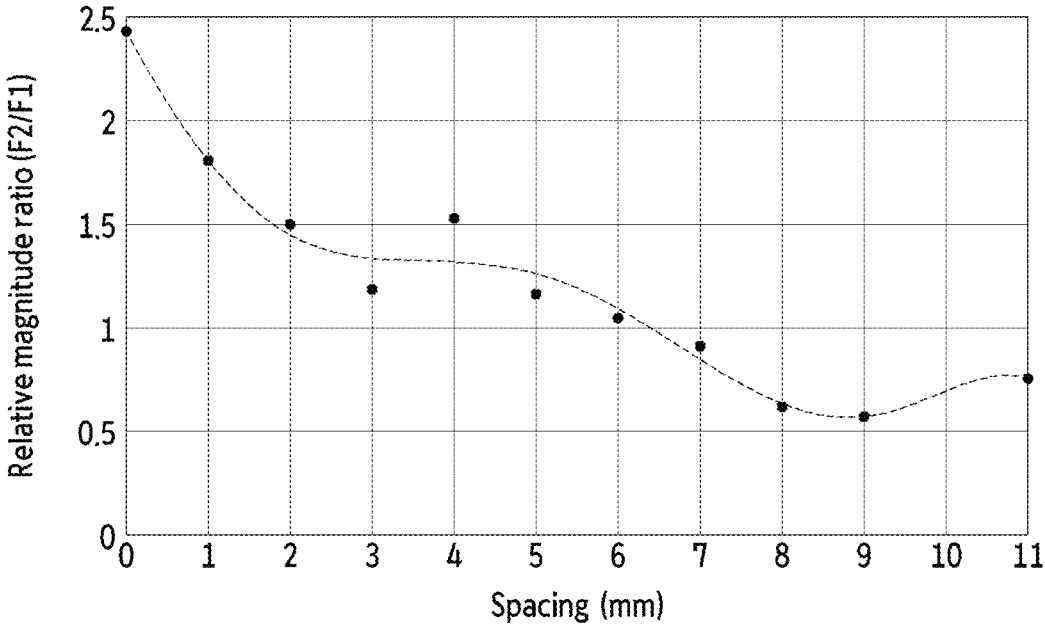

FIGS. 40 and 41 are diagrams illustrating behavior changes and relative variations of photoacoustic wave detection data in the frequency domain while the photoacoustic measuring apparatus is removed from the contact site according to some embodiments of the present disclosure.

Referring to FIG. 40, (a) is a graph in which photoacoustic wave detection data is indicated in the frequency domain when a spacing is 0 mm, (b) is a graph in which photoacoustic wave detection data is indicated in the frequency domain when a spacing is 3 mm, (c) is a graph in which photoacoustic wave detection data is indicated in the frequency domain when a spacing is 5 mm, and (d) is a graph in which photoacoustic wave detection data is indicated in the frequency domain when a spacing is 8 mm.

Three feature frequency bands B1, B2, and B3 are displayed in each graph. The first peak F1 of the lowest frequency band B1 may not decrease or may increase even when the spacing increases. The second peak F2 of the intermediate frequency band B2 linearly decreases as the spacing increases. The third peak F3 of the highest frequency band B3 among the displayed frequency bands also linearly decreases as the spacing increases, but has the tendency which is not clear compared to that in the second peak F2.

According to this observation result, a ratio of the second peak F2, that is, a variation of F2/F1, with respect to the first peak F1 is shown in FIG. 41. It may be identified that the F2/F1 ratio has a tendency clear enough such that it may be determined that the data may be invalid in response to that the spacing is 2 to 4 mm.

FIGS. 42 to 45 are timing diagrams illustrating a laser safe-driving function of the photoacoustic measuring apparatus according to some embodiments of the present disclosure.

Figure 42:
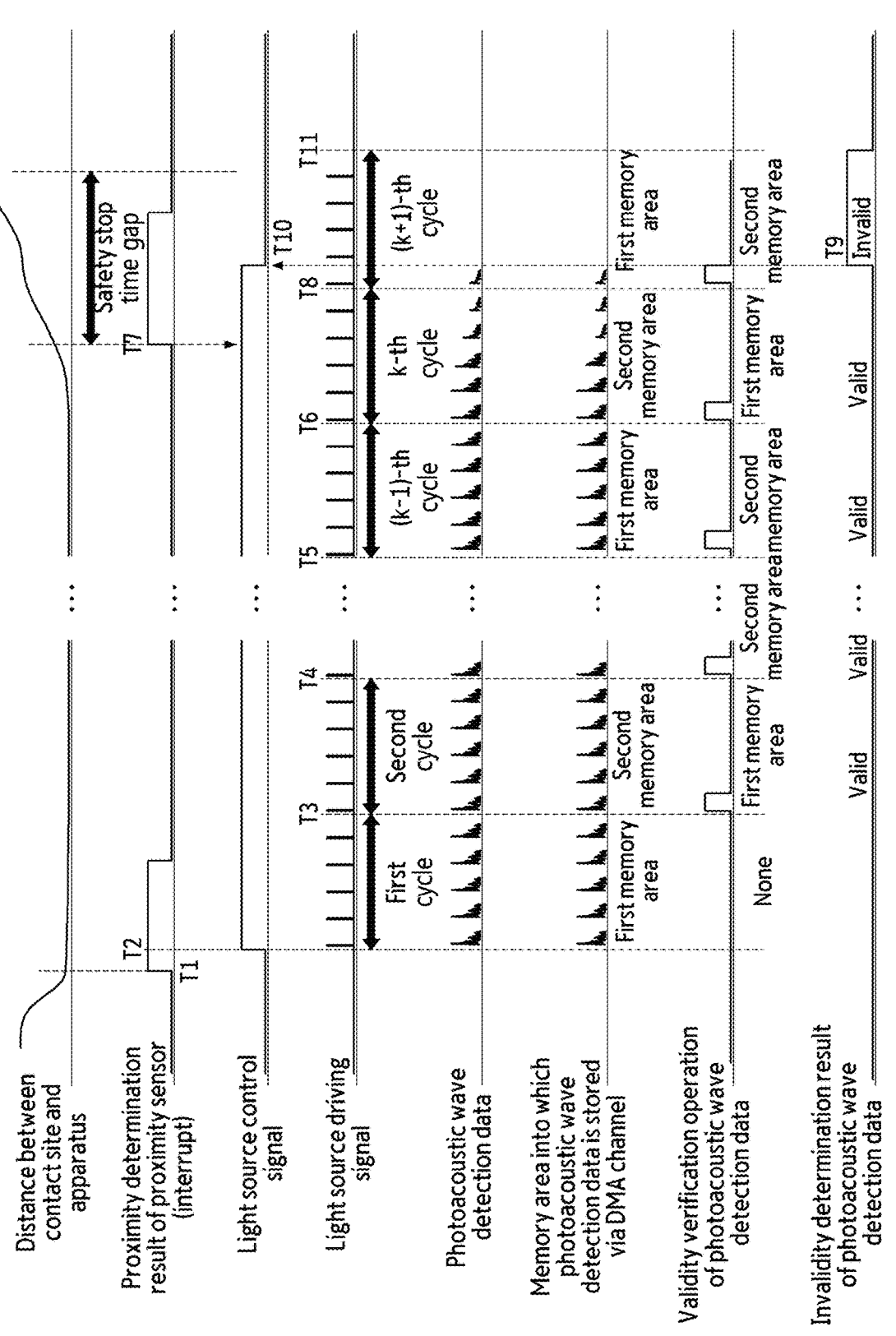
FIGS. 42 to 45 are timing diagrams illustrating a laser safe-driving function of the photoacoustic measuring apparatus according to some embodiments of the present disclosure.

FIG. 42 is a case in which the photoacoustic measuring apparatus 8a according to the present embodiment generates a light source control signal to immediately stop the driving of the laser light source unit 10 when both the non-proximity determination event of the proximity sensor 62 and the invalidity determination event according to the verification of the photoacoustic wave detection data occur.

Referring to FIG. 42, at a first time point T1, the proximity sensor 62 determines that the photoacoustic measuring apparatus 8a and the contact site are in contact with each other, and the proximity decision of the proximity sensor 62 is input to the MCU or the MPU implementing the controller 400 in an interrupt manner.

From a second time point T2, the controller 400 activates the light source control signal to control the light source driver 20 to generate the light source driving signal and apply the light source driving signal to the laser light source unit 10.

During a first cycle from the second time point T2 to a third time point T3, the light source driver 41 generates the light source driving signal, the photoacoustic wave is generated at the contact site of the measurement target 90 receiving the laser pulse light generated from the laser light source unit 10, and the photoacoustic wave detector 20 generates the photoacoustic wave detection data.

The photoacoustic wave detection data generated during the first cycle is stored in the first memory area 411 through the DMA channel. Since there is no unverified photoacoustic wave detection data during the first cycle, no validation operation occurs and no invalidity determination exists.

Even during a second cycle from the third time point T3 to a fourth time point T4, the light source driver 41 generates the light source driving signal according to the activated light source control signal, the photoacoustic wave is generated at the contact site of the measurement target 90 receiving the laser pulse light generated from the laser light source unit 10, and the photoacoustic wave detector 20 generates the photoacoustic wave detection data.

Since the photoacoustic wave detection data stored in the first cycle is unverified in the second cycle, the controller 400 verifies the validity of the unverified photoacoustic wave detection data. As illustrated above, the validity of the photoacoustic wave detection data may be verified with only the initial peak values in the time domain or a small number of peak frequencies after frequency domain conversion. Thus, the calculation cost may be low and the calculation time may be very short.

It is assumed that the photoacoustic measuring apparatus 8a starts to be removed from the contact site for some reason in a k-th cycle between a sixth time point T6 and an eighth time point T8. The proximity sensor 62 generates a non-proximity determination event at a seventh time point T7. However, the controller 400 does not immediately determine the operation stop and waits for the invalidity determination event of the photoacoustic wave detection data. During the k-th cycle, the photoacoustic wave detection data is gradually distorted and stored in the second memory area. The validity verification operation is performed on the (k−1)-th photoacoustic wave detection data stored in the second memory area, and the determination that the (k−1)-th photoacoustic wave detection data is valid is derived.

During a (k+1)-th cycle from the eighth time point T8 to an eleventh time point T11, the validity of the photoacoustic wave detection data stored in a distorted state in the k-th cycle immediately before is verified, and an invalidity determination event of the k-th photoacoustic wave detection data occurs at the ninth time point T9. As the invalidity determination event also occurs following the non-proximity determination event, the controller 40 deactivates the light source control signal at a tenth time point T10, and the light source driver 20 immediately stops generating the light source driving signal.

In the example of FIG. 42, the worst case is a case in which the seventh time point T7 which is the time point at which the apparatus has been removed from the contact site, occurs immediately after the start T6 of the k-th cycle. Even in this case, in order to stop the operation of the light source before the safety-stop time duration, the length of one cycle may be set so that the time duration from the sixth time point T6 to the tenth time point T10, that is, the time duration obtained by adding the length of one cycle and the time duration required for the validity verification operation is shorter than the safety-stop time duration.

Figure 43:
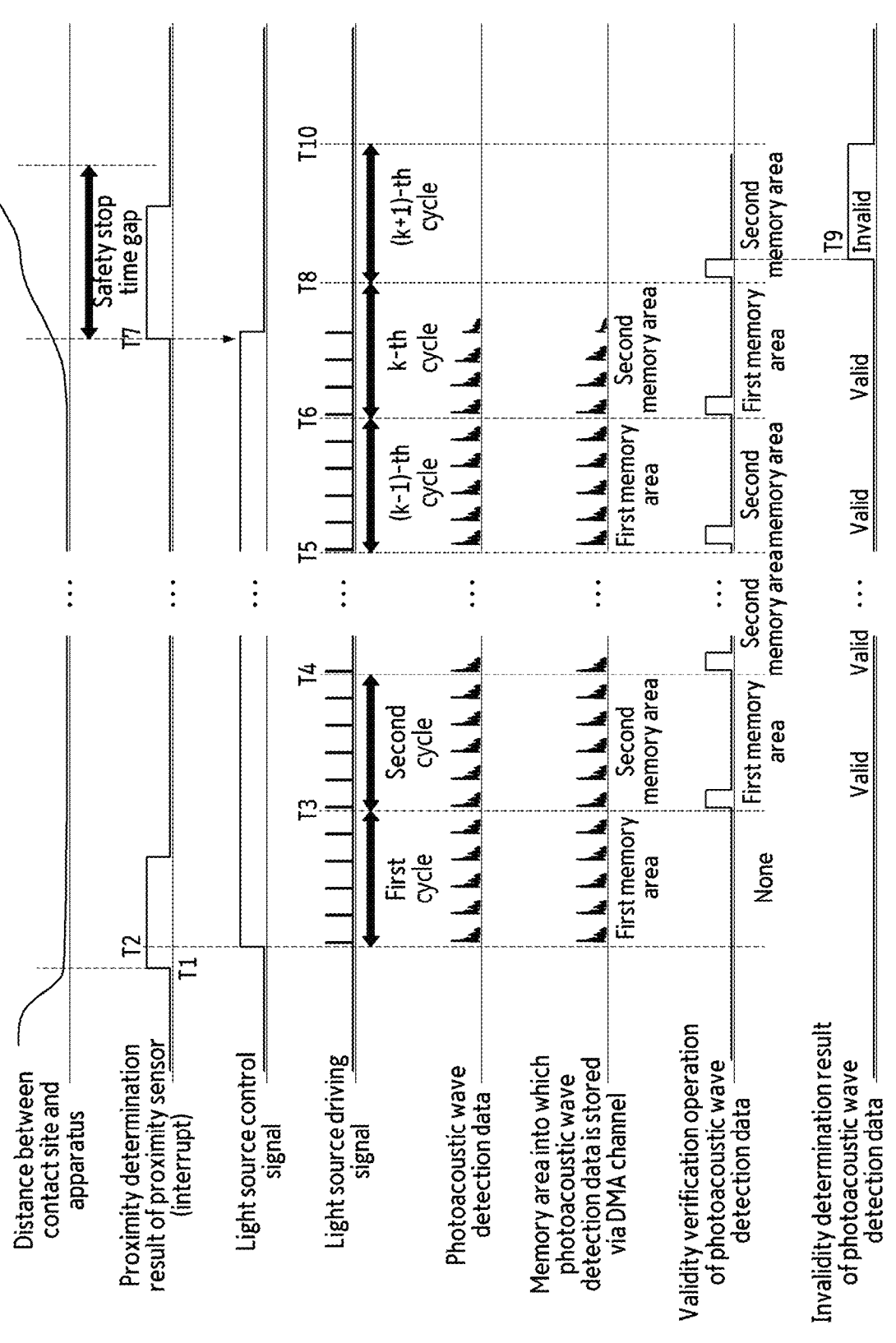

FIG. 43 illustrates a case where the photoacoustic measuring apparatus 8a according to the present embodiment generates a light source control signal to immediately stop driving of the laser light source unit 10 in response to that one of a non-proximity determination event of the proximity sensor 62 and an invalidity determination event according to verification of photoacoustic wave detection data occurs.

In the example of FIG. 43, the process up to the seventh time point T7 is the same as that in the example of FIG. 42, and thus a description thereof will be omitted. A non-proximity determination event is generated from the proximity sensor 60 at the seventh time point T7, and immediately thereafter, the light source control signal is deactivated, so that the laser light source unit 10 may be stopped to operate before the k-th cycle ends.

In the example of FIG. 43, the worst case is a case in which the proximity sensor malfunctions and the non-proximity determination is not made until the ninth time point T9. Nevertheless, the laser light source unit 10 may be reliably stopped to operate immediately after the ninth time point T9 at which the invalidity determination event occurs.

Figure 44:
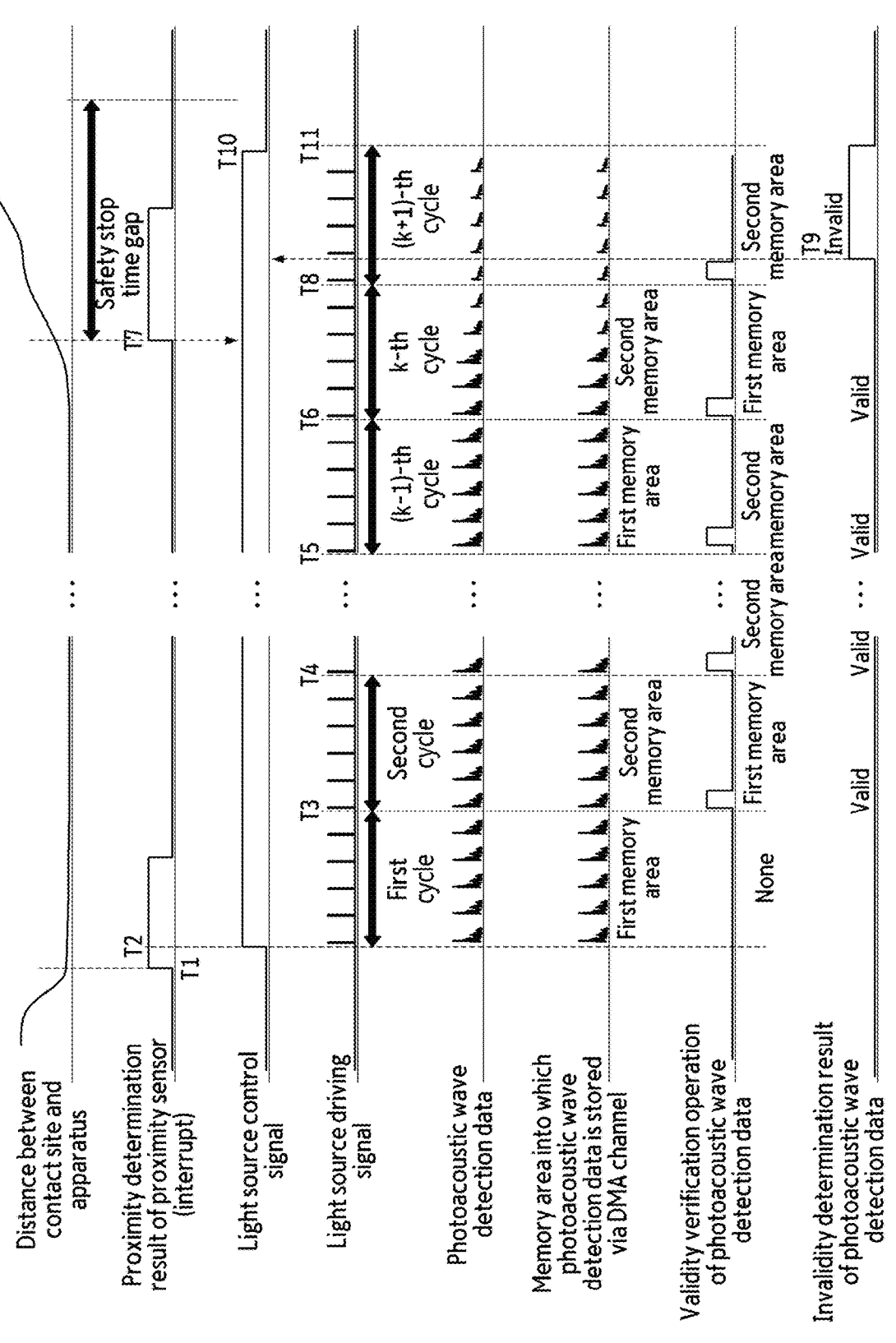

FIG. 44 illustrates a case in which the photoacoustic measuring apparatus 8a according to the present embodiment generates the light source control signal to stop the driving of the laser light source unit 10 when the current cycle ends in response to that both the non-proximity determination event of the proximity sensor 62 and the invalidity determination event according to the verification of the photoacoustic wave detection data occur.

In the example of FIG. 44, the process up to the ninth time point T9 is the same as that in the example of FIG. 42, and thus a description thereof will be omitted.

Even when the invalidity determination event occurs at the ninth time point T9, the controller 40 may maintain the light source operation until the (k+1)-th cycle ends according to a predetermined rule without immediately deactivating the light source control signal.

In the example of FIG. 44, the worst case is a case in which the seventh time point T7 which is the time point at which the apparatus and the skin are removed from each other, occurs immediately after the start T6 of the k-th cycle. Even in this case, in order to stop the operation of the light source before the safety-stop time duration, the length of one cycle may be set so that the time duration from the sixth time point T6 to the eleventh time point T11, that is, the time duration corresponding to the lengths of the two cycles is shorter than the safety-stop time duration.

Figure 45:
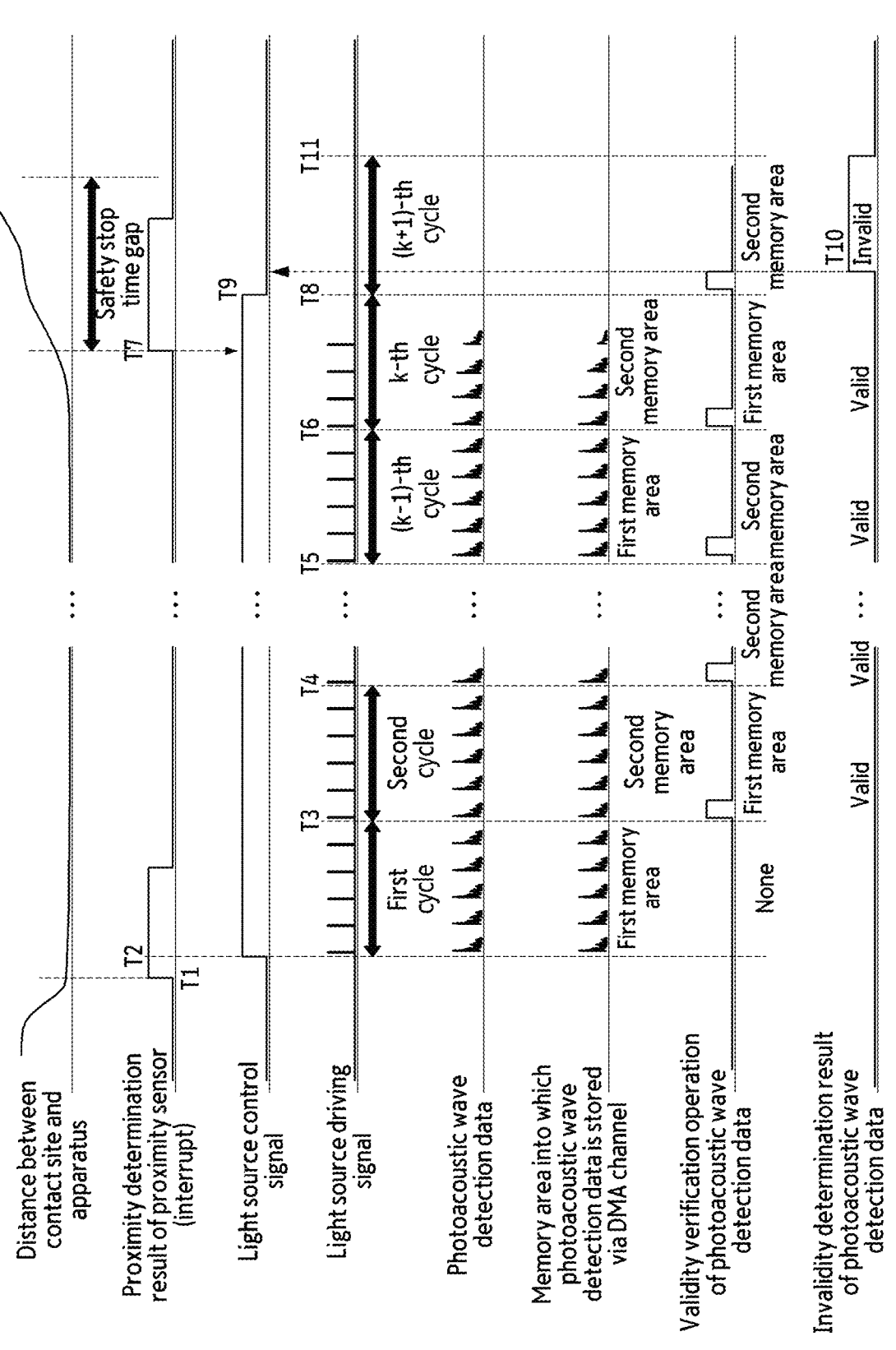

FIG. 45 illustrates a case where the photoacoustic measuring apparatus 8*a* according to the present embodiment generates a light source control signal to stop the driving of the laser light source unit 10 when the current cycle ends in response to that one of the non-proximity determination event of the proximity sensor 60 and the invalidity determination event according to the verification of the photoacoustic wave detection data occurs.

In the example of FIG. 45, the process up to the seventh time point T7 is the same as that in the example of FIGS. 42 and 44, and thus a description thereof will be omitted. A non-proximity determination event occurs by the proximity sensor 60 at the seventh time point T7, and the controller 400 may maintain the driving of the light source until the k-th cycle ends according to a predetermined rule without immediately deactivating the light source control signal. When the k-th cycle ends, the light source control signal is deactivated, and the driving of the laser light source unit 10 may also be stopped.

In the example of FIG. 45, the worst case is a case in which the proximity sensor malfunctions and the non-proximity determination is not made until the ninth time point T9.

Nevertheless, the invalidity determination event occurs at the tenth time point T10 of the (k+1)-th cycle, such that the laser light source unit 10 may be reliably stopped to operate when the (k+1)-th cycle ends.

Figure 46:
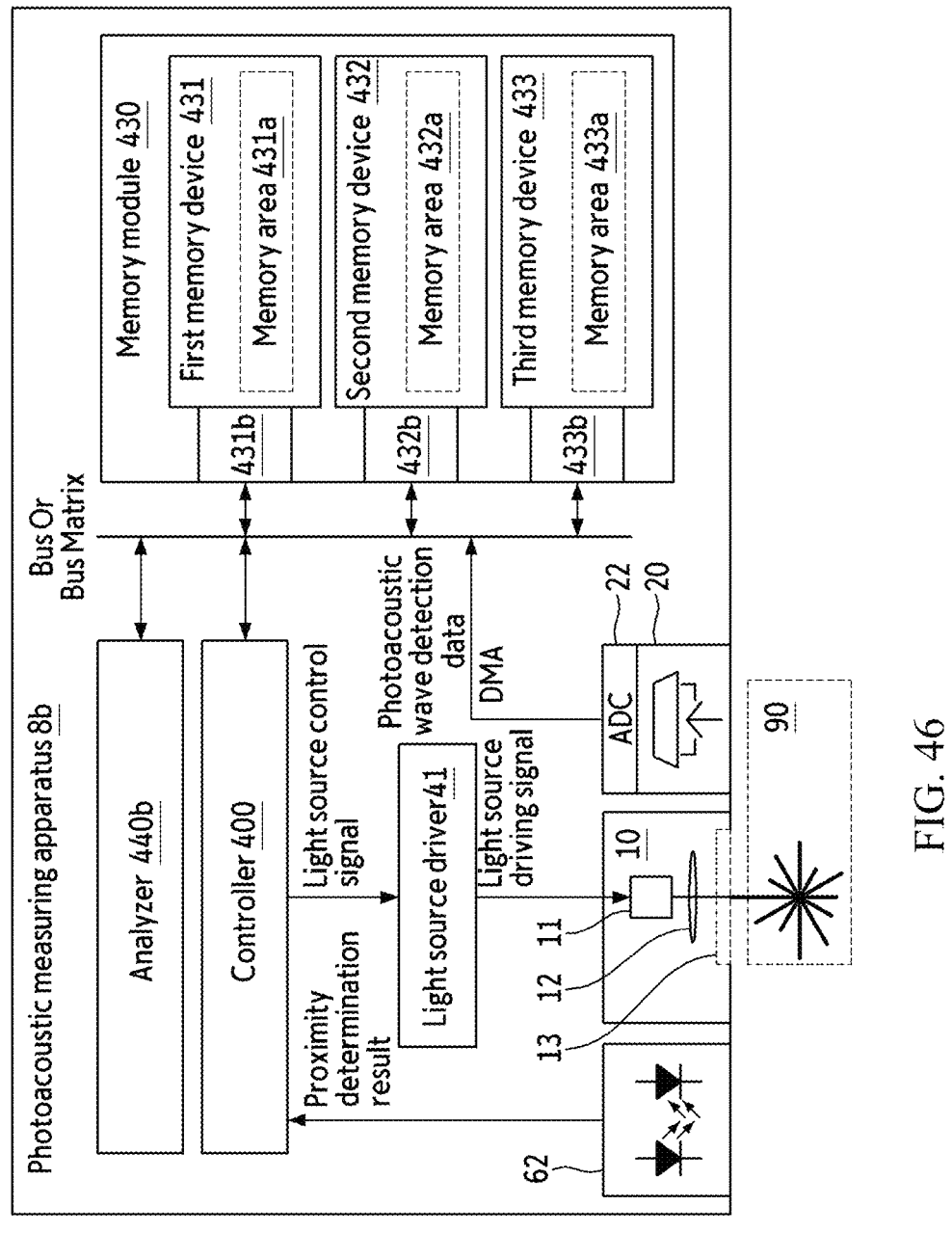
FIG. 46 is a schematic block diagram illustrating a photoacoustic measuring apparatus having a laser safe-driving function and a parallel processing function according to some still further embodiments of the present disclosure.

FIG. 46 is a schematic block diagram illustrating a photoacoustic measuring apparatus having a laser safe-driving function and a parallel processing function according to some still further embodiments of the present disclosure.

Referring to FIG. 46, a photoacoustic measuring apparatus 8*b* of FIG. 46 is generally similar to the photoacoustic measuring apparatus 8*a* of FIG. 34, and a description of duplicate contents will be omitted.

However, unlike the case where the analyzer 440*a* of the photoacoustic measuring apparatus 8*a* of FIG. 34 is implemented on the controller 400, an analyzer 440*b* of the photoacoustic measuring apparatus 8*b* of FIG. 46 is implemented in a core or a calculation unit separate from the controller 40. Accordingly, the analyzer 440*b* may access the memory areas 431*a*, 432*a*, and 433*a* through a bus or a bus matrix independently of the controller 400.

More specifically, while the photoacoustic wave detection data currently being acquired in the k-th cycle is stored in the second memory area 432*a* through the DMA channel, the controller 400 may perform a verification operation on the unverified photoacoustic wave detection data stored in the first memory area 431*a* in the previous (k-1)-th cycle. The controller 400 may store all of the photoacoustic wave detection data determined to be valid as a result of the verification in the third memory area 433*a*.

When the photoacoustic wave detection data that is determined to be valid are accumulated in the third memory area 433*a* sufficiently so as to perform a predetermined characteristic analysis, the analyzer 440*b* may calculate a predetermined characteristic of the measurement target 90 by analyzing the determined valid photoacoustic wave detection data. For example, the measurement target 90 is a dermal layer in the skin, and the analyzer 440*b* may determine a glucose concentration, an oxygen saturation, a glycated hemoglobin concentration, and the like in the interstitial fluid of the dermal layer.

FIGS. 47A to 48B are flowcharts illustrating a laser safe-driving and parallel processing method of a photoacoustic measuring apparatus according to further embodiments of the present disclosure.

The laser safe-driving and parallel processing method of the photoacoustic measuring apparatus of FIGS. 47A, 47B, 48A, and 48B is generally similar to the laser safe-driving method of the photoacoustic measuring apparatus of FIG. 35 or 46A and 46B, and descriptions of duplicate contents are omitted.

However, in the laser safe-driving and parallel processing method of the photoacoustic measuring apparatus according to further embodiments as shown in FIGS. 47A and 47B or FIGS. 48A and 48B, whenever the controller 400 determines, based on the verification result, that the data is valid in S65 of verifying the validity, the controller 400 may accumulate and store the photoacoustic wave detection data of the corresponding cycle in the third memory area 433*a* in S66.

In S71, the analyzer 440*b* may analyze the valid determined photoacoustic wave detection data accumulated in the third memory area 433*a* to calculate a predetermined characteristic of the measurement target 90.

In S72, the controller 400 may display the calculated characteristic value on a display (not shown).

When the data is determined to be invalid in S65, improper termination may occur.

Figure 47A:
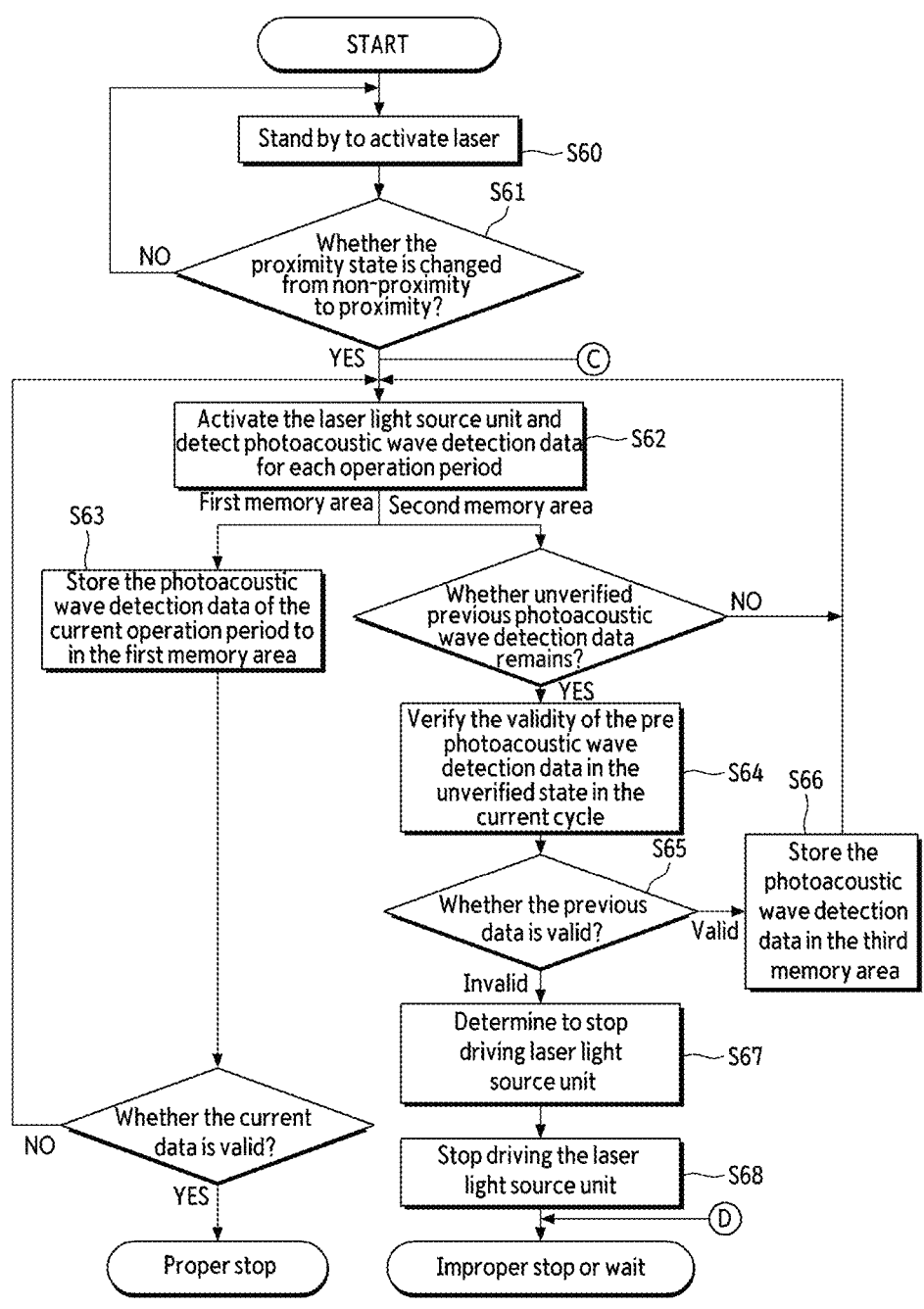
FIGS. 47A to 48B are flowcharts illustrating a laser safe-driving and parallel processing method of a photoacoustic measuring apparatus according to further embodiments.
Figure 47B:
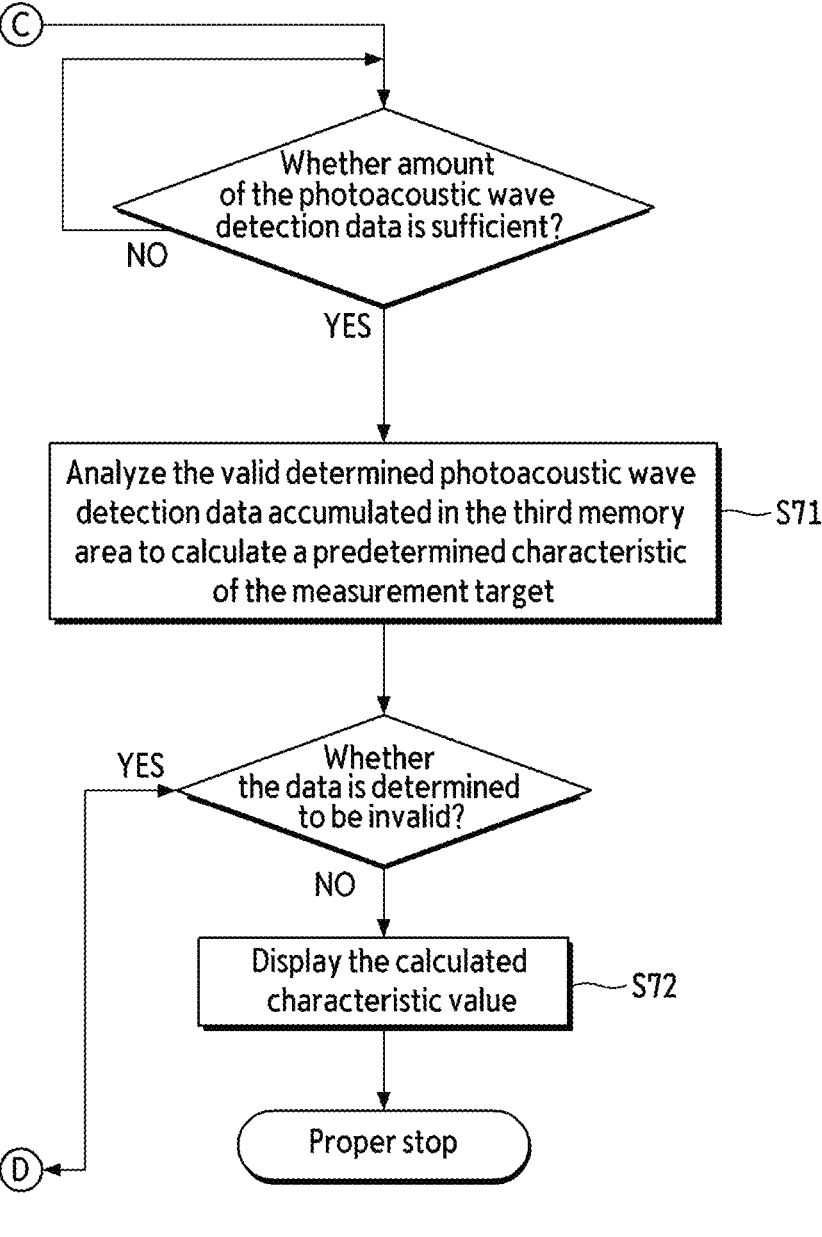
Figure 48A:
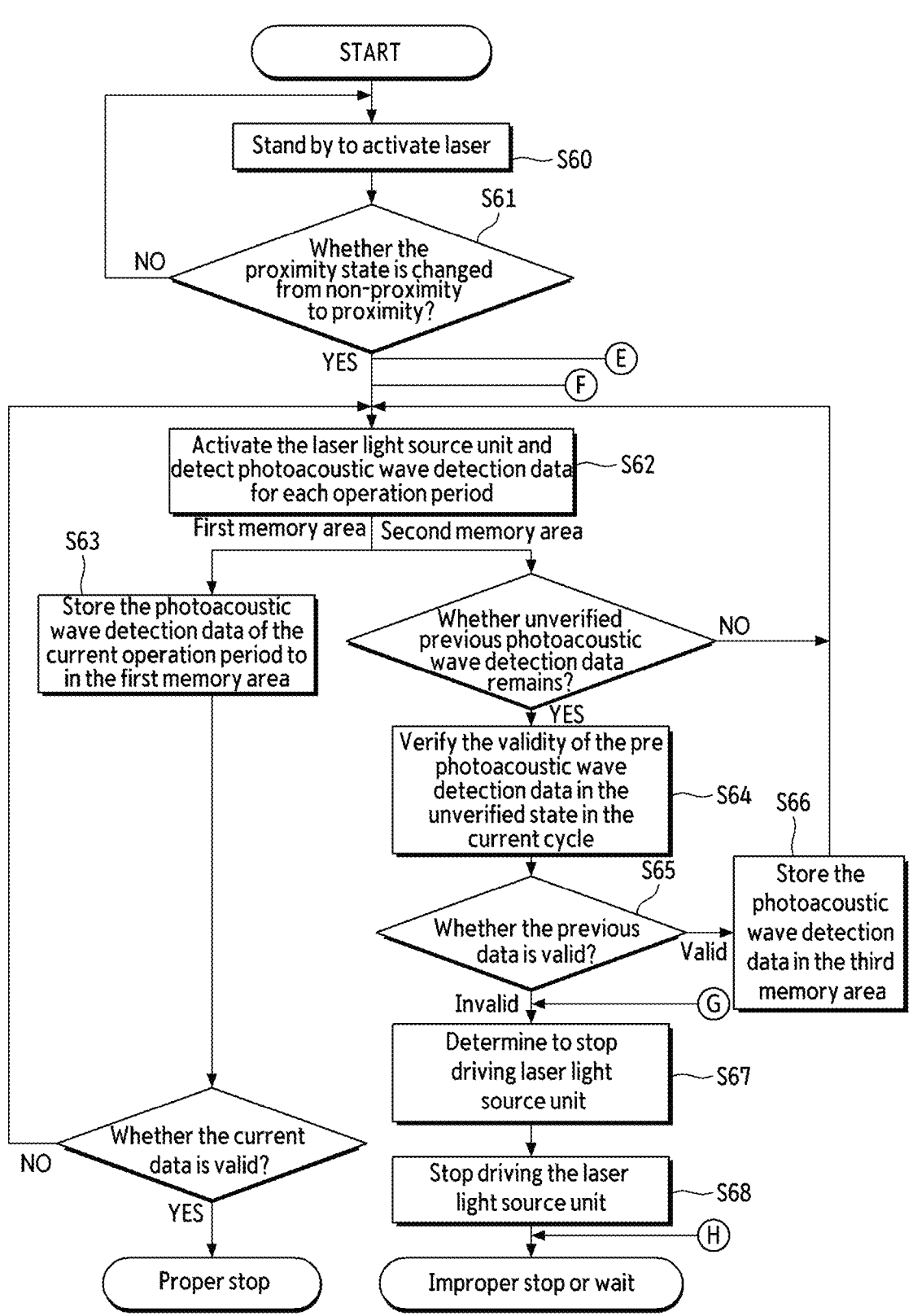
Figure 48B:
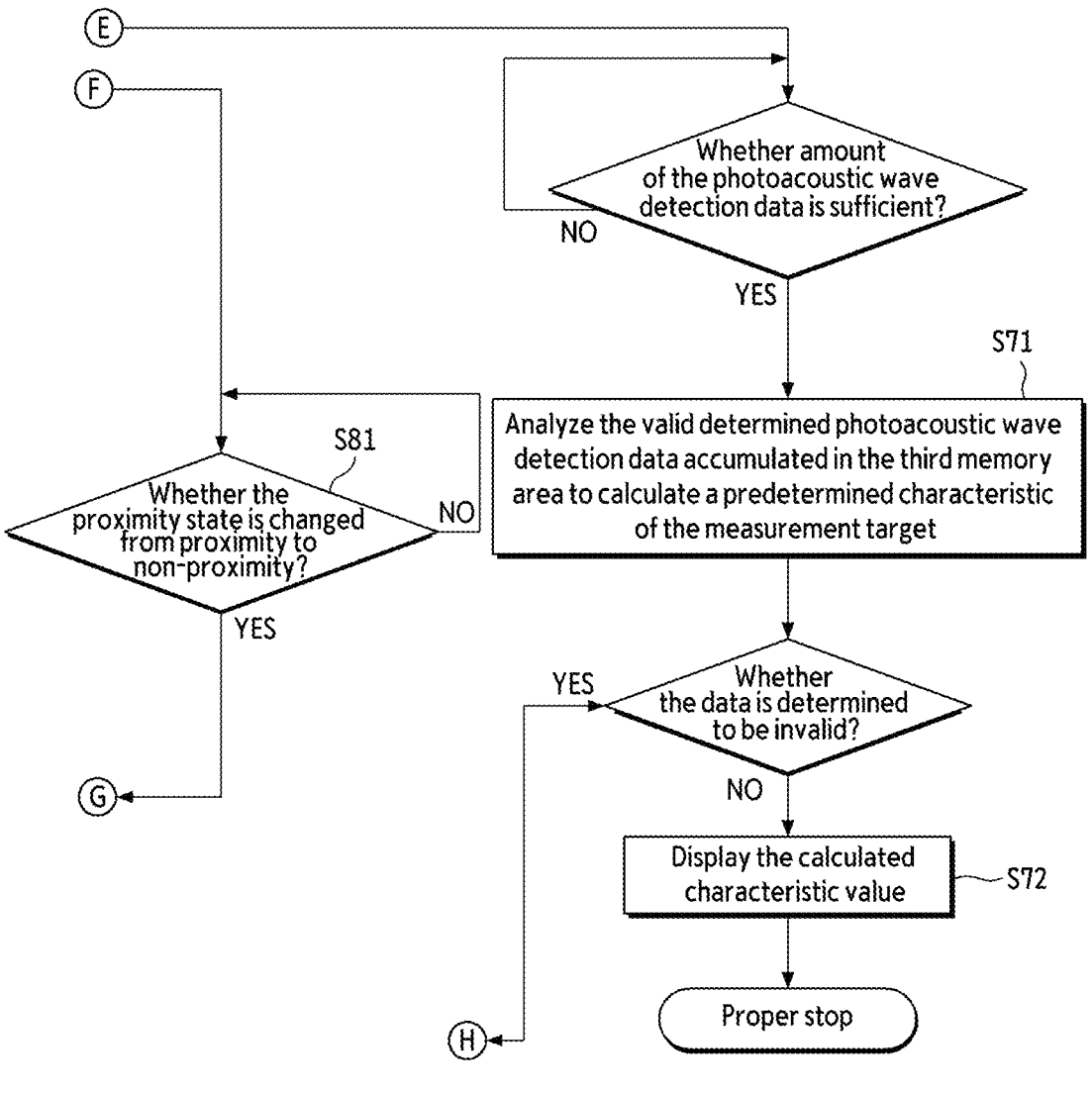

In the operations of FIGS. 47A and 47B, once the proximity state of the proximity sensor 62 is switched from the non-proximity state to the proximity state such that the measurement operation is started, the controller 400 no longer preferentially uses the non-proximity decision of the proximity sensor 60 during subsequent cycles, whereas in the operations of FIGS. 48A and 48B, the controller 400 may also consider the non-proximity decision of the proximity sensor 60 even after the start of the measurement operation.

Specifically, in S81, the controller 400 determines whether the proximity state of the laser light source unit 10 is changed from proximity state to non-proximity state with respect to the measurement target 90 detected by the proximity sensor 62. When the proximity state is not switched from proximity state to non-proximity state, proper cycles are repeated.

In response to that the second event in which the proximity state is changed from proximity state to non-proximity state occurs in S81, the controller 400 may be configured to determine to stop the operation of the laser light source unit 10 based on a combination of the first event in which the photoacoustic wave detection data is determined to be invalid and the second event in which the proximity decision of the proximity sensor 62 is changed from proximity state to non-proximity state in S67.

According to an embodiment, the controller 400 may be configured to decide to stop driving the laser light source unit 10 in response to that both the second event and the first event in which the proximity decision of the proximity sensor 62 is switched from proximity state to non-proximity state occur.

According to an embodiment, the controller 400 may be configured to determine to stop the operation of the laser light source unit 10 without waiting for the first event by prioritizing the second event in which the proximity decision of the proximity sensor 62 is switched from proximity state to non-proximity state over the first event.

In response to that the second event in which the proximity state is changed from proximity state to non-proximity state occurs in S81, the controller 400 may be configured to determine to stop the operation of the laser light source unit 10 based on a combination of the first event in which the photoacoustic wave detection data is determined to be invalid and the second event in which the proximity decision of the proximity sensor 62 is changed from proximity state to non-proximity state in S67.

Although the embodiments of the present disclosure have been described above with reference to the accompanying drawings, the present disclosure is not limited to the above embodiments, but may be implemented in various different forms. A person skilled in the art may appreciate that the present disclosure may be practiced in other concrete forms without changing the technical spirit or essential characteristics of the present disclosure. Therefore, it should be appreciated that the embodiments as described above are not restrictive but illustrative in all respects.

So far, a variety of embodiments of the present disclosure and the effects according to embodiments thereof have been mentioned with reference to FIGS. 1 to 48B. The effects according to the technical idea of the present disclosure are not limited to the forementioned effects, and other unmentioned effects may be clearly understood by those skilled in the art from the description of the specification.

Although operations are shown in a specific order in the drawings, it should not be understood that desired results can be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

In concluding the detailed description, those skilled in the art will appreciate that many variations and modifications can be made to the preferred embodiments without substantially departing from the principles of the present disclosure. Therefore, the disclosed preferred embodiments of the disclosure are used in a generic and descriptive sense only and not for purposes of limitation.

What is claimed is:

1. A photoacoustic measuring apparatus comprising:
a light source configured to emit laser of a predetermined wavelength to a measurement target;
a photoacoustic detector configured to detect a photoacoustic signal generated from the measurement target receiving the laser light emitted from the light source;
a contact sensor including a first bioimpedance electrode and a second bioimpedance electrode, the contact sensor being configured to acquire a bioimpedance value when the electrodes are placed in contact with the measurement target and an operator during use of the photoacoustic measuring apparatus; and
a controller configured to decide whether the operator and the measurement target are the same individual, based on the bioimpedance value measured between the first bioimpedance electrode and the second bioimpedance electrode.

2. The photoacoustic measuring apparatus of claim 1, wherein the photoacoustic detector includes an ultrasonic sensor configured to detect a photoacoustic wave generated in a photoacoustic wave generating area in the measurement target in a predetermined frequency band,
wherein with a light-incident position and a beam width of the laser light, a center of the photoacoustic wave generating area, and a position of the ultrasonic sensor given according to a predetermined geometry, the frequency band of the ultrasonic sensor is configured to include a frequency corresponding to a wavelength equal to twice the beam width at the point of light incidence.

3. The photoacoustic measuring apparatus of claim 2, wherein the frequency band of the ultrasonic sensor is configured to include a frequency corresponding to a wavelength equivalent to a distance from the photoacoustic wave generating area to the ultrasonic sensor according to the predetermined geometry.

4. The photoacoustic measuring apparatus of claim 2, wherein the pulse width of the laser light is determined such that twice the time difference between a maximum pressure time and a minimum pressure time of a heat pressure wave estimated in the measurement target by the laser pulse energy is included within a period range corresponding to the frequency band of the ultrasonic sensor.

5. The photoacoustic measuring apparatus of claim 2, wherein the laser light has a beam cross-section having a fast axis and a slow axis, and the fast axis is aligned to face the ultrasonic sensor.

6. The photoacoustic measuring apparatus of claim 5, further comprising a sampling unit configured to sample a waveform of the detected photoacoustic wave at a predetermined sampling rate to obtain sampling data,
wherein the sampling rate is determined based on a photoacoustic frequency corresponding a wavelength that is twice the beam width along the fast axis of the beam cross section.

7. The photoacoustic measuring apparatus of claim 6, wherein the sampling data is obtained by repeatedly performing a procedure for N frames, wherein N is a natural number of 2 or larger, wherein the procedure of each of the N frames is composed of an operation of emitting the laser light to the measurement target, an operation of detecting the photoacoustic wave generated in the photoacoustic wave generating area in the measurement target in the predetermined frequency band, and an operation of sampling a waveform of the photoacoustic wave at a predetermined sampling rate, wherein N pieces of the sampling data respectively obtained in the N frames are coherent-averaged.

8. The photoacoustic measuring apparatus of claim 2, wherein the frequency band of the ultrasonic sensor is determined to include a frequency at which a magnitude of a proximity effect between the photoacoustic wave generating area and the ultrasonic sensor is smaller than or equal to a predetermined reference value.

9. The photoacoustic measuring apparatus of claim 2, wherein a center frequency of the frequency band of the ultrasonic sensor is determined based on a frequency corresponding to a wavelength equivalent to a distance from a center of the photoacoustic wave generating area to a center of the measurement surface of the ultrasonic sensor.

10. The photoacoustic measuring apparatus of claim 1, wherein the photoacoustic detector includes an ultrasonic sensor configured to detect a photoacoustic wave generated in the photoacoustic wave generating area in the measurement target in a predetermined frequency band, wherein a distance between the photoacoustic wave generating area and the ultrasonic sensor is determined based on a wavelength corresponding to a frequency within the frequency band of the ultrasonic sensor.

11. The photoacoustic measuring apparatus of claim 10, wherein a beam width of the laser light is determined based on half a wavelength length of a maximum frequency within the frequency band of the ultrasonic sensor.

12. The photoacoustic measuring apparatus of claim 10, wherein a pulse width of the laser light is determined such that twice the time difference between a maximum pressure time and a minimum pressure time of a heat pressure wave estimated in the measurement target by the laser pulse energy is included within a period range corresponding to the frequency band of the ultrasonic sensor.

13. The photoacoustic measuring apparatus of claim 10, wherein the laser light has a beam cross-section having a fast axis and a slow axis, and the fast axis is aligned to face the ultrasonic sensor.

14. The photoacoustic measuring apparatus of claim 13, wherein a beam width of the slow axis of the beam cross-section of the laser light is determined based on half a wavelength length of a maximum frequency of the frequency band of the ultrasonic sensor.

15. The photoacoustic measuring apparatus of claim 10, wherein a distance between the photoacoustic wave generating area and the ultrasonic sensor is determined based on a distance at which a proximity effect due to a wavelength belonging to the frequency band of the ultrasonic sensor is smaller than or equal to a predetermined reference value.

16. The photoacoustic measuring apparatus of claim 10, wherein a distance from a center of the photoacoustic wave generating area to a center of a measurement surface of the ultrasonic sensor is determined based on a wavelength corresponding to a center frequency of the frequency band of the ultrasonic sensor.

17. The photoacoustic measuring apparatus of claim 10, further comprising a sampling unit configured to sample a waveform of the detected photoacoustic wave at a predetermined sampling rate to obtain sampling data, wherein the sampling data is obtained by repeatedly performing a procedure for N frames, wherein N is a natural number of 2 or larger, wherein the procedure of each of the N frames is composed of an operation of emitting the laser light to the measurement target, an operation of detecting the photoacoustic wave generated in the photoacoustic wave generating area in the measurement target in the predetermined frequency band, and an operation of sampling a waveform of the photoacoustic wave at a predetermined sampling rate, wherein N pieces of the sampling data respectively obtained in the N frames are coherent-averaged.

* * * * *